(12) United States Patent
Ishihara

(10) Patent No.: US 6,822,811 B2
(45) Date of Patent: Nov. 23, 2004

(54) OBLIQUE PROJECTION OPTICAL SYSTEM AND METHOD FOR SETTING THE SAME

(75) Inventor: Jun Ishihara, Kobe (JP)

(73) Assignee: Minolta Co., Ltd., Osaka (JP)

( * ) Notice: Subject to any disclaimer, the term of this patent is extended or adjusted under 35 U.S.C. 154(b) by 41 days.

(21) Appl. No.: 10/393,808

(22) Filed: Mar. 21, 2003

(65) Prior Publication Data

US 2003/0206353 A1 Nov. 6, 2003

(30) Foreign Application Priority Data

Mar. 27, 2002 (JP) .......................................... 2002-88726

(51) Int. Cl.[7] .............................................. G02B 17/00
(52) U.S. Cl. ........................ 359/726; 359/727; 359/730
(58) Field of Search ................................ 359/726–731, 359/631, 633, 850, 857–863

(56) References Cited

U.S. PATENT DOCUMENTS

| | | | |
|---|---|---|---|
| 4,701,035 A | * 10/1987 | Hirose | 359/366 |
| 5,191,472 A | 3/1993 | Kurematsu et al. | 359/619 |
| 5,390,050 A | 2/1995 | Yanagi et al. | 359/742 |
| 5,871,266 A | 2/1999 | Negishi et al. | 353/98 |
| 6,278,553 B1 | * 8/2001 | Akiyama | 359/627 |
| 6,324,012 B1 | * 11/2001 | Aratani et al. | 359/627 |
| 2003/0035232 A1 | * 2/2003 | Sasaki | 359/859 |
| 2003/0067691 A1 | * 4/2003 | Kurematsu et al. | 359/728 |
| 2003/0202161 A1 | * 10/2003 | Konno et al. | 353/70 |
| 2003/0214712 A1 | * 11/2003 | Yano et al. | 359/466 |
| 2004/0027544 A1 | * 2/2004 | Chatani | 353/37 |

FOREIGN PATENT DOCUMENTS

| | | |
|---|---|---|
| JP | 2001-221949 A | 8/2001 |
| JP | 2001-242381 A | 9/2001 |

* cited by examiner

*Primary Examiner*—Ricky Mack
(74) *Attorney, Agent, or Firm*—Sidley Austin Brown & Wood LLP

(57) ABSTRACT

An oblique projection optical system is compact as compared with the size of the image it presents, offers high imaging performance, produces satisfactorily small distortion, and has a small f-number. The oblique projection optical system is composed of a plurality of powered reflection surfaces, of which the one closest to the projection surface is positively powered and the one second closest thereto is negatively powered. At least one of these two reflection surfaces is a free-form surface, and the one closest to the projection surface has a size larger than half the size of the projection surface.

13 Claims, 41 Drawing Sheets

FIG.1A
FIG.1B
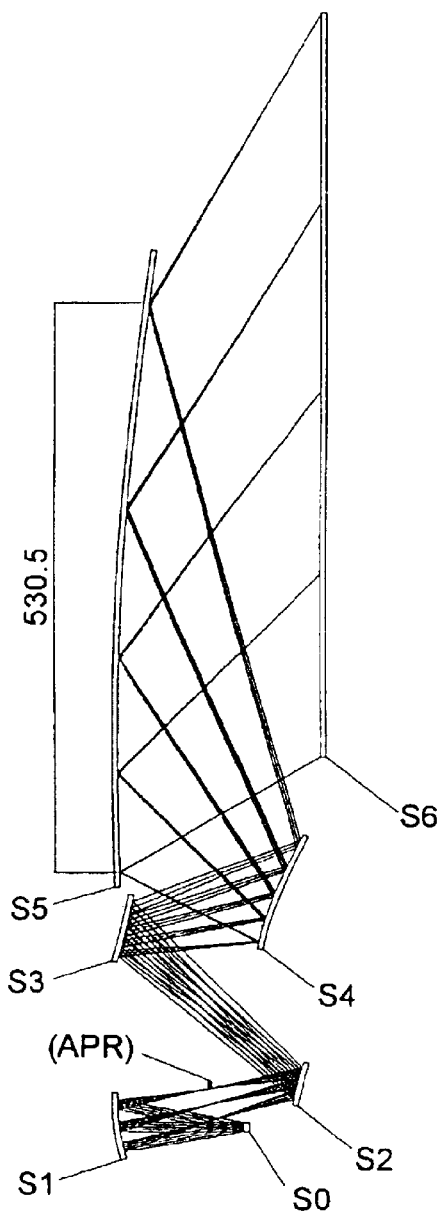
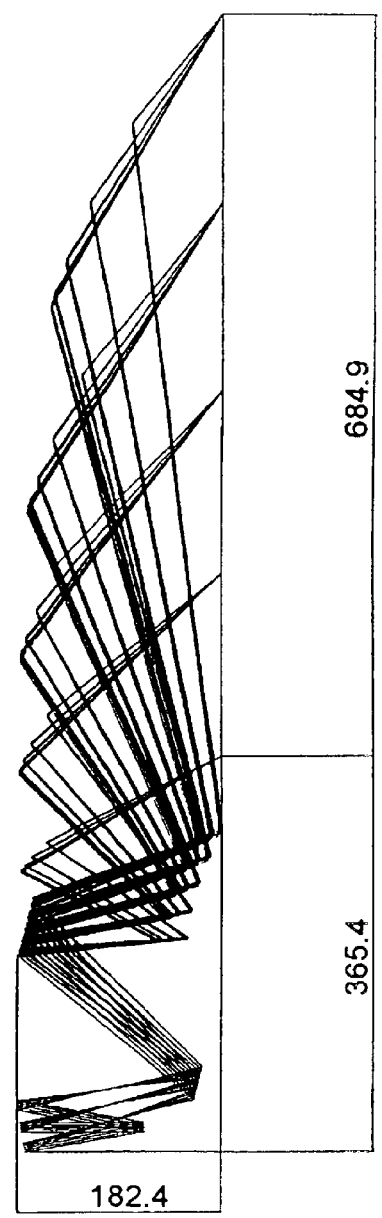

1

1

2

3

3

FIG.14A
FIG.14B
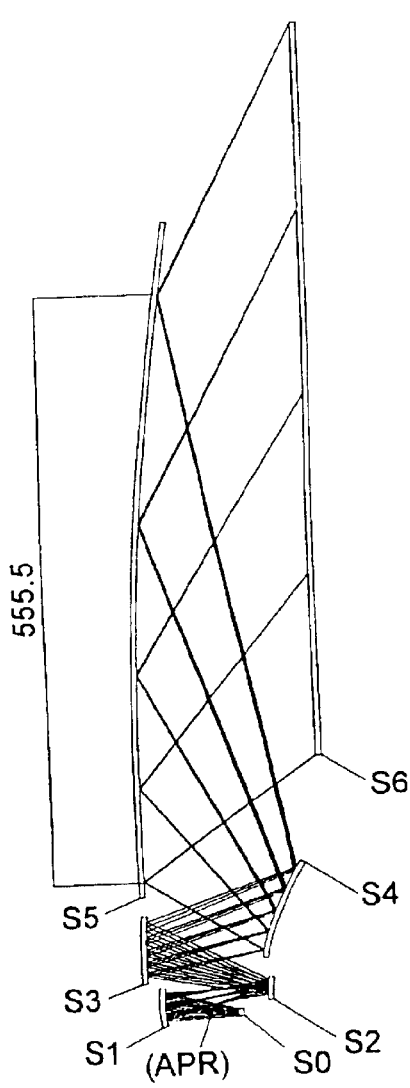
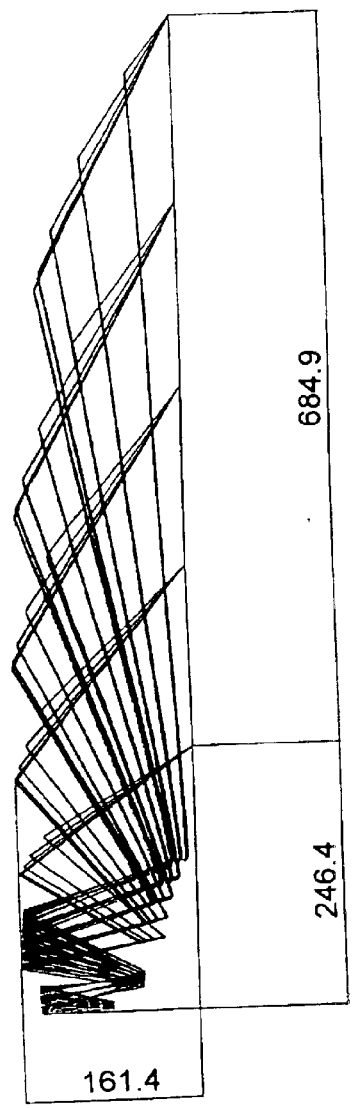

4

FIG.18A
FIG.18B
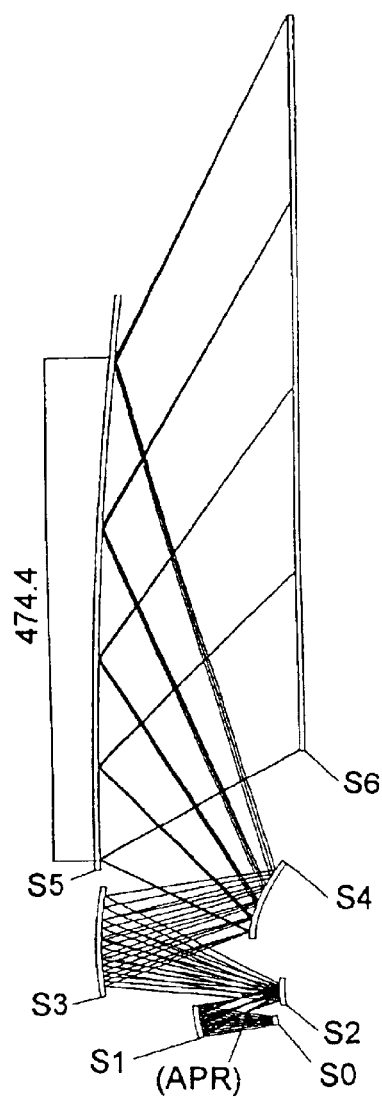
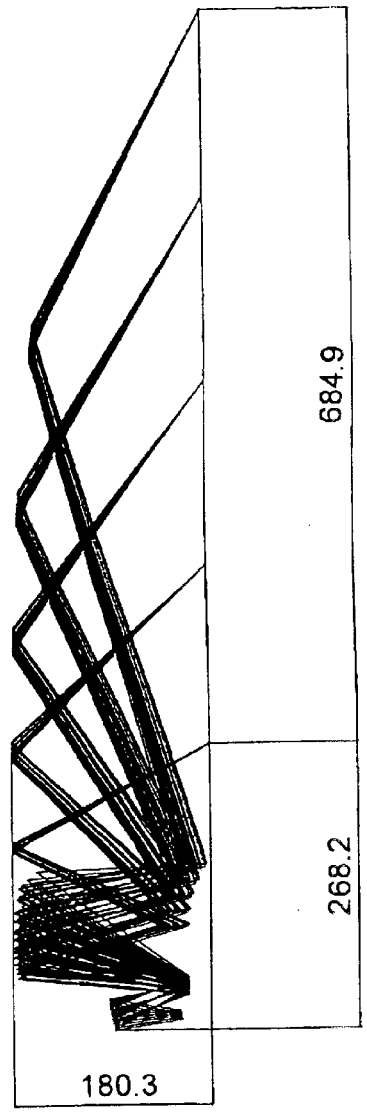

5

6

FIG.26A
FIG.26B
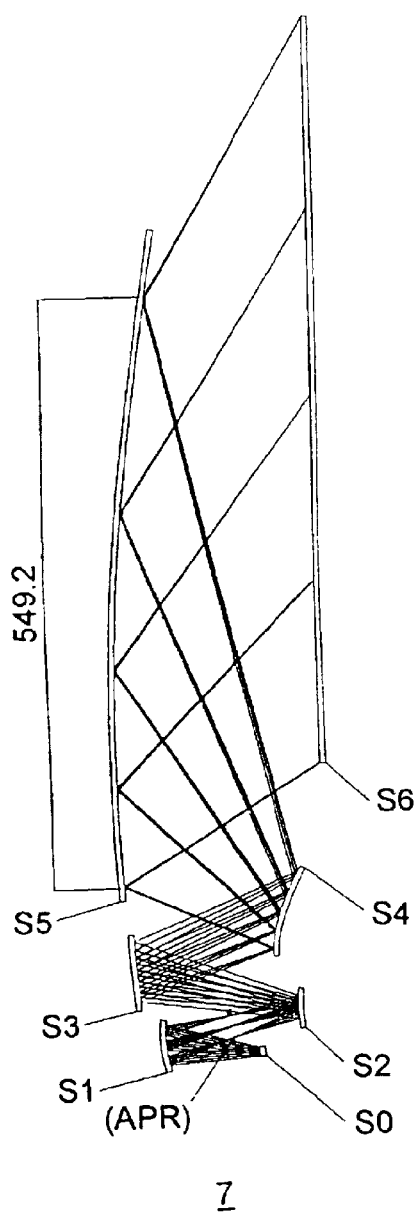
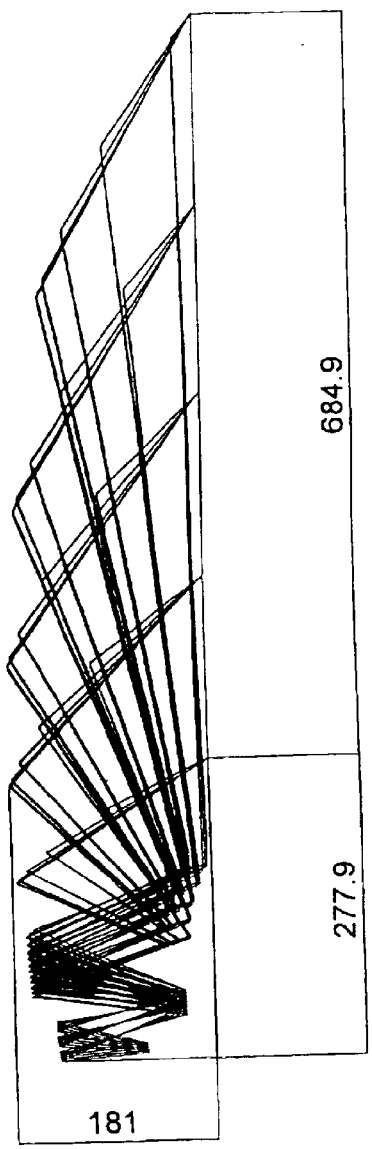

7

8

FIG.34A
FIG.34B
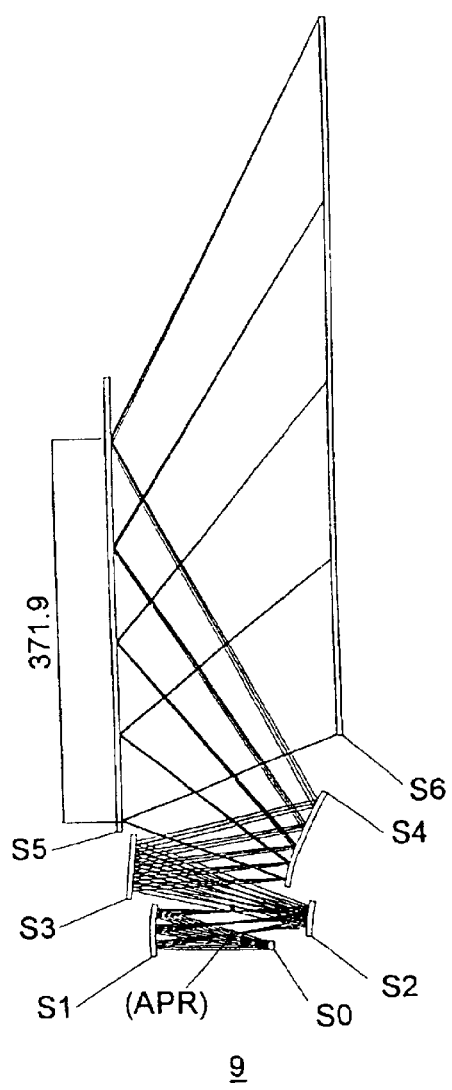
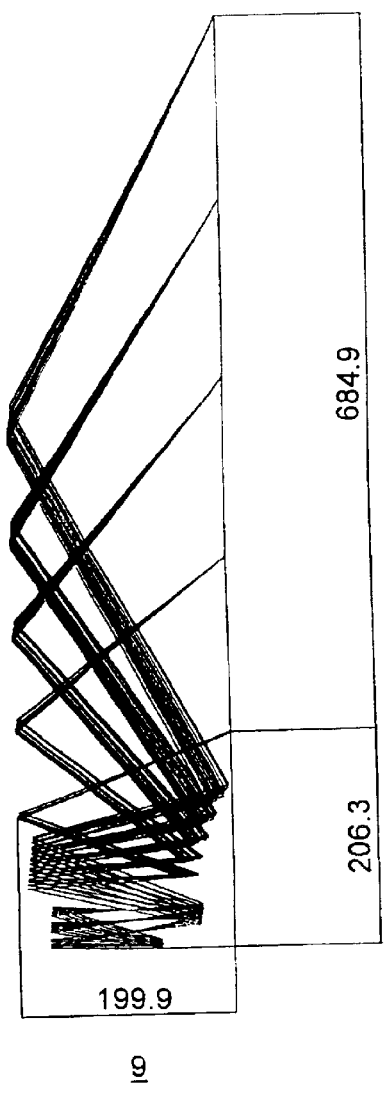

9

8a

9a

9a

OBLIQUE PROJECTION OPTICAL SYSTEM AND METHOD FOR SETTING THE SAME

This application is based on Japanese Patent Application No. 2002-88726 filed on Mar. 27, 2002, the contents of which are hereby incorporated by reference.

BACKGROUND OF THE INVENTION

1. Field of the Invention

The present invention relates to a projection optical system for projecting an image onto a screen while enlarging it, and more particularly to an oblique projection optical system that shines a beam of light obliquely on a screen.

2. Description of the Prior Art

It has been common from long ago to project an image displayed on a small display surface onto a screen while enlarging it. Projection of an image onto a screen used to be achieved by front projection whereby the image is projected from in front of the screen, i.e., from that side of the screen where observers are situated, just as when a movie is shown in a movie theater. In recent years, rear projection has been becoming common whereby, by the use of a light-transmitting screen, an image is projected from behind the screen. Large-screen television monitors adopting rear projection have also been put into practical use.

Projection apparatuses for presenting an image by projection require to be provided with a large screen and at the same time compact, except in cases where they are designed as large facilities themselves such as movie theaters. In particular, rear projection apparatuses, which project an image from behind a screen, are expected to be slim, i.e., have a small dimension in the direction perpendicular to the screen.

Early models of rear projection apparatuses used to employ a common centered optical system as a projection optical system and have a flat mirror disposed behind a screen to achieve slimming-down by turning, with the flat mirror, the optical path of the light exiting from the powered portion of the projection optical system. However, to prevent the image on the screen from being distorted, the optical axis turned by the flat mirror needs to pass through the center of the screen perpendicularly thereto. This makes it difficult to pursue slimming-down beyond a certain limit. The optical path is turned in the height direction, in which the screen is smaller than in the width direction, and all the optical components including the display surface on which the image is displayed but excluding the flat mirror for turning the optical path are usually arranged below the screen.

For further slimming-down of a rear projection apparatus, oblique projection is effective whereby the ray of light directed to the center of the screen, i.e. the ray of light representing the center of the image, is shone on the screen at a large angle of incidence. However, attempting to achieve oblique projection by the use of a centered projection optical system necessitates making the optical axis turned by the flat mirror pass through the screen off the center thereof. Thus, the projection optical system needs to include a large-diameter wide-angle lens, although only part of it is actually used for projection. Such an optical system can be realized, but at high costs. Moreover, the projection optical system itself is then unduly large, contributing little to the slimming-down of the apparatus.

For these reasons, it has been proposed to use a reflective mirror with a curved surface as a powered element included in the projection optical system. For example, U.S. Pat. No. 5,871,266 proposes a projection optical system composed of four curved-surface mirrors. These curved-surface mirrors have, from the display surface side, a positive, a negative, a positive, and a negative optical power, and the curved surface closest to the display surface is spherical, while the other three curved surfaces are aspherical. The applicant of the present invention also proposes, in the U.S. patent application Ser. No. 10/151,342, a projection optical system composed of four curved-surface mirrors. The curved-surface mirrors of this projection optical system have, from the display surface side, a positive, a positive, a negative, and a negative optical power, or a positive, a positive, a negative, and a positive optical power, and they are each spherical or aspherical. Other publications propose other types of projection optical systems, such as one composed of three curved-surface mirrors.

A conventional oblique projection optical system composed of curved-surface mirrors is designed to have a large f-number to prevent degradation in imaging performance, and thus has a long optical path length from the display surface on which the image is displayed to the projection surface on which the screen is disposed. Moreover, to slim down the apparatus while securing a long optical path length, the optical path is turned many times with flat mirrors. The optical path needs to be turned, except at the last time, somewhere around the screen, more specifically below or above it, so as not to hamper projection onto the screen. As a result, while an oblique projection optical system composed of curved-surface mirrors helps slim down the apparatus, it does not contribute much to the miniaturization of the apparatus in the height direction therof. In the oblique projection optical system described above, the curved-surface mirrors each have a spherical or aspherical surface symmetrical about a plane, although they have unnecessary portions thereof cut off so as not to hamper miniaturization.

So long as a long optical path length is secured to prevent degradation in imaging performance, it is difficult to achieve miniaturization in the height direction of the screen without sacrificing a certain degree of slimming down. On the other hand, increasing the f-number necessitates a high-output light source to present a bright image.

In an oblique projection optical system, rays of light representing different portions of the image are incident on the screen at greatly varying angles of incidence, causing large distortion in the image on the screen, a problem inevitable with an oblique projection optical system. Moreover, rays of light representing different portions of the image travel greatly varying optical path lengths to reach the screen. This makes it difficult to reduce the f-number while maintaining imaging performance. Furthermore, the projection magnification tends to differ in the directions of the height and width of the image. This imposes restrictions on the aspect ratios of the display device for displaying the image and of the screen. In a rear projection apparatus, the screen is often provided with a Fresnel lens to direct light to the observers. The larger the angle of incidence at which light is incident on the Fresnel lens, the heavier the burden thereon.

It has been proposed to correct distortion by giving an optical power to the mirror immediately preceding the screen. For example, Japanese Patent Application Laid-Open No. 2001-242381 proposes using a large concave mirror with a spherical surface as the mirror immediately preceding the screen. For better imaging performance, it has also been proposed to use a mirror with an aspherical surface as the mirror preceding the mirror immediately preceding the screen and use a mirror with a free-form surface as the further precedent mirror.

However, no conventional oblique projection optical system is quite free from difficulty in enhancing imaging performance, in correcting distortion, or in achieving miniaturization. It is particularly difficult to suppress distortion satisfactorily while reducing the f-number.

SUMMARY OF THE INVENTION

An object of the present invention is to provide an oblique projection optical system that is compact as compared with the size of the image it presents, that offers high imaging performance, that produces satisfactorily small distortion, and that has a small f-number.

To achieve the above object, according to one aspect of the present invention, a projection optical system that directs rays of light from a display surface to a projection surface in such a way that the ray of light from the center of the display surface is obliquely incident on the projection surface in order to form on the projection surface an optical image of an image displayed on the display surface is composed of a plurality of reflection surfaces for successively reflecting the rays of light from the display surface to direct them to the projection surface. Here, when the relative positions of the plurality of reflection surfaces with respect to the projection surface are expressed based on the order in which they reflect the rays of light, of the plurality of reflection surfaces, the one closest to the projection surface is a curved surface and has a size larger than half the size of the projection surface in both of the directions corresponding to the height and width directions of the display surface.

By giving the reflection surface closest to the projection surface a size larger than half the size of the projection surface, it is possible to reduce differences in the angle of incidence at which the rays of light are incident on the projection surface and thereby satisfactorily reduce distortion in the image on the projection surface. It is also possible to reduce the f-number and thereby present a bright image. In addition, by forming the reflection surface closest to the projection surface as a curved surface, it is possible to further reduce differences in the angle of incidence at which the rays of light are incident on the projection surface and thereby more satisfactorily reduce distortion in the image on the projection surface.

Of the plurality of reflection surfaces, the one closest to the projection surface may be given a positive optical power. This makes it possible to reduce differences in the angle of incidence at which the rays of light are incident on the projection surface and thereby satisfactorily reduce distortion in the image on the projection surface. It is also possible to achieve miniaturization (slimming-down) in the direction perpendicular to the projection surface.

Of the plurality of reflection surfaces, the one closest to the projection surface may be a free-form surface. This helps obtain high imaging performance, and permits miniaturization in the directions along the projection surface.

According to another aspect of the present invention, a projection optical system that directs rays of light from a display surface to a projection surface in such a way that the ray of light from the center of the display surface is obliquely incident on the projection surface in order to form on the projection surface an optical image of an image displayed on the display surface is composed of a plurality of reflection surfaces, each having an optical power, for successively reflecting the rays of light from the display surface to direct them to the projection surface. Here, when the relative positions of the plurality of reflection surfaces with respect to the projection surface are expressed based on the order in which they reflect the rays of light, of the plurality of reflection surfaces, the one closest to the projection surface has a positive optical power and has a size larger than half the size of the projection surface in both of the directions corresponding to the height and width directions of the display surface. Moreover, of the plurality of reflection surfaces, the one second closest to the projection surface has a negative optical power. At least one of the reflection surfaces closest and second closest to the projection surface is a free-form surface.

In this oblique projection optical system, of the reflection surfaces having optical powers, the one second closest to the projection surface is given a negative optical power. This makes it possible to reduce the angle of incidence at which the rays of light are incident on the projection surface (i.e., make the rays of light closer to perpendicular to the projection surface). As a result, it is possible to present an image that is evenly bright from the central to the peripheral portion thereof. In a case where the screen disposed on the projection surface is provided with a Fresnel lens, it is possible to reduce the burden on the Fresnel lens. Moreover, of the reflection surfaces having optical powers, the one closest to the projection surface is given a positive optical power. This makes it possible to reduce differences in the angle of incidence at which the rays of light are incident on the projection surface and thereby satisfactorily reduce distortion in the image on the projection surface. It is also possible to achieve miniaturization (slimming-down) in the direction perpendicular to the projection surface.

In addition, of the reflection surfaces having optical powers, the one closest to the projection surface is given a size larger than half the size of the projection surface. This makes it possible to reduce the f-number and thereby present a bright image. Moreover, it is possible to further reduce differences in the angle of incidence at which the rays of light are incident on the projection surface and thereby more satisfactorily reduce distortion in the image on the projection surface. Furthermore, at least one of the mirrors closest and second closest to the projection surface is given a free-form surface. This helps obtain high imaging performance, and permits miniaturization in the directions along the projection surface.

According to still another aspect of the present invention, a projection optical system that directs rays of light from a display surface to a projection surface in such a way that the ray of light from the center of the display surface is obliquely incident on the projection surface in order to form on the projection surface an optical image of an image displayed on the display surface is composed of a plurality of reflection surfaces, each having an optical power, for successively reflecting the rays of light from the display surface to direct them to the projection surface. Here, when the relative positions of the plurality of reflection surfaces with respect to the projection surface are expressed based on the order in which they reflect the rays of light, of the plurality of reflection surfaces, the one closest to the projection surface has a positive optical power and has a size larger than half the size of the projection surface in both of the directions corresponding to the height and width directions of the display surface. Moreover, of the plurality of reflection surfaces, the one second closest to the projection surface has a negative optical power. Moreover, of the plurality of reflection surfaces, the one third closest to the projection surface has a positive optical power. At least two of the reflection surfaces closest, second closest, and third closest to the projection surface are free-form surfaces.

This oblique projection optical system is obtained by providing the oblique projection optical system described above additionally with a mirror having a free-form surface. This helps obtain higher imaging performance and achieve further miniaturization.

In either of the two oblique projection optical systems described just above, the construction may be such that the display surface is smaller in the height direction thereof than in the width direction thereof, that the plurality of reflection surfaces each reflect the rays of light from the display surface in such a way as to deflect them in the height direction of the display surface, and that the following conditions are fulfilled:

$$Fnoy \geq Fnoz,$$

$$Fnoy \leq 4.5, \text{and}$$

$$Fnoz \leq 4.0$$

where

Fnoy represents the f-number in the direction corresponding to the height direction of the display surface; and Fnoz represents the f-number in the direction corresponding to the width direction of the display surface.

By making the reflection surfaces each reflect the rays of light from the display surface in such a way as to deflect them in the height direction of the display surface, it is possible to reduce the maximum dimension in the directions along the projection surface. By setting the f-numbers to fulfill the above conditions, it is possible to present a bright image.

The construction may be such that the display surface is smaller in the height direction thereof than in the width direction thereof, that the plurality of reflection surfaces each reflect the rays of light from the display surface in such a way as to deflect them in the height direction of the display surface, and that the following condition is fulfilled:

$$D/H \leq 0.35$$

where

H represents the size of the projection surface in the direction corresponding to the height direction of the display surface; and D represents the maximum length of the space through which the rays of light pass to travel from the display surface to the projection surface, as measured along the direction normal to the display surface.

This helps make the optical system slim as compared with the image it presents.

Here, the following condition may additionally be fulfilled:

$$30 \leq \beta \leq 100$$

where

β represents the ratio of the size of the projection surface to the size of the display surface.

If β, which represents the magnification at which the image is enlarged by projection, is lower than 30, spatially adjacent reflection surfaces need to be brought apart from each other in the direction perpendicular to the projection surface to prevent interference between them. On the other hand, if β is higher than 100, it is difficult to obtain satisfactory high imaging performance. Thus, fulfilling the above condition makes it possible to achieve miniaturization while maintaining high imaging performance.

The construction may be such that the entrance pupil is located at infinity. This makes the optical system telecentric, resulting in high imaging performance and easy designing.

BRIEF DESCRIPTION OF THE DRAWINGS

This and other objects and features of the present invention will become clear from the following description, taken in conjunction with the preferred embodiments with reference to the accompanying drawings in which:

FIG. 1A is a sectional view, on the x-y plane, of the projection optical system of Example 1 of the invention;

FIG. 1B is a side view, as seen from the z direction, of the projection optical system of Example 1;

FIG. 14A is a sectional view, on the x-y plane, of the projection optical system of Example 4 of the invention;

FIG. 14B is a side view, as seen from the z direction, of the projection optical system of Example 4;

FIG. 18A is a sectional view, on the x-y plane, of the projection optical system of Example 5 of the invention;

FIG. 18B is a side view, as seen from the z direction, of the projection optical system of Example 5;

FIG. 26A is a sectional view, on the x-y plane, of the projection optical system of Example 7 of the invention;

FIG. 26B is a side view, as seen from the z direction, of the projection optical system of Example 7;

FIG. 34A is a sectional view, on the x-y plane, of the projection optical system of Example 9 of the invention;

FIG. 34B is a side view, as seen from the z direction, of the projection optical system of Example 9;

DESCRIPTION OF THE PREFERRED EMBODIMENTS

Figure 2:
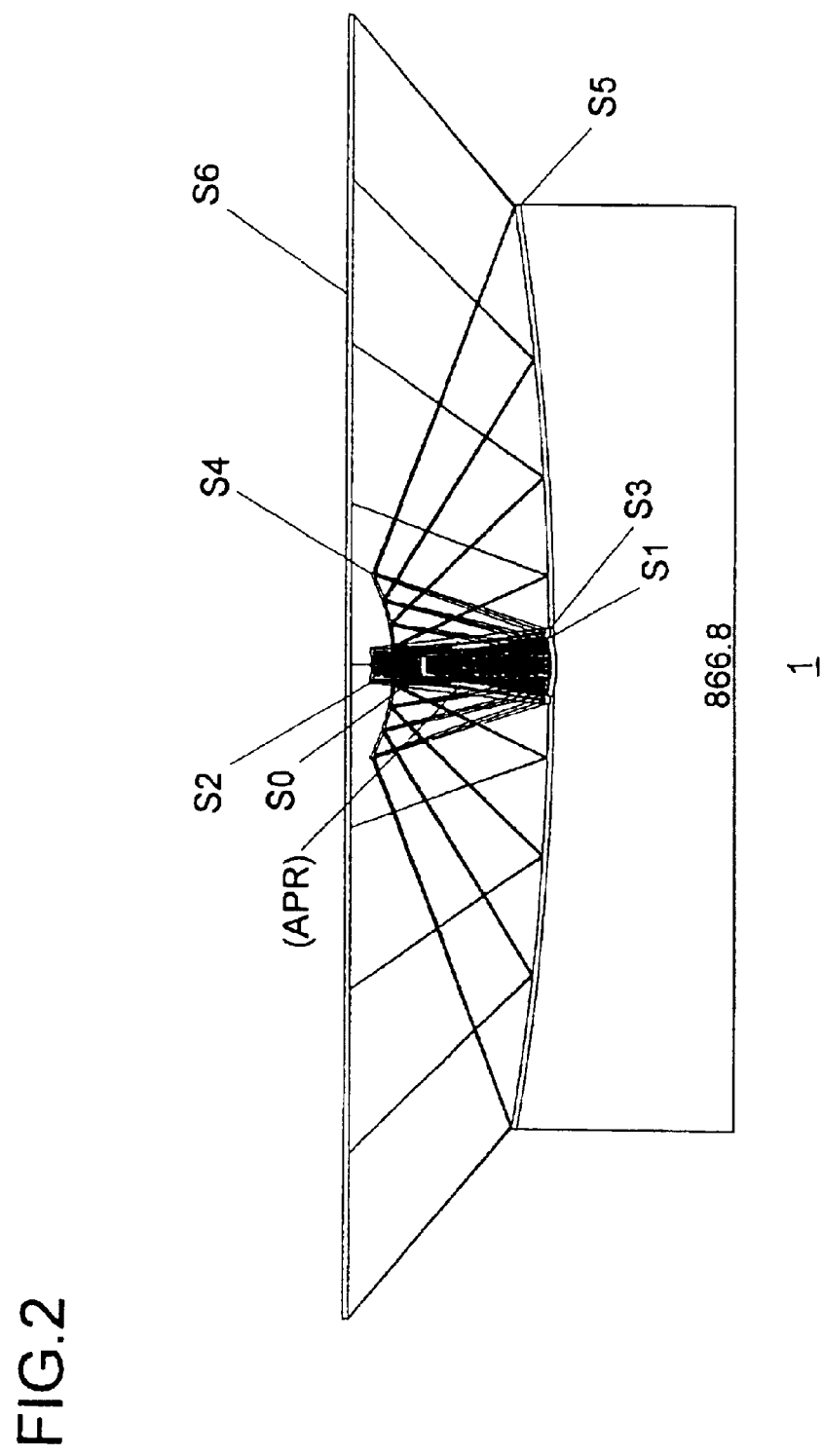
FIG. 2 is a top view, as seen from the y direction, of the projection optical system of Example 1.

Hereinafter, examples of oblique projection optical systems according to the present invention will be described with reference to the accompanying drawings and tables. Presented below are nine practical examples, called Examples 1 to 9 respectively, for which specific values are given as their construction data and related data. The oblique projection optical systems 1 to 9 of Examples 1 to 9 are all composed of five curved-surface mirrors having optical powers, and are all so constructed that rays of light from a display surface (flat surface), which is longer in its width direction than in its height direction, is reflected successively from the individual mirrors so as to be deflected in the height direction of the display surface so that the rays of light are directed to a projection surface (flat surface) so as to converge thereon to form (project), in a rectangular area thereon substantially similar in shape to the display surface, an enlarged image of the image displayed on the display surface. By disposing on the display surface an image display device that displays an image and emits light representing it, and disposing on the projection surface a screen, it is possible to obtain a rear projection apparatus.

In each example, the display surface is represented by S0, the projection surface is presented by S6 and the reflection surfaces of the individual mirrors are represented by S1 to S5 in the order in which they receive the light from the display surface S0 (i.e., in order of increasing distance from the display surface S0). APR represents an aperture surface.

In any of Examples 1 to 9, the oblique projection optical system includes reflection surfaces having free-form surfaces as part or all of the powered reflection surfaces S1 to S5, and exhibits symmetry about a plane, but has no optical axis that is valid throughout the optical system. Thus, it is not appropriate to define the surfaces S0 to S6 in a coordinate system established with reference to an optical axis. Instead, a local coordinate system is established for each of the surfaces S0 to S6 within an absolute coordinate system, and the surfaces S0 to S6 are defined in their respective local coordinate systems. Then, the whole optical system is defined by the positions and directions of the individual local coordinate systems in the absolute coordinate system.

The absolute and local coordinate systems are all rectangular coordinate systems, the absolute coordinate system having x-, y-, and z-axes as its coordinate axes and each local coordinate system having X-, Y-, and Z-axes as its coordinate axes. All lengths are given in mm. The absolute coordinate system has its origin at the center of the display surface S0, and has its x-, y-, and z-axes respectively along the direction normal to, along the height direction of, and along the width direction of the display surface S0. All local coordinate systems have their origins on the x-y plane of the absolute coordinate system. Unit vectors along the X-, Y-, and Z-axes in each local coordinate system are represented by VX, VY, and VZ, which are then defined in the absolute coordinate system to define the directions of the local coordinate system in the absolute coordinate system. The Z-axis of each local coordinate system is parallel to the z-axis of the absolute coordinate system, and therefore the X-Y plane coincides with the x-y plane. The surfaces S0 to S6 are each symmetric about the X-Y plane of the corresponding local coordinate system, and the whole coordinate system is symmetric about the x-y plane of the absolute coordinate system.

The surfaces S0 to S6 are each defined by the formula of an extended aspherical surface ES below.

$$X = \frac{C_0 \cdot H^2}{1 + (1 - \varepsilon \cdot C_0^2 \cdot H^2)^{1/2}} + \sum_i A_i \cdot H^i + \sum_{j,k} B_{jk} \cdot Y^j \cdot Z^k \quad \text{(ES)}$$

In this formula, $C_0$ represents the curvature at the vertex (the intersection with the X-axis), taking a positive value when the center of the curvature is located on the positive X side of the vertex; $\varepsilon$ represents the conic constant; i, j, and k each represent an integer number equal to or greater than 0; and $H^2 = Y^2 + Z^2$. Ai represents the coefficient for the term that includes H to the power of i, and $B_{jk}$ represents the coefficient for the term that includes Y to the power of j and Z to the power of k. In each example, terms including H to the power i of up to 12 are considered, and terms including Y and Z to the power j+k of 10 are considered. In the presentation of each example, the values of the coefficients Ai and Bjk are given, but those of which the value equals 0 are omitted.

EXAMPLE 1

FIGS. 1A, 1B, 2, and 3 show the construction and optical path of the oblique projection optical system 1 of Example 1, and Tables 3 to 10 show the construction data thereof. Tables 3 to 10 each list the data of the surface referred to by the symbol noted at the top of the table. N0 and N1 respectively represent the refractive indices of the media before incidence and after incidence (i.e., after reflection) on a surface. "Position" indicates the position of the origin of the corresponding local coordinate system in the absolute coordinate system. In Table 5, which lists the data of the aperture surface APR, R represents the radius of the aperture stop.

It is to be noted that, also in the other examples described later, what their construction data represents is the same as with Tables 3 to 10.

FIG. 1A is a sectional view taken along the x-y plane, and shows the surfaces S0 to S6 together with, among the rays emanating from the width-direction center of the display surface S0, five rays, i.e., two emanating from both height-direction ends (end points) of the display surface S0 and three emanating from the three points that divide the line between those ends into four equal parts. The value "530.5" represents the height-direction dimension of the area on the reflection surface S5 in which the rays emanating from the width-direction center of the display surface S0 are incident, i.e., the height-direction (y-direction) length of the reflection surface S5 at the width-direction center thereof.

FIG. 1B is a side view as seen from the z direction, and shows, in a form superposed on the five rays mentioned above, among the rays emanating from both width-direction ends of the display surface S0, those emanating from the same points in the height direction of the display surface S0 as described above. Here, the surfaces are not marked with their symbols S0 to S6. The value "684.9" represents the height-direction dimension of the area on the projection surface S6 in which the rays emanating from the display surface S0 are incident, i.e., the height-direction (y-direction) length of the projection surface S6. The value "365.4" represents the height-direction (y-direction) length of the portion, located below the bottom end of the projection surface S6 of the entire space through which light passes to travel from the display surface S0 to projection surface S6. The value "182.4" represents the maximum length, in the direction normal to the display surface S0 (in the x direction), of the space through which light passes to travel from the display surface S0 to projection surface S6.

Figure 3:
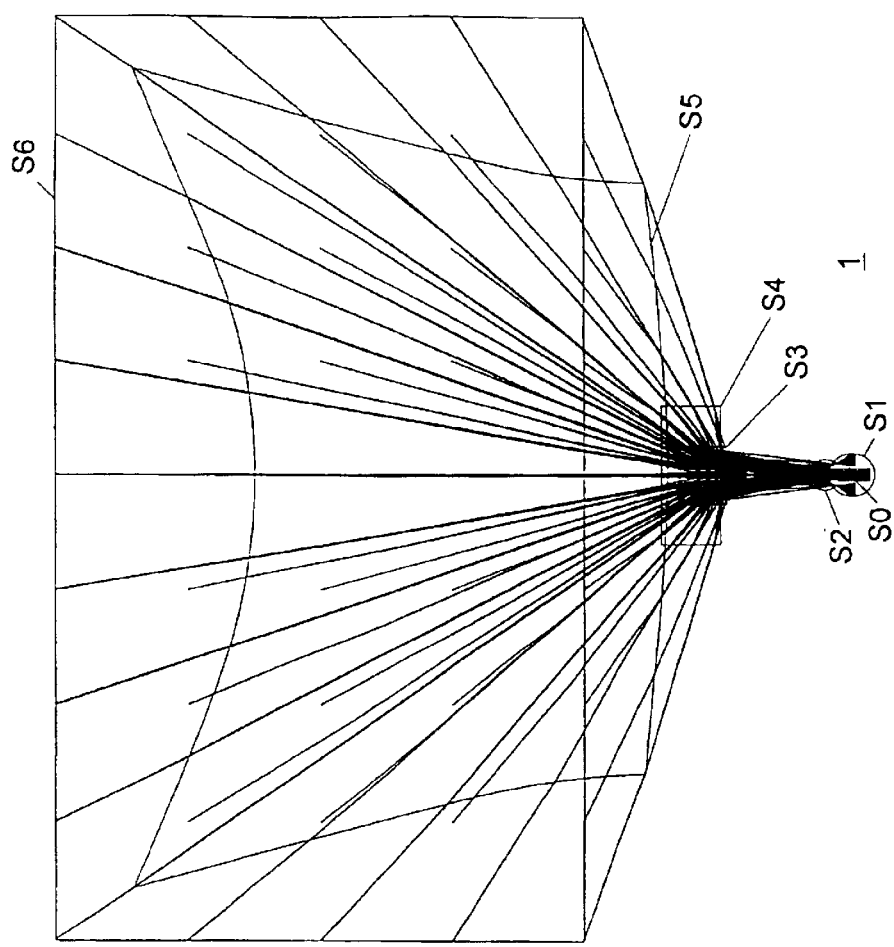
FIG. 3 is a front view, as seen from the x direction, of the projection optical system of Example 1.

FIG. 2 is a top view as seen from the y direction, and shows the surfaces S0 to S6 together with, among the rays emanating from the height-direction center of the display surface S0, nine rays, i.e. two emanating from both width-direction ends of the display surface S0 and seven emanating from the seven points that divide the line between those ends into eight equal parts. The value "866.8" represents the width-direction dimension of the area on the reflection surface S5 in which the rays emanating from the height-direction center of the display surface S0 are incident, i.e., the width-direction (z-direction) length of the reflection surface S5 neat the height-direction center thereof. FIG. 3 is a front view as seen from the x direction, and shows the surfaces S0 to S6 together with, among the rays emanating from both height-direction ends (end lines) of the display surface S0 and from three lines that divide the area between those ends into four equal parts, 45 rays in total, i.e., for each of these five lines, two emanating from both width-direction ends of the display surface S0 and seven emanating from the seven points that divide the line between those ends into eight equal parts.

Figure 4:
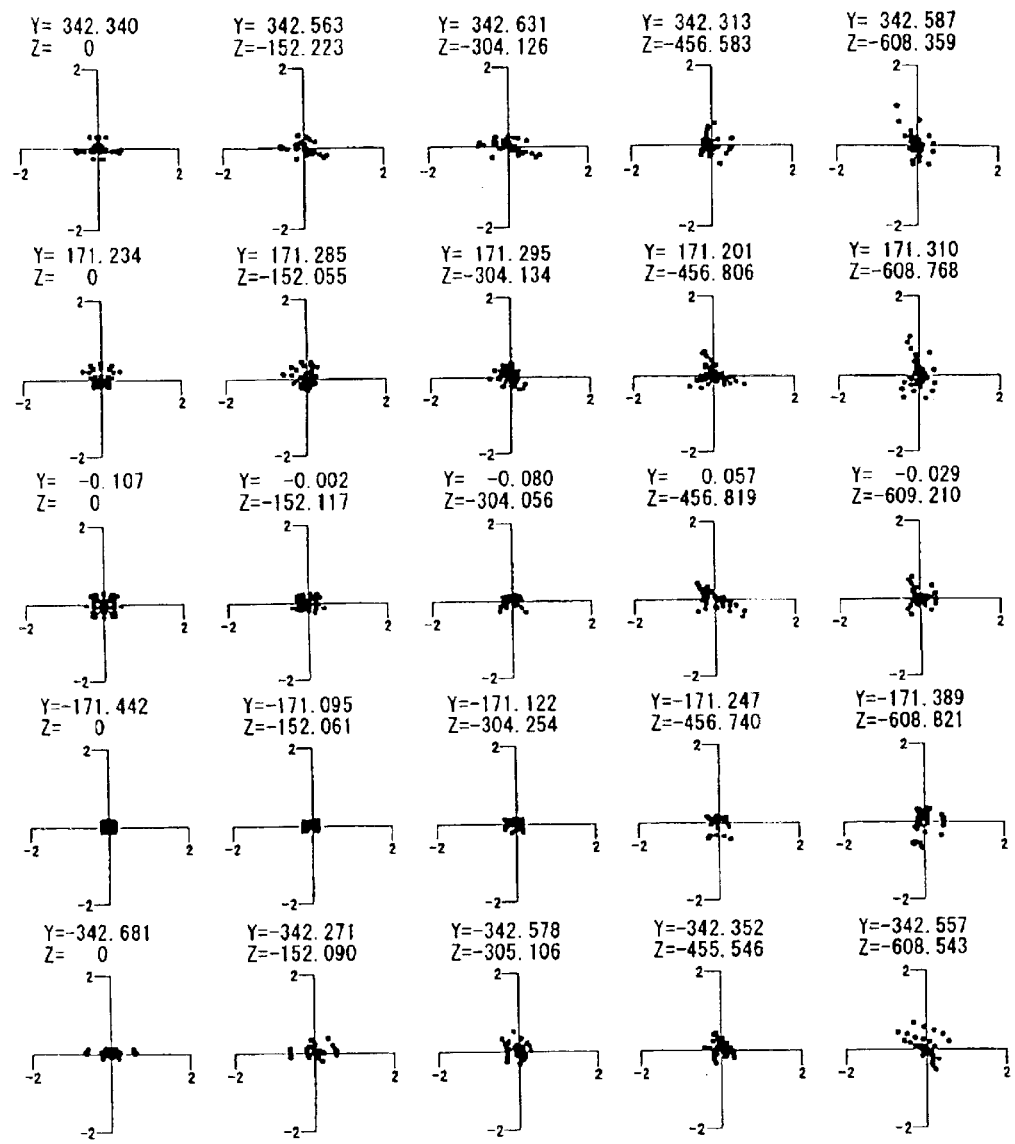
FIG. 4 is a spot diagram obtained on the projection surface of the projection optical system of Example 1.

FIG. 4 shows a spot diagram obtained on the projection surface S6 more specifically, near the intersections between, on the one hand, both height-direction ends (end lines) of the projection surface S6 and the lines that divide the area between those ends into four equal parts and, on the other hand, both width-direction ends (end lines) of the projection surface S6 and the lines that divide the area between those ends into eight equal parts. These intersections correspond to the origins of the coordinate axes shown in the individual sections of the diagram. Since the optical system is symmetric in the width direction (the z direction), the obtained results are shown for only half of the projection surface S6. That is, FIG. 4 is a diagram for 25 among the 45 rays shown in FIG. 3, and the third-from-the-above, leftmost section of the diagram shows the results obtained near the center of the projection surface S6. In each section of the diagram, spots represent the positions in which different rays belonging to an identical beam of light are incident. Above each section of the diagram are noted the coordinates (in the local coordinate system) of the center of the incident positions of all the rays belonging to an identical beam. The values ±2 noted by the coordinate axes in each section of the diagram represent the distances from the origin of those coordinate axes.

Figure 5:
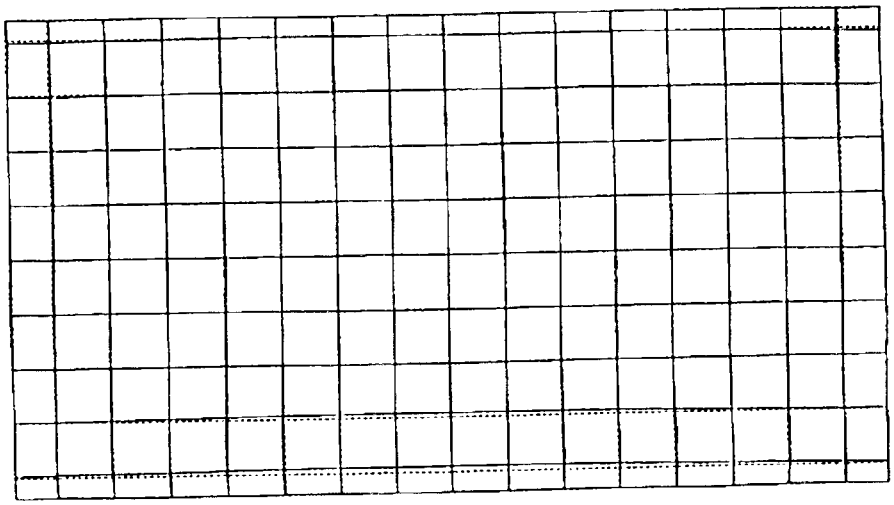
FIG. 5 is a diagram showing the distortion observed on the projection surface of the projection optical system of Example 1.

FIG. 5 shows the distortion of the image observed on the projection surface S6. In this figure, solid lines represent the results obtained with the oblique projection optical system 1, and broken lines represent the ideal result without distortion.

It is to be noted that, also in the other examples described later, what their sectional view, side view, top view, spot diagram, and distortion diagram represent is the same as with FIGS. 1A, 1B, 2, 4, and 5.

As shown in Tables 4 to 9, in the oblique projection optical system 1 of this example, the reflection surface S1 is a spherical surface, the reflection surfaces S2, S3, and S4 are free-form surfaces, and the reflection surface S5 is a spherical surface. The aperture surface APR is located between the reflection surface S1 and the reflection surface S2. As shown in Tables 3 and 10, the display surface S0 and the projection surface S6 which are flat surfaces, are parallel to each other.

Table 1 shows the magnifications factors (the projection magnification factors) by which an image is magnified when projected, the sizes of the display surface S0, the projection surface S6 and the reflection surface S5 closest to the projection surface S6 (i.e. the sizes of the areas in which the image is displayed and projected and through which rays of light pass), the angles of incidence at which rays are incident on the projection surface S6 and the position of the entrance pupil of the beam from the display surface S0 as observed in this example, together with the same data as observed in the other examples. Here, the sizes of the display surface S0, the projection surface S6 and the reflection surface S5 are given in half values. The size of the reflection surface S5 is given as its dimensions measured at locations described in connection with FIGS. 1A and 2, i.e., its height-direction dimension as measured at its width-direction center and its width-direction dimension as measured near its height-direction center. The position of the entrance pupil is given as coordinate values in the local coordinate system of the display surface S0, and, since X is infinite here, Y is given as an angle.

The magnification factors are those observed from the center of the display surface S0 to the center of the projection surface S6 with $\beta(Y)$ representing the height-direction (Y-and thus y-direction) magnification factor, and with $\beta(Z)$ representing the width-direction (Z-and thus z-direction) magnification factor. The magnification factor $\beta$ calculated as the ratio of the size of the projection surface S6 to the size of the display surface S0 is approximately equal to those listed in the table. The height- and width-direction magnification factors $\beta(Y)$ and $\beta(Z)$ are almost equal to each other, and the slight difference between them is given under "Anamo(Y/Z)." It is to be noted that the reason that the width-direction magnification factor $\beta(Z)$ takes a negative value is that the Z-axis of the local coordinate system points in the opposite direction in one, as compared with the next, of the reflection surfaces S1 to S5.

In the oblique projection optical system 1, the height- and width-direction magnification factors $\beta(Y)$ and $\beta(Z)$ are 78.58 and 78.56 respectively. The ratio of the height-direction dimension of the reflection surface S5 at its width-direction center to the height-direction (y-direction) dimension of the projection surface S6 is 0.775, and the ratio of the width-direction dimension of the reflection surface S5 near its height-direction center to the width-direction (z-direction) dimension of the projection surface S6 is 0.712. As will be clear from FIG. 3, the height-direction dimension of the reflection surface S5 is at its maximum at both width-direction ends thereof, and the width-direction dimension thereof is at is maximum at the height-direction top end thereof.

Rays of light are incident on the projection surface S6 at the minimum angle of incidence (30.84°) at the width-direction center at the height-direction bottom end thereof, at the maximum angle of incidence (60.00°) at both width-direction ends (i.e., at the right-hand and left-hand ends) at the height-direction top end thereof, and at an angle of incidence of 54.28° at the center thereof. The entrance pupil is located at infinity on a line normal to the center of the display surface S0, making the optical system a telecentric optical system. The ratio of the height-direction length to the width-direction length of the projection surface S6 is 9:16.

Table 2 shows the f-numbers, the thickness D of the optical path, the height-direction length H of the projection surface S6 the ratio of the thickness D of the optical path to the length H of the projection surface S6 the height-direction length Hb of the lower region of the optical path, the ratio of the height-direction length Hb of the lower region of the optical path to the height-direction length (H+Hb) of the entire optical path, the shapes of the powered reflection surfaces S1 to S5 and the signs of their optical powers as observed in this example, together with the same data as observed in the other example. Here, the f-numbers are effective f-numbers calculated from the diameter and position of the entrance pupil. Fnoy represents the height-direction f-number in the height direction of the display surface S0, and Fnoz represents the f-number in the width direction thereof.

The thickness D of the optical path is, as described in connection with FIG. 1B, the maximum length, in the direction normal to the display surface S0 (i.e. in the X and thus x direction), of the space through which light passes to travel from the display surface S0 to projection surface S6.

The symbols "sp," "asp," and "exasp" respectively denote spherical, aspherical, and free-form surfaces. A plus sign "+" in parentheses denotes a concave surface having a positive optical power, a minus sign "−" in parentheses denotes a convex surface having a negative optical power, and a zero "0" in parentheses denotes a surface having no optical power. For a free-form surface, its Y- and Z-direction optical powers are given on the left and right of a slash "/" respectively. Here, the optical powers of the reflection surfaces S1 to S5 depend on the surface shape thereof at the point at which the ray that travels from the center of the display surface S0 through the center of the aperture surface APR to the projection surface S6 passes therethrough, and not on the sign of the curvature $C_0$ in formula (ES) noted earlier by which the curved surfaces are defined.

In the oblique projection optical system 1, the height- and width-direction f-numbers Fnoy and Fnoz are both 2.90. The thickness D of the optical path is defined by the projection surface S6 and the bottom ends of both width-direction ends of the reflection surface S3 (see FIG. 1B), and the ratio D/H of the thickness of the optical path to the height-direction length of the projection surface S6 is 0.266. The lowest end of the optical path is defined by the bottom end of the width-direction center of the reflection surface S1, and the ratio Hb/(H+Hb) of the height-direction length of the lower region of the optical path to that of the entire optical path is 0.348. The five reflection surfaces S1 to S5 have, from the display surface S0 side, a positive, a negative, a negative, a negative, and a positive optical power. Thus, the reflection surface S5 closest to the projection surface S6 has a positive optical power, and the reflection surface S4 preceding them has a negative optical power.

EXAMPLE 2

Figure 6A:
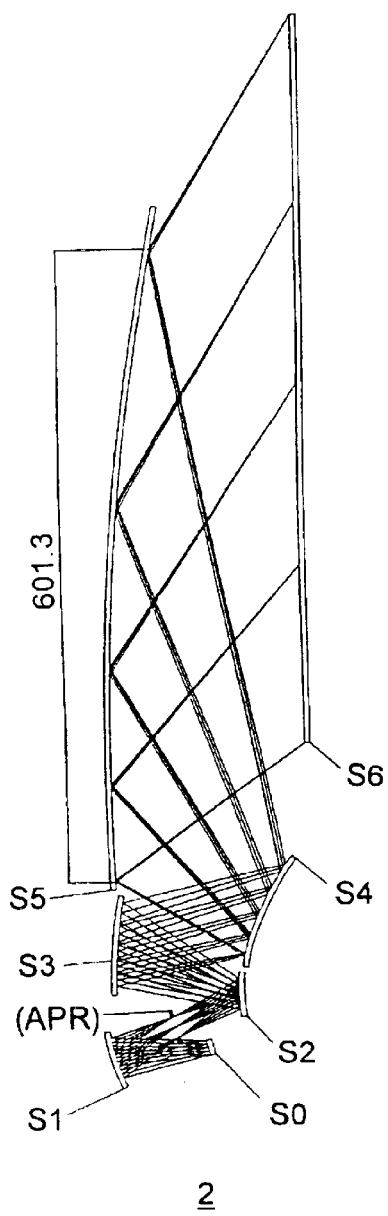
FIG. 6A is a sectional view, on the x-y plane, of the projection optical system of Example 2 of the invention.
Figure 6B:
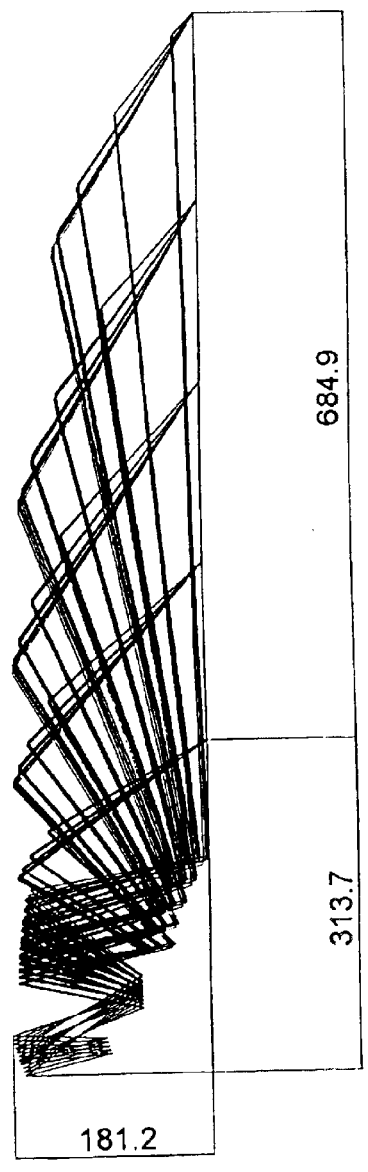
FIG. 6B is a side view, as seen from the z direction, of the projection optical system of Example 2.
Figure 7:
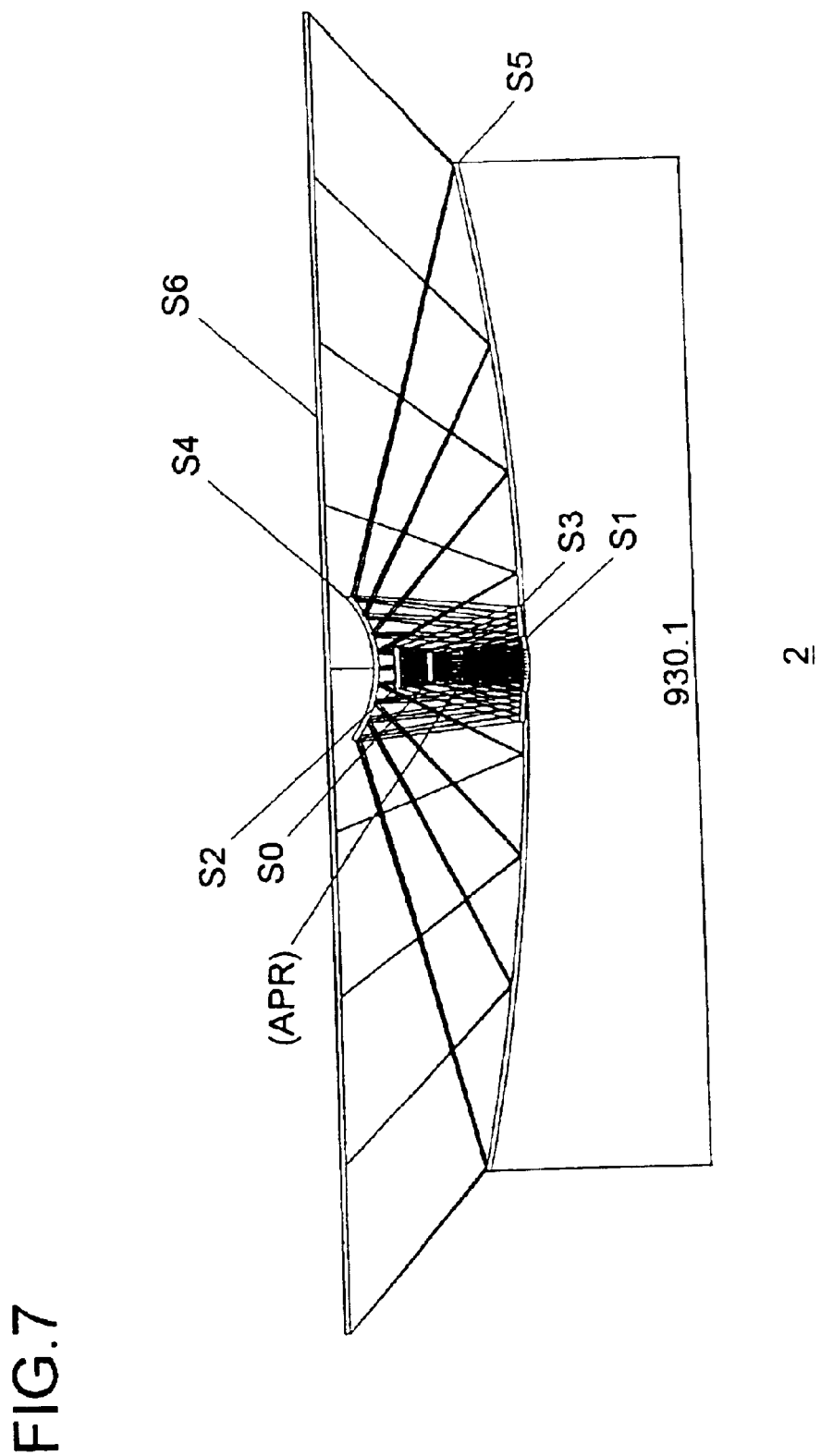
FIG. 7 is a top view, as seen from the y direction, of the projection optical system of Example 2.
Figure 8:
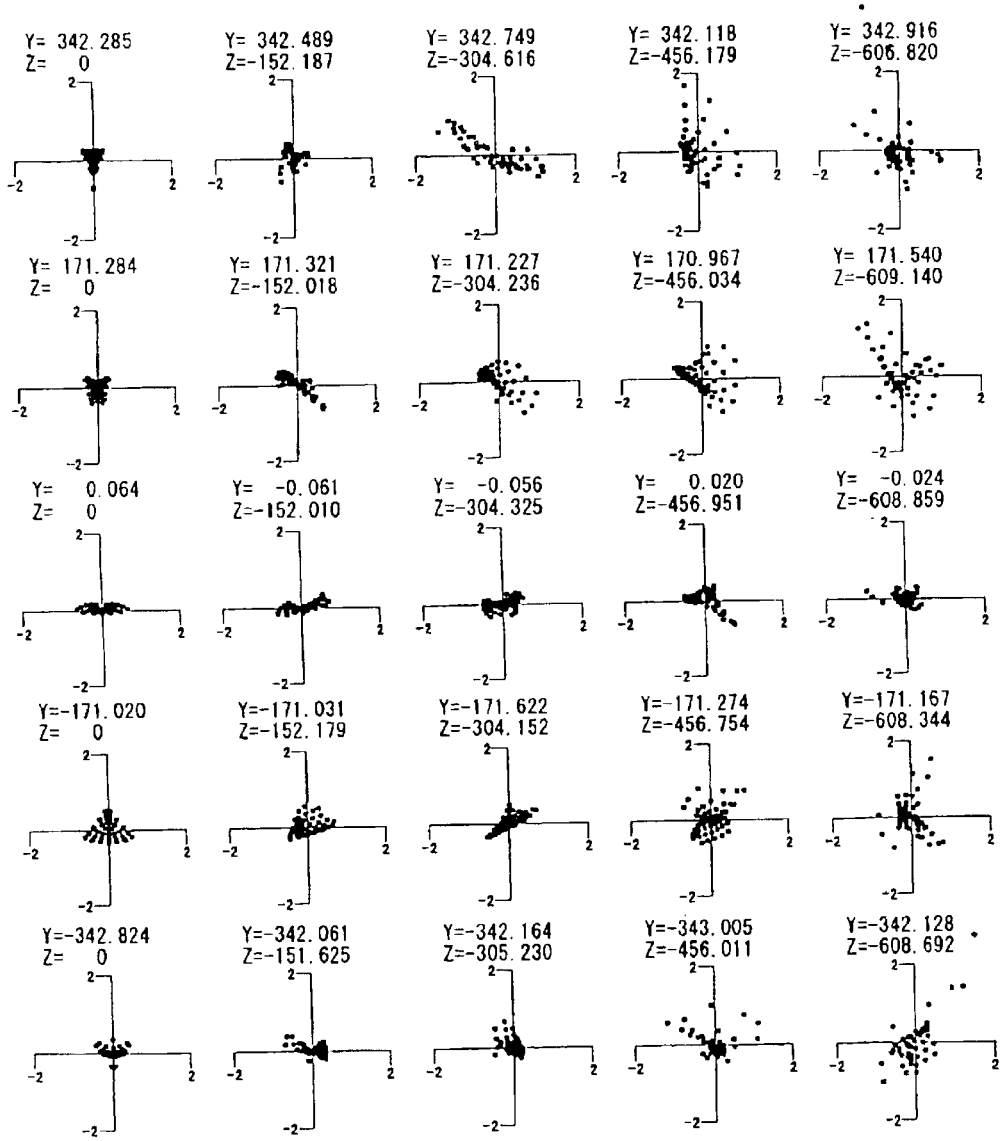
FIG. 8 is a spot diagram obtained on the projection surface of the projection optical system of Example 2.
Figure 9:
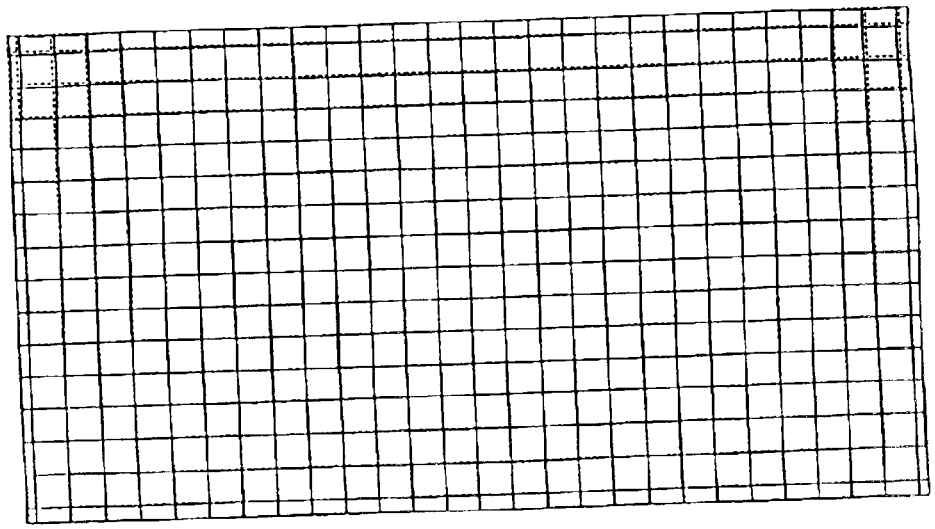
FIG. 9 is a diagram showing the distortion observed on the projection surface of the projection optical system of Example 2.

FIGS. 6A, 6B, and 7 show a sectional view, a side view, and a top view, respectively, of the oblique projection optical system 2 of Example 2, and Tables 11 to 18 show the construction data thereof. FIG. 8 shows a spot diagram obtained on the projection surface S6 and FIG. 9 shows the distortion of the image observed on the projection surface S6. As will be clear from Table 18, the projection surface S6 is not completely parallel to the display surface S0.

As shown in Table 1, the height- and width-direction magnification factors $\beta(Y)$ and $\beta(Z)$ are 45.84 and 45.82 respectively. The ratio of the height-direction dimension of the reflection surface S5 at its width-direction center to the height-direction dimension of the projection surface S6 is 0.878, and the ratio of the width-direction dimension of the reflection surface S5 near its height-direction center to the width-direction dimension of the projection surface S6 is 0.764. Rays of light are incident on the projection surface S6 at the minimum angle of incidence (36.28°) at the width-direction center at the height-direction bottom end thereof, at the maximum angle of incidence (58.55°) at both width-direction ends at the height-direction top end thereof, and at an angle of incidence of 57.11° at the center thereof. The entrance pupil is located at infinity, making the optical system an oblique telecentric optical system.

As shown in Table 2, the height- and width-direction f-numbers Fnoy and Fnoz are 3.51 and 3.45 respectively. The thickness D of the optical path is defined by the top end of the projection surface S6 and the top end of the width-direction center of the reflection surface S1 (see FIG. 6B), and the ratio D/H of the thickness of the optical path to the height-direction length of the projection surface S6 is 0.265. The lowest end of the optical path is defined by the bottom end of the width-direction center of the reflection surface S1, and the ratio Hb/(H+Hb) of the height-direction length of the lower region of the optical path to that of the entire optical path is 0.314. The five reflection surfaces S1 to S5 have, from the display surface S0 side, a positive, a negative, a positive, a negative, and a positive optical power. Thus, the reflection surface S5 closest to the projection surface S6 has a positive optical power, the reflection surface S4 preceding them has a negative optical power, and the further precedent reflection surface S3 has a positive optical power. The reflection surface S1 closest to the display surface S0 and the reflection surface S5 closest to the projection surface S6 are spherical surfaces, and the other three reflection surfaces S2 S3 and S4 are free-form surfaces.

EXAMPLE 3

Figure 10A:
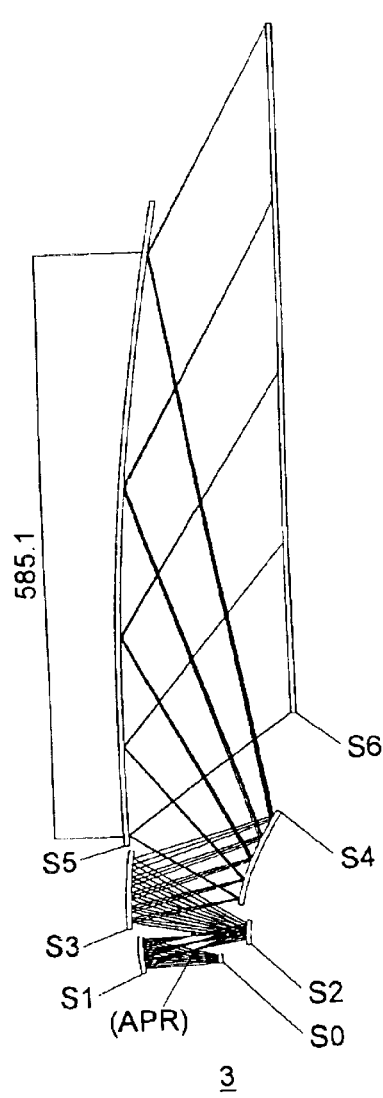
FIG. 10A is a sectional view, on the x-y plane, of the projection optical system of Example 3 of the invention.
Figure 10B:
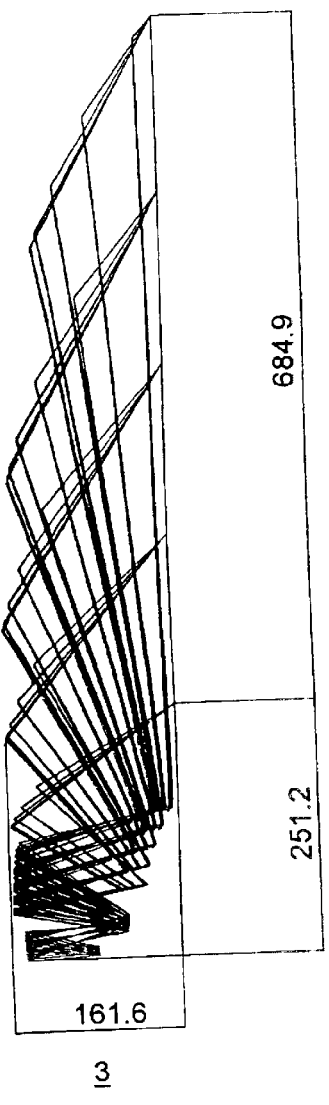
FIG. 10B is a side view, as seen from the z direction, of the projection optical system of Example 3.
Figure 11:
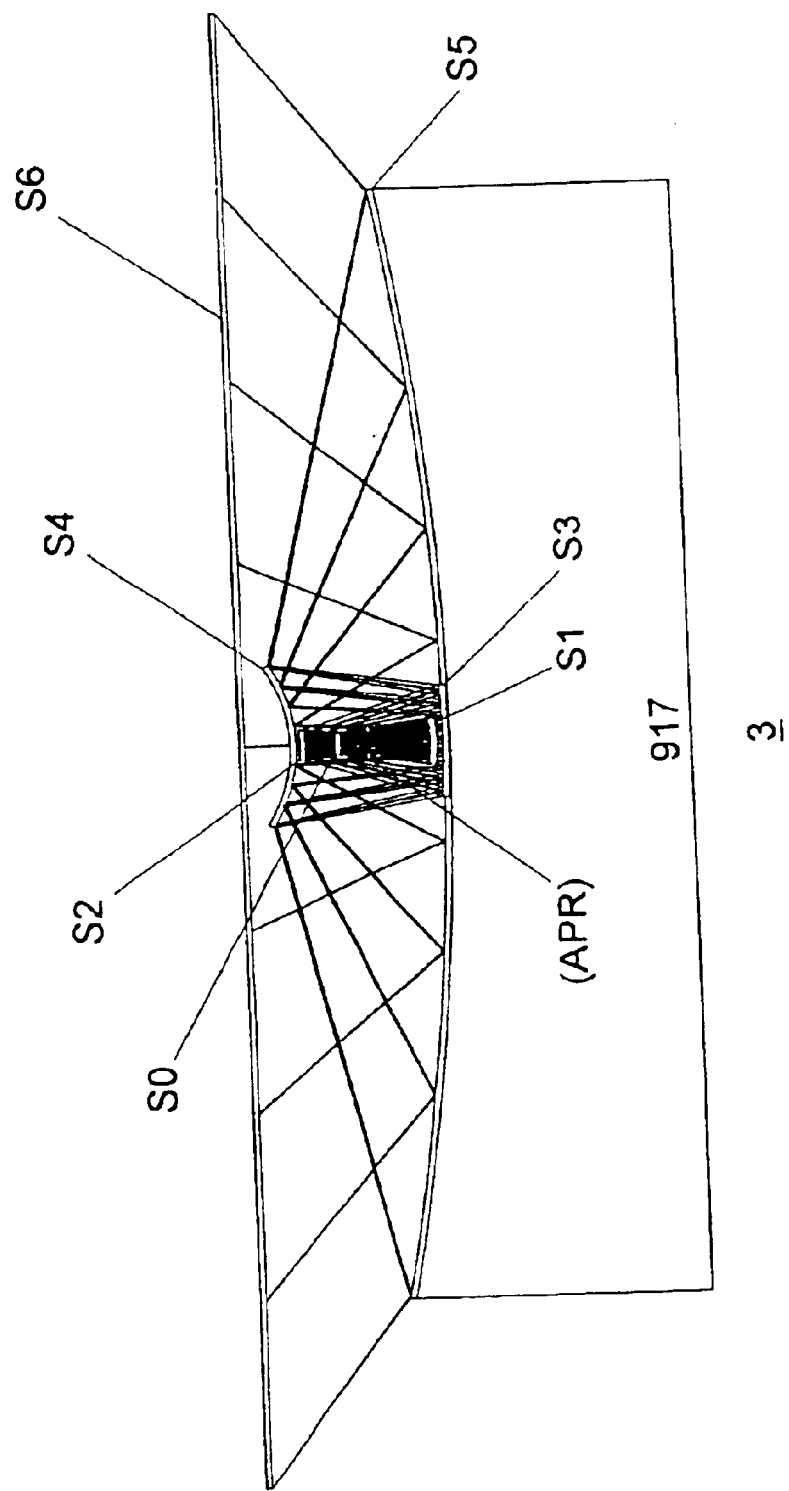
FIG. 11 is a top view, as seen from the y direction, of the projection optical system of Example 3.
Figure 12:
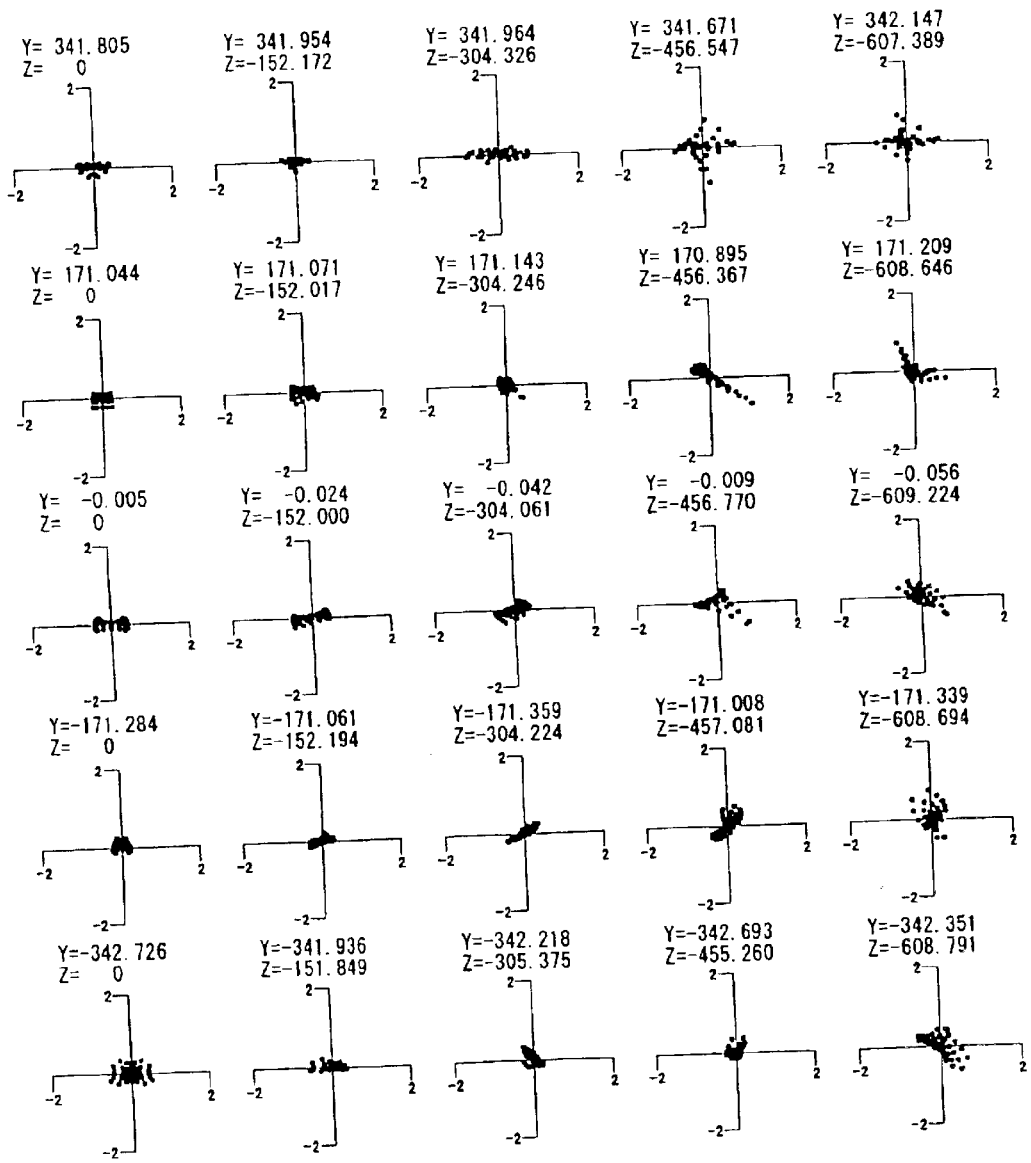
FIG. 12 is a spot diagram obtained on the projection surface of the projection optical system of Example 3.
Figure 13:
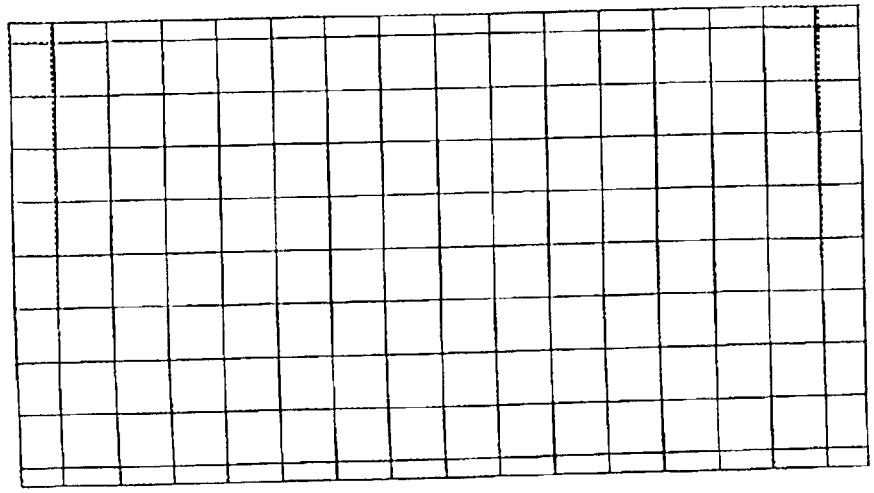
FIG. 13 is a diagram showing the distortion observed on the projection surface of the projection optical system of Example 3.

FIGS. 10A, 10B, and 11 show a sectional view, a side view, and a top view, respectively, of the oblique projection optical system 3 of Example 3, and Tables 19 to 26 show the construction data thereof. FIG. 12 shows a spot diagram obtained on the projection surface S6 and FIG. 13 shows the distortion of the image observed on the projection surface S6. As will be clear from Table 26, the projection surface S6 is not completely parallel to the display surface S0.

As shown in Table 1, the height- and width-direction magnification factors $\beta(Y)$ and $\beta(Z)$ are 78.54 and 78.55 respectively. The ratio of the height-direction dimension of the reflection surface S5 at its width-direction center to the height-direction dimension of the projection surface S6 is 0.854, and the ratio of the width-direction dimension of the reflection surface S5 near its height-direction center to the width-direction dimension of the projection surface S6 is 0.753. Rays of light are incident on the projection surface S6 at the minimum angle of incidence (36.43°) at the width-direction center at the height-direction bottom end thereof, at the maximum angle of incidence (61.12°) at both width-direction ends at the height-direction top end thereof, and at an angle of incidence of 58.66° at the center thereof. The entrance pupil is located at infinity, making the optical system an oblique telecentric optical system.

As shown in Table 2, the height- and width-direction f-numbers Fnoy and Fnoz are 3.51 and 3.45 respectively. The thickness D of the optical path is defined by the top end of the projection surface S6 and a lower portion of the width-direction center of the reflection surface S5 (see FIG. 10B), and the ratio D/H of the thickness of the optical path to the height-direction length of the projection surface S6 is 0.236. The lowest end of the optical path is defined by the bottom end of the width-direction center of the reflection surface S1, and the ratio Hb/(H+Hb) of the height-direction length of the lower region of the optical path to that of the entire optical path is 0.268. The five reflection surfaces S1 to S5 have, from the display surface S0 side, a positive, a negative, a positive, a negative, and a positive optical power. Thus, the reflection surface S5 closest to the projection surface S6 has a positive optical power, the reflection surface S4 preceding them has a negative optical power, and the further precedent reflection surface S3 has a positive optical power. The reflection surface S1 closest to the display surface S0 and the reflection surface S5 closest to the projection surface S6 are spherical surfaces, and the other three reflection surfaces S2 S3 and S4 are free-form surfaces.

EXAMPLE 4

Figure 15:
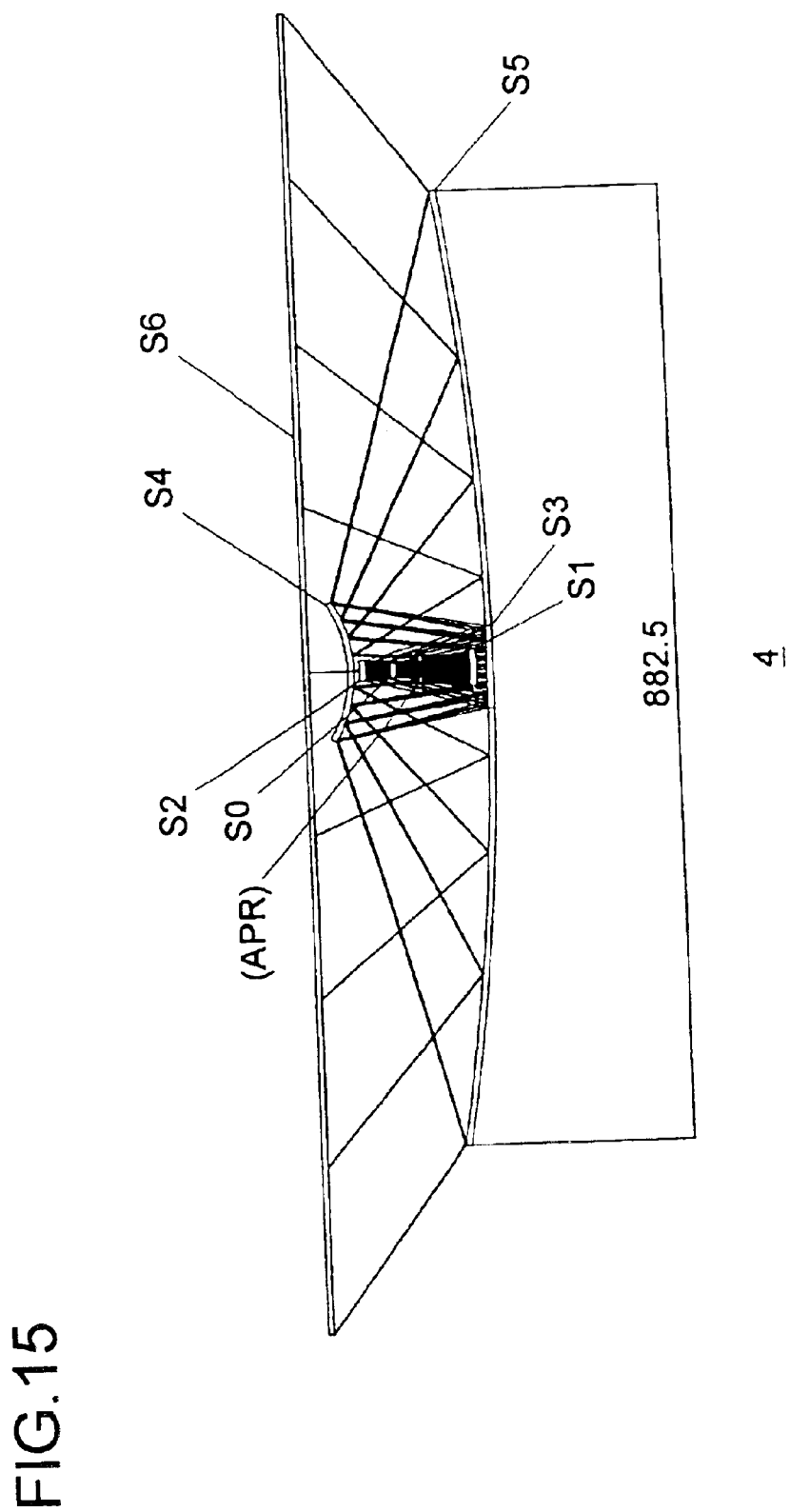
FIG. 15 is a top view, as seen from the y direction, of the projection optical system of Example 4.
Figure 16:
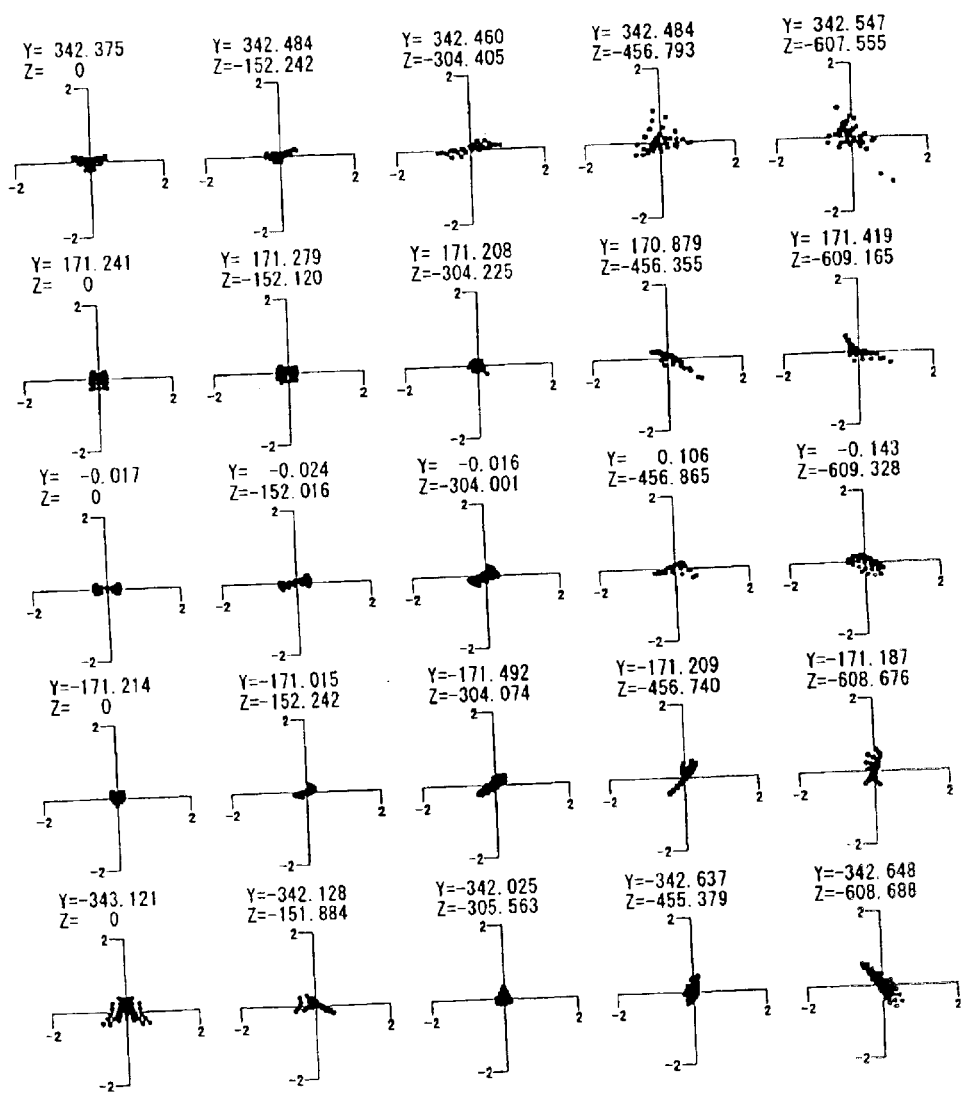
FIG. 16 is a spot diagram obtained on the projection surface of the projection optical system of Example 4.
Figure 17:
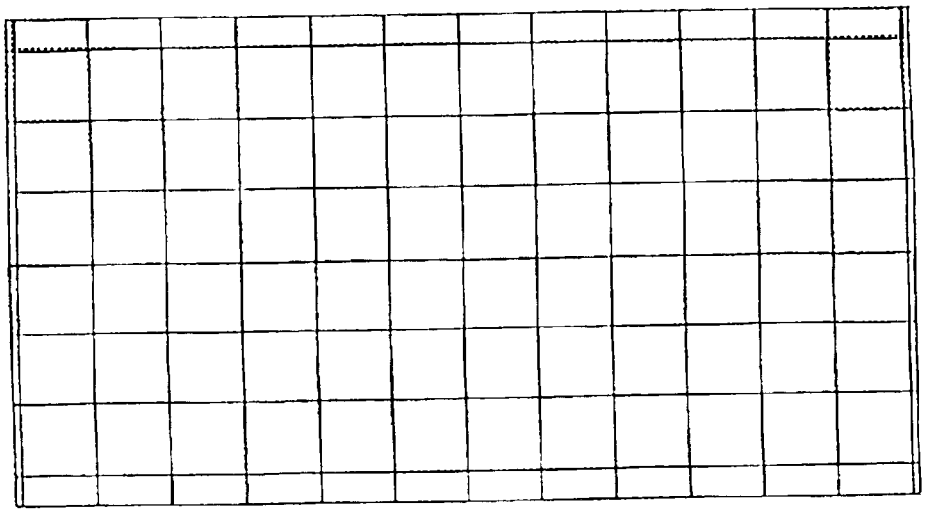
FIG. 17 is a diagram showing the distortion observed on the projection surface of the projection optical system of Example 4.

FIGS. 14A, 14B, and 15 show a sectional view, a side view, and a top view, respectively, of the oblique projection optical system 4 of Example 4, and Tables 27 to 34 show the construction data thereof. FIG. 16 shows a spot diagram obtained on the projection surface S6 and FIG. 17 shows the distortion of the image observed on the projection surface S6. As will be clear from Table 34, the projection surface S6 is not completely parallel to the display surface S0.

As shown in Table 1, the height- and width-direction magnification factors $\beta(Y)$ and $\beta(Z)$ are 100.01 and 99.98 respectively. The ratio of the height-direction dimension of the reflection surface S5 at its width-direction center to the height-direction dimension of the projection surface S6 is 0.811, and the ratio of the width-direction dimension of the reflection surface S5 near its height-direction center to the width-direction dimension of the projection surface S6 is 0.725. Rays of light are incident on the projection surface S6 at the minimum angle of incidence (35.85°) at the width-direction center at the height-direction bottom end thereof, at the maximum angle of incidence (62.51°) at both width-direction ends at the height-direction top end thereof, and at an angle of incidence of 58.75° at the center thereof. The entrance pupil is located at infinity, making the optical system an oblique telecentric optical system.

As shown in Table 2, the height- and width-direction f-numbers Fnoy and Fnoz are 3.51 and 3.45 respectively. The thickness D of the optical path is defined by the top end of the projection surface S6 and a lower portion of the width-direction center of the reflection surface S5 (see FIG. 14B), and the ratio D/H of the thickness of the optical path to the height-direction length of the projection surface S6 is 0.236. The lowest end of the optical path is defined by the bottom end of the width-direction center of the reflection surface S1, and the ratio Hb/(H+Hb) of the height-direction length of the lower region of the optical path to that of the entire optical path is 0.265. The five reflection surfaces S1 to S5 have, from the display surface S0 side, a positive, a negative, a positive, a negative, and a positive optical power. Thus, the reflection surface S5 closest to the projection surface S6 has a positive optical power, the reflection surface S4 preceding them has a negative optical power, and the further precedent reflection surface S3 has a positive optical power. The reflection surface S1 closest to the display surface S0 and the reflection surface S5 closest to the projection surface S6 are spherical surfaces, and the other three reflection surfaces S2, S3, and S4 are free-form surfaces.

EXAMPLE 5

Figure 19:
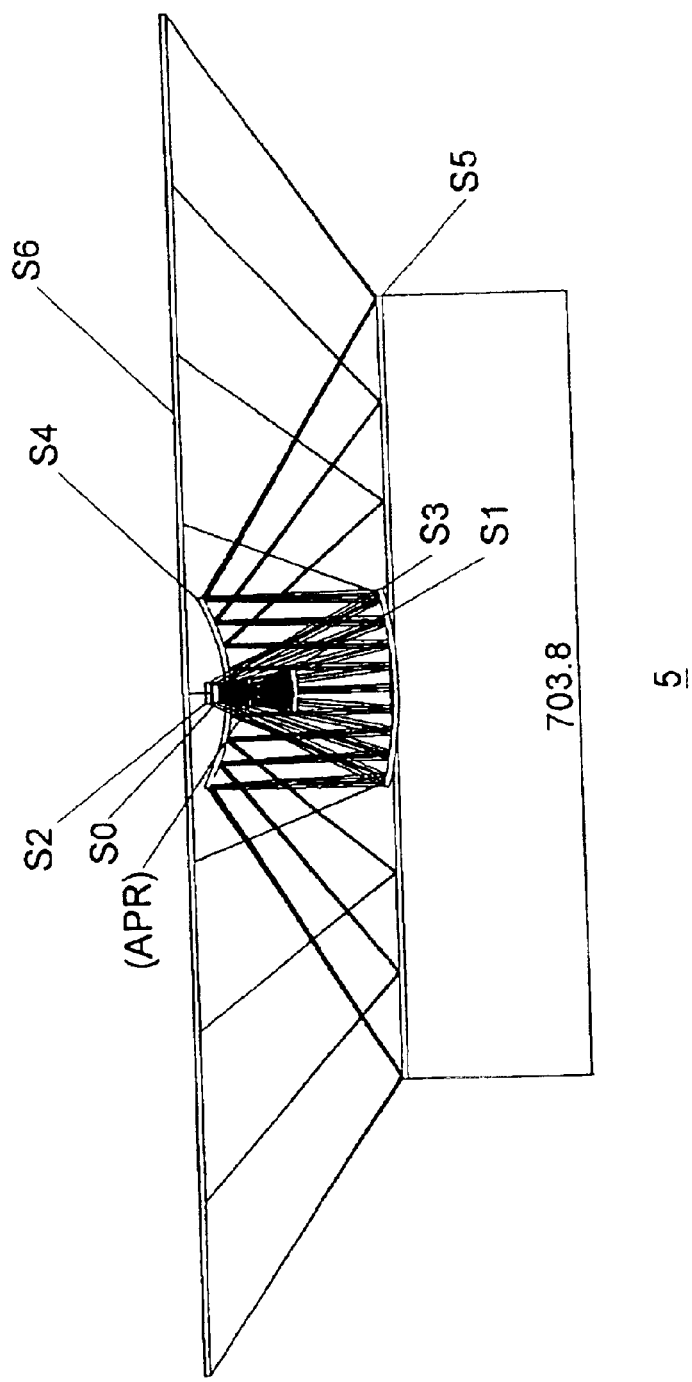
FIG. 19 is a top view, as seen from the y direction, of the projection optical system of Example 5.
Figure 20:
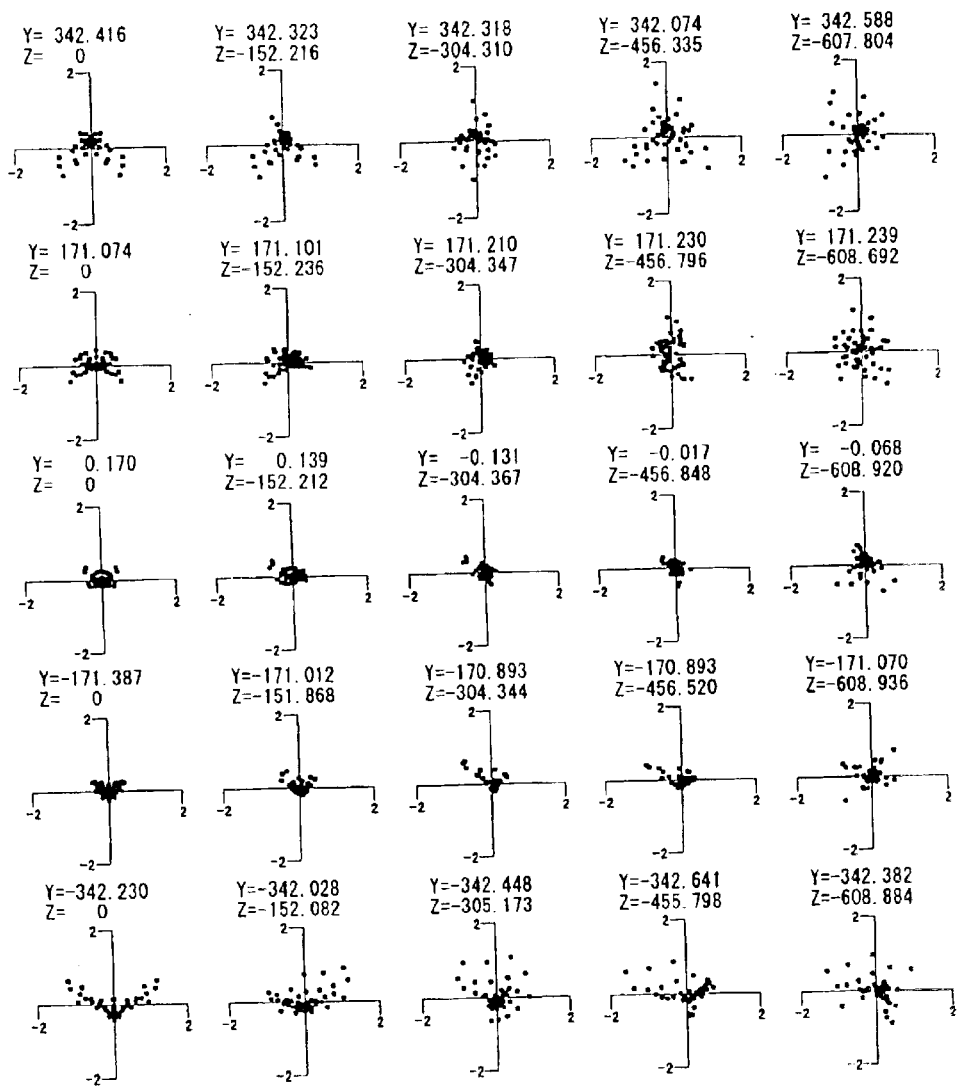
FIG. 20 is a spot diagram obtained on the projection surface of the projection optical system of Example 5.
Figure 21:
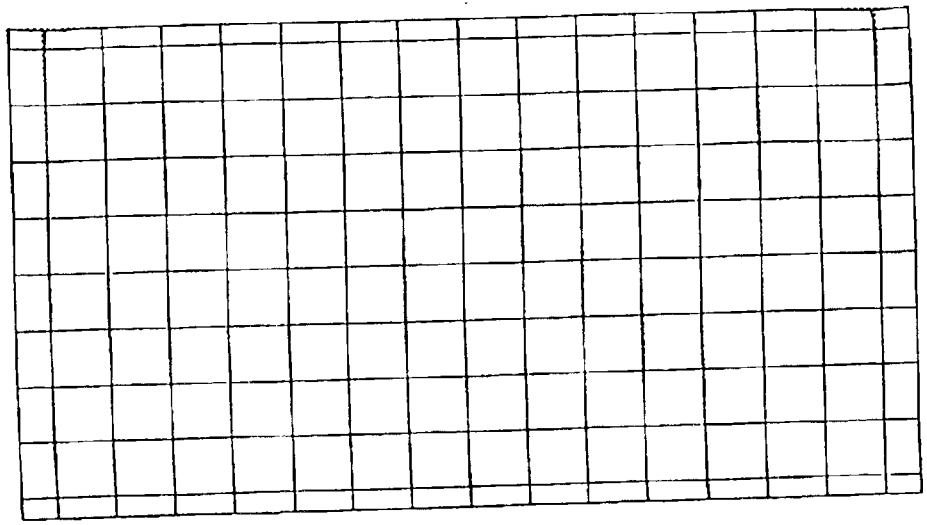
FIG. 21 is a diagram showing the distortion observed on the projection surface of the projection optical system of Example 5.

FIGS. 18A, 18B, and 19 show a sectional view, a side view, and a top view, respectively, of the oblique projection optical system 5 of Example 5, and Tables 35 to 42 show the construction data thereof. FIG. 20 shows a spot diagram obtained on the projection surface S6 and FIG. 21 shows the distortion of the image observed on the projection surface S6. As will be clear from Table 42, the projection surface S6 is not completely parallel to the display surface S0.

As shown in Table 1, the height- and width-direction magnification factors β(Y) and β(Z) are 78.55 and 78.56 respectively. The ratio of the height-direction dimension of the reflection surface S5 at its width-direction center to the height-direction dimension of the projection surface S6 is 0.693, and the ratio of the width-direction dimension of the reflection surface S5 near its height-direction center to the width-direction dimension of the projection surface S6 is 0.578. Rays of light are incident on the projection surface S6 at the minimum angle of incidence (29.30°) at the width-direction center at the height-direction bottom end thereof, at the maximum angle of incidence (66.30°) at both width-direction ends at the height-direction top end thereof, and at an angle of incidence of 54.92° at the center thereof. The entrance pupil is located at infinity, making the optical system an oblique telecentric optical system.

As shown in Table 2, the height- and width-direction f-numbers Fnoy and Fnoz are 3.11 and 3.06 respectively. The thickness D of the optical path is defined by the top end of the projection surface S6 and a lower portion of the width-direction center of the reflection surface S5 (see FIG. 18B), and the ratio D/H of the thickness of the optical path to the height-direction length of the projection surface S6 is 0.263. The lowest end of the optical path is defined by the bottom end of the width-direction center of the reflection surface S1, and the ratio Hb/(H+Hb) of the height-direction length of the lower region of the optical path to that of the entire optical path is 0.281. The five reflection surfaces S1 to S5 have, from the display surface S0 side, a positive, a negative, a positive, a negative, and a positive optical power. Thus, the reflection surface S5 closest to the projection surface S6 has a positive optical power, the reflection surface S4 preceding them has a negative optical power, and the further precedent reflection surface S3 has a positive optical power. The reflection surfaces S1 to S5 are all free-form surfaces. The reflection surface S5 has no optical power in the width direction (Z direction).

EXAMPLE 6

Figure 22A:
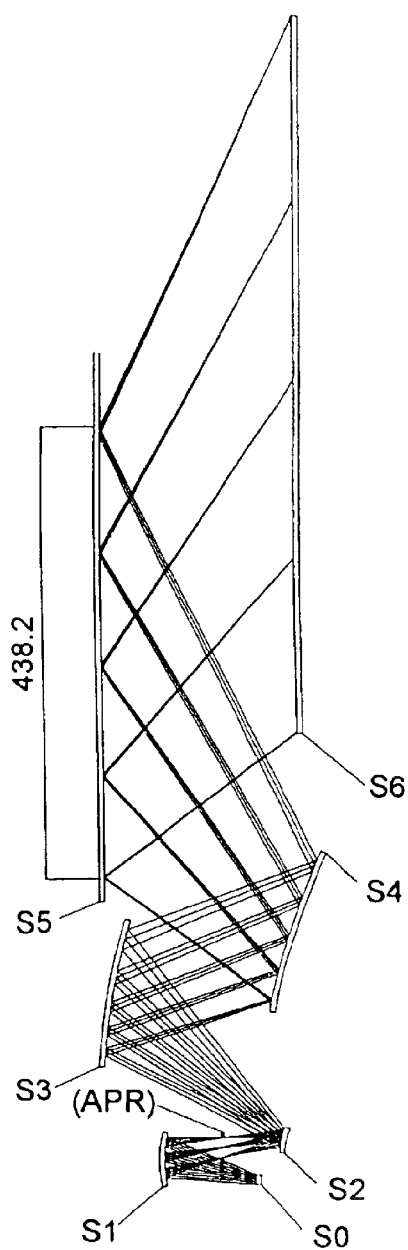
FIG. 22A is a sectional view, on the x-y plane, of the projection optical system of Example 6 of the invention.
Figure 22B:
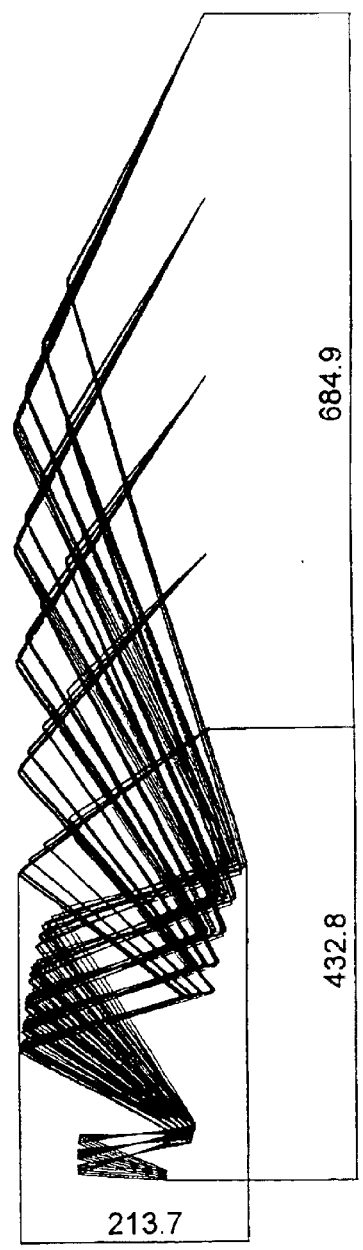
FIG. 22B is a side view, as seen from the z direction, of the projection optical system of Example 6.
Figure 23:
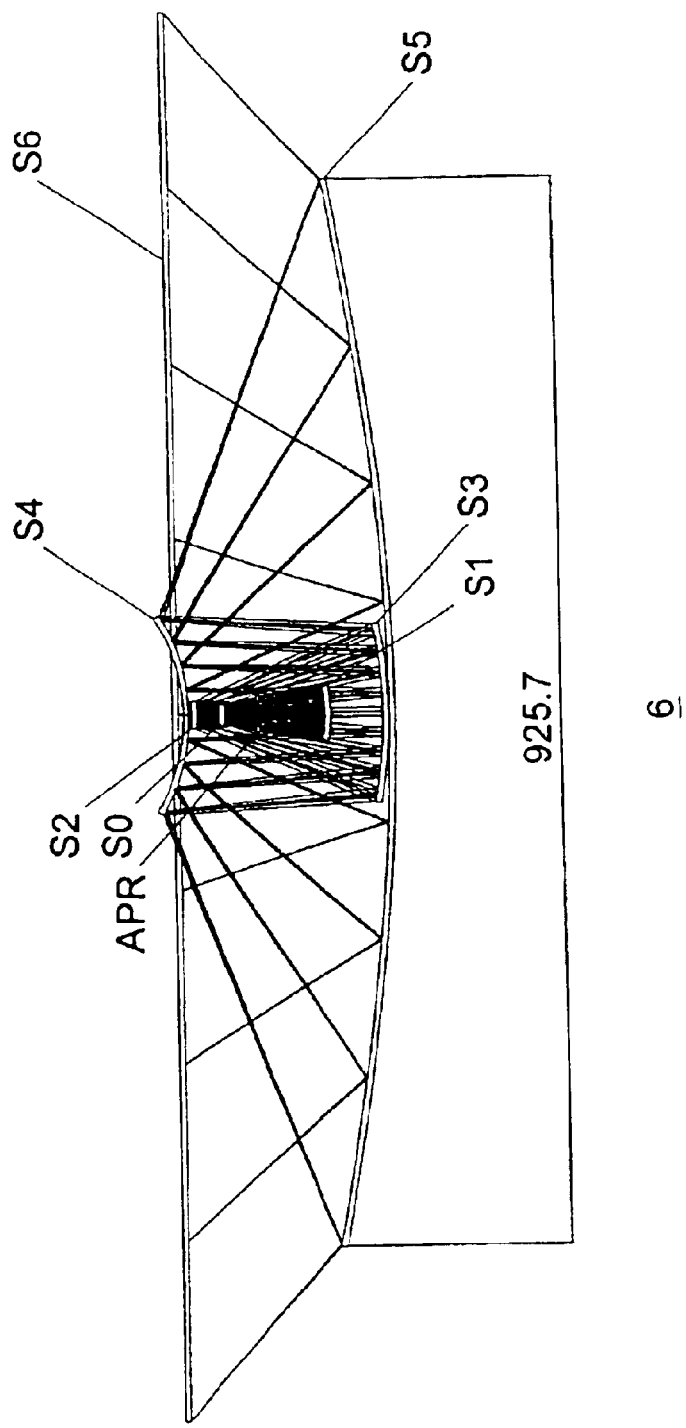
FIG. 23 is a top view, as seen from the y direction, of the projection optical system of Example 6.
Figure 24:
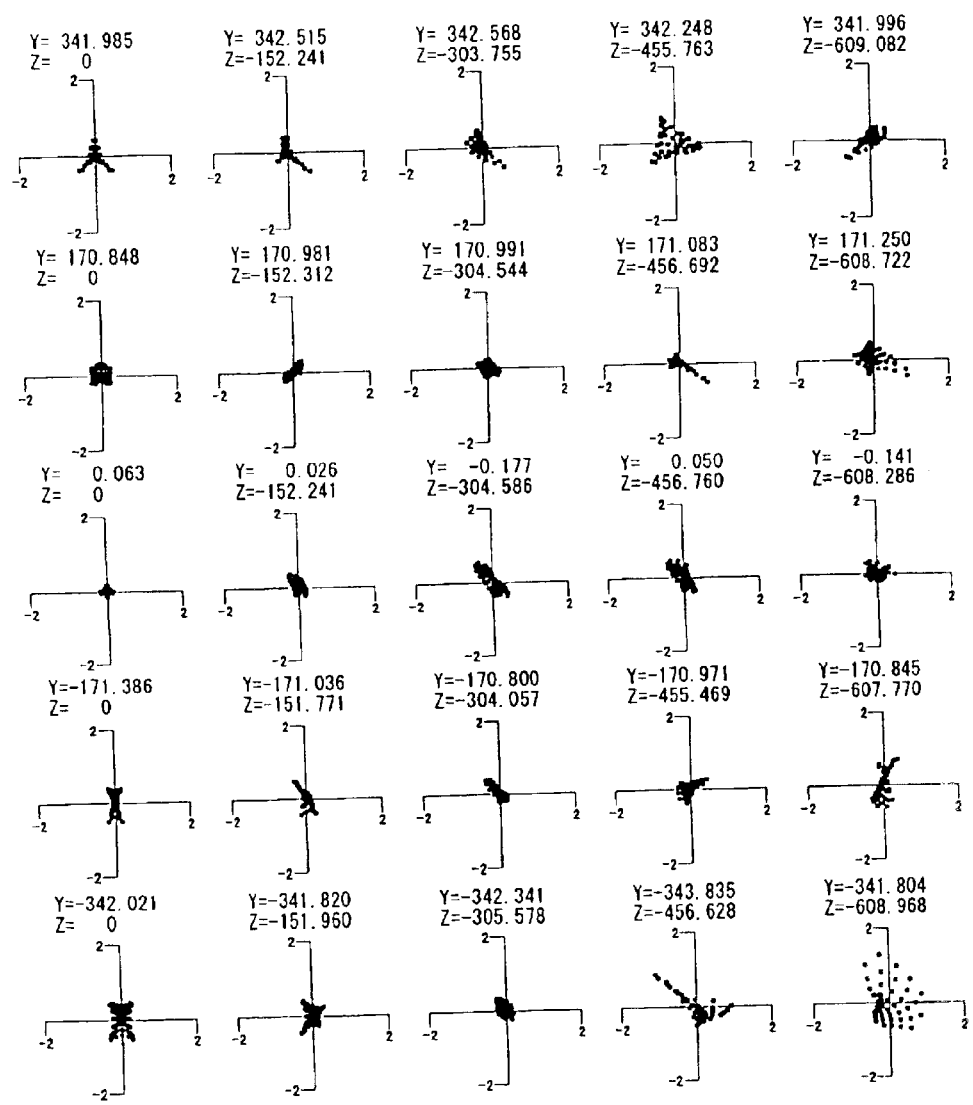
FIG. 24 is a spot diagram obtained on the projection surface of the projection optical system of Example 6.
Figure 25:
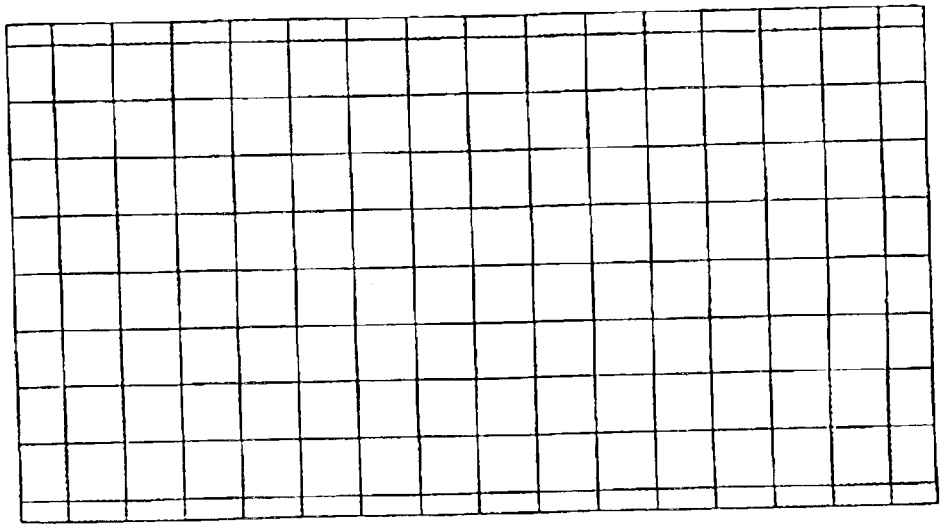
FIG. 25 is a diagram showing the distortion observed on the projection surface of the projection optical system of Example 6.

FIGS. 22A, 22B, and 23 show a sectional view, a side view, and a top view, respectively, of the oblique projection optical system 6 of Example 6, and Tables 43 to 50 show the construction data thereof. FIG. 24 shows a spot diagram obtained on the projection surface S6 and FIG. 25 shows the distortion of the image observed on the projection surface S6. As will be clear from Table 50, the projection surface S6 is not completely parallel to the display surface S0.

As shown in Table 1, the height- and width-direction magnification factors β(Y) and β(Z) are 78.52 and 78.54 respectively. The ratio of the height-direction dimension of the reflection surface S5 at its width-direction center to the height-direction dimension of the projection surface S6 is 0.640, and the ratio of the width-direction dimension of the reflection surface S5 near its height-direction center to the width-direction dimension of the projection surface S6 is 0.760. Rays of light are incident on the projection surface S6 at the minimum angle of incidence (37.66°) at the width-direction center at the height-direction bottom end thereof, at the maximum angle of incidence (65.55°) at both width-direction ends at the height-direction top end thereof, and at an angle of incidence of 57.05° at the center thereof. The entrance pupil is located at infinity, making the optical system an oblique telecentric optical system.

As shown in Table 2, the height- and width-direction f-numbers Fnoy and Fnoz are 3.01 and 2.96 respectively. The thickness D of the optical path is defined by the top ends of both width-direction ends of the reflection surface S4 and the bottom end of the width-direction center of the reflection surface S5 (see FIG. 22B), and the ratio D/H of the thickness of the optical path to the height-direction length of the projection surface S6 is 0.312. The lowest end of the optical path is defined by the bottom end of the display surface S0, and the ratio Hb/(H+Hb) of the height-direction length of the lower region of the optical path to that of the entire optical path is 0.387. The five reflection surfaces S1 to S5 have, from the display surface S0 side, a positive, a negative, a positive, a negative, and a positive optical power. Thus, the reflection surface S5 closest to the projection surface S6 has a positive optical power, the reflection surface S4 preceding them has a negative optical power, and the further precedent reflection surface S3 has a positive optical power. The reflection surfaces S1 to S5 are all free-form surfaces. The reflection surface S5 has no optical power in the height direction (Y direction).

EXAMPLE 7

Figure 27:
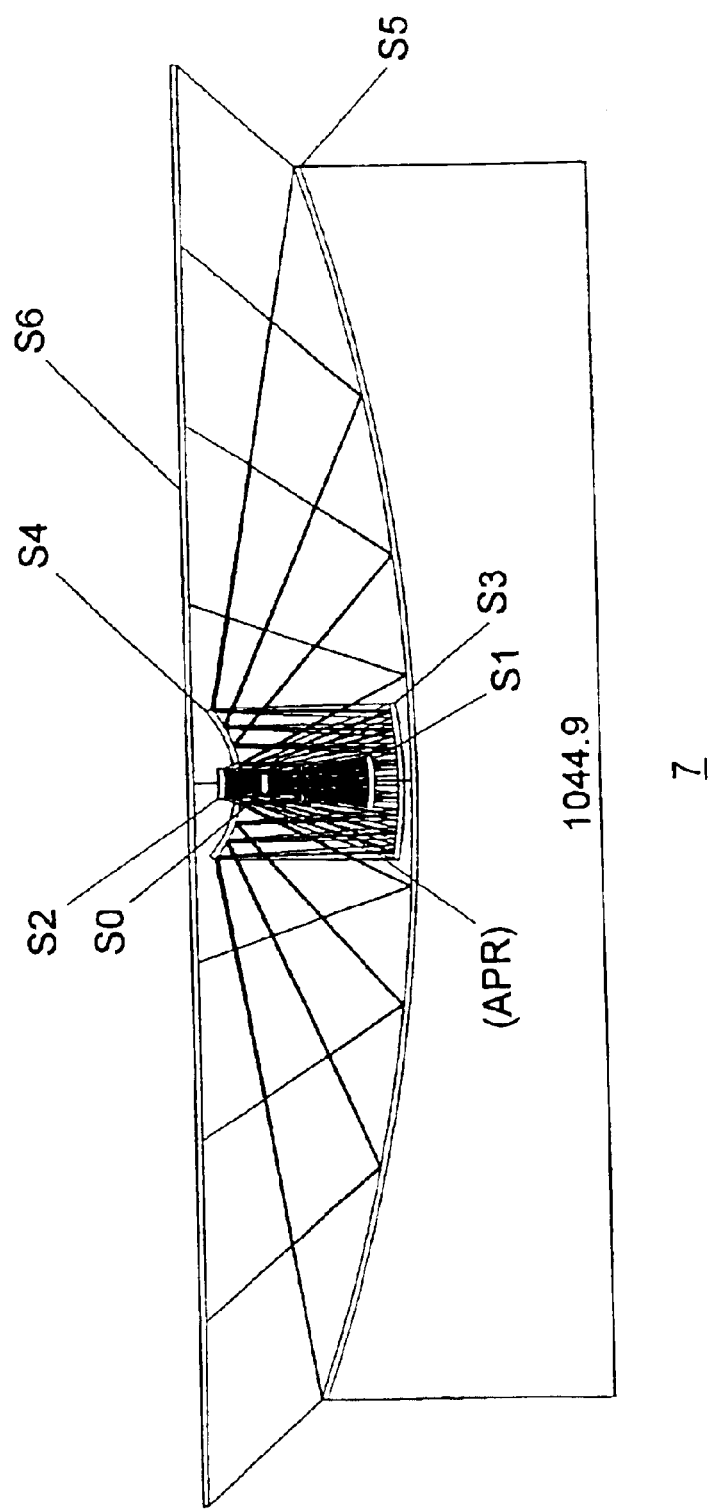
FIG. 27 is a top view, as seen from the y direction, of the projection optical system of Example 7.
Figure 28:
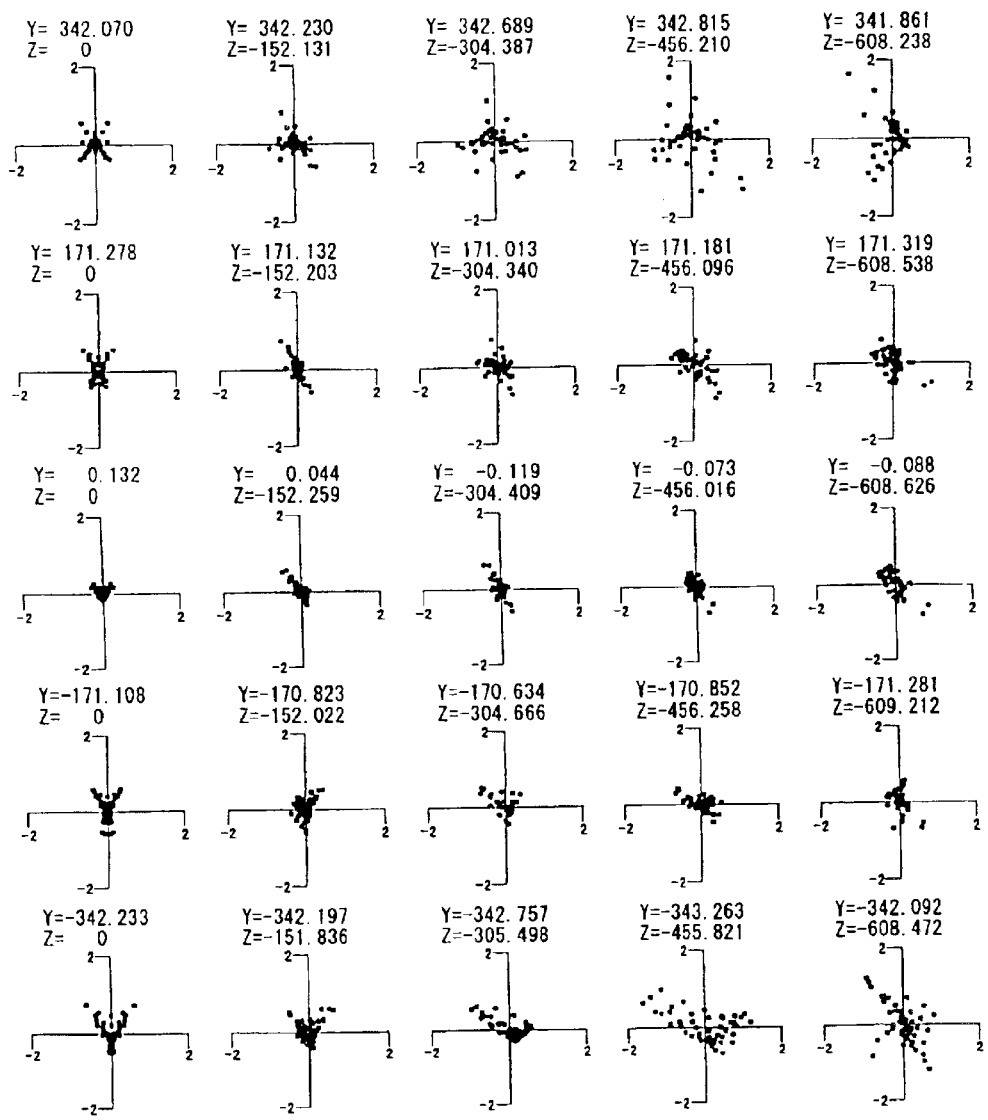
FIG. 28 is a spot diagram obtained on the projection surface of the projection optical system of Example 7.
Figure 29:
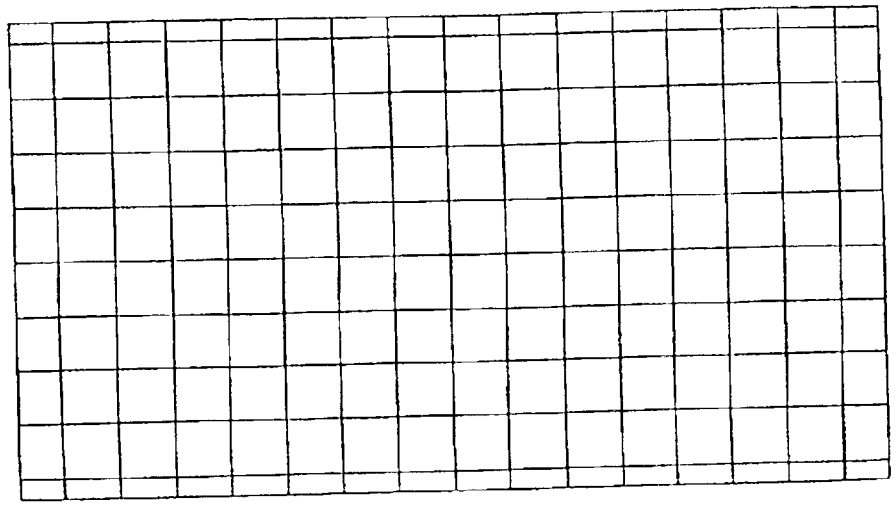
FIG. 29 is a diagram showing the distortion observed on the projection surface of the projection optical system of Example 7.

FIGS. 26A, 26B, and 27 show a sectional view, a side view, and a top view, respectively, of the oblique projection optical system 7 of Example 7, and Tables 51 to 58 show the construction data thereof. FIG. 28 shows a spot diagram obtained on the projection surface S6 and FIG. 29 shows the distortion of the image observed on the projection surface S6. As will be clear from Table 58, the projection surface S6 is not completely parallel to the display surface S0.

As shown in Table 1, the height- and width-direction magnification factors β(Y) and β(Z) are 78.56 and 78.54 respectively. The ratio of the height-direction dimension of the reflection surface S5 at its width-direction center to the height-direction dimension of the projection surface S6 is 0.802, and the ratio of the width-direction dimension of the reflection surface S5 near its height-direction center to the width-direction dimension of the projection surface S6 is 0.858. Rays of light are incident on the projection surface S6 at the minimum angle of incidence (32.35°) at the width-direction center at the height-direction bottom end thereof, at the maximum angle of incidence (59.78°) at both width-direction ends at the height-direction top end thereof, and at an angle of incidence of 54.52° at the center thereof. The entrance pupil is located at infinity, making the optical system an oblique telecentric optical system.

As shown in Table 2, the height- and width-direction f-numbers Fnoy and Fnoz are 3.01 and 2.96 respectively. The thickness D of the optical path is defined by the top end of the projection surface S6 and a lower portion of the width-direction center of the reflection surface S5 (see FIG. 26B), and the ratio D/H of the thickness of the optical path to the height-direction length of the projection surface S6 is 0.264. The lowest end of the optical path is defined by the bottom end of the width-direction center of the reflection surface S1, and the ratio Hb/(H+Hb) of the height-direction length of the lower region of the optical path to that of the entire optical path is 0.289. The five reflection surfaces S1 to S5 have, from the display surface S0 side, a positive, a negative, a positive, a negative, and a positive optical power. Thus, the reflection surface S5 closest to the projection surface S6 has a positive optical power, the reflection surface S4 preceding them has a negative optical power, and the further precedent reflection surface S3 has a positive optical power. The reflection surfaces S1 to S5 are all free-form surfaces.

EXAMPLE 8

Figure 30A:
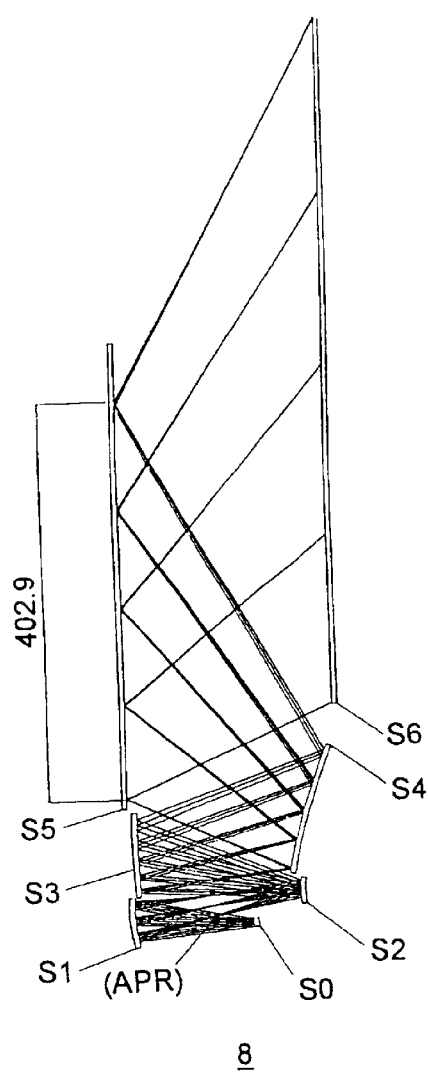
FIG. 30A is a sectional view, on the x-y plane, of the projection optical system of Example 8 of the invention.
Figure 30B:
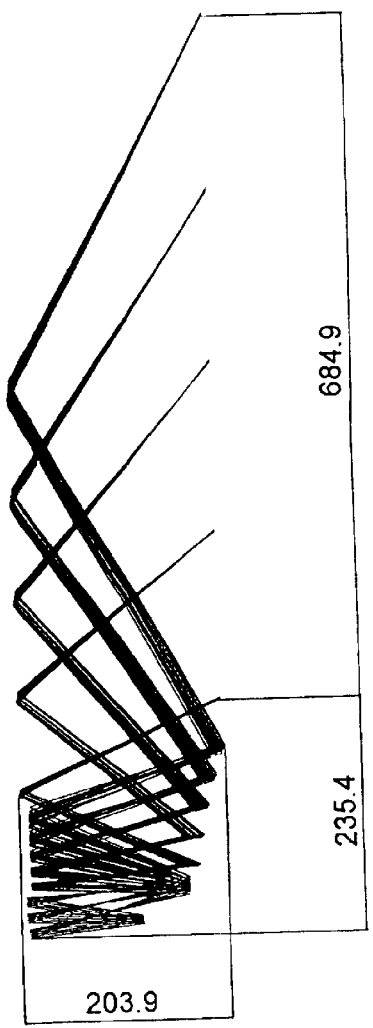
FIG. 30B is a side view, as seen from the z direction, of the projection optical system of Example 8.
Figure 31:
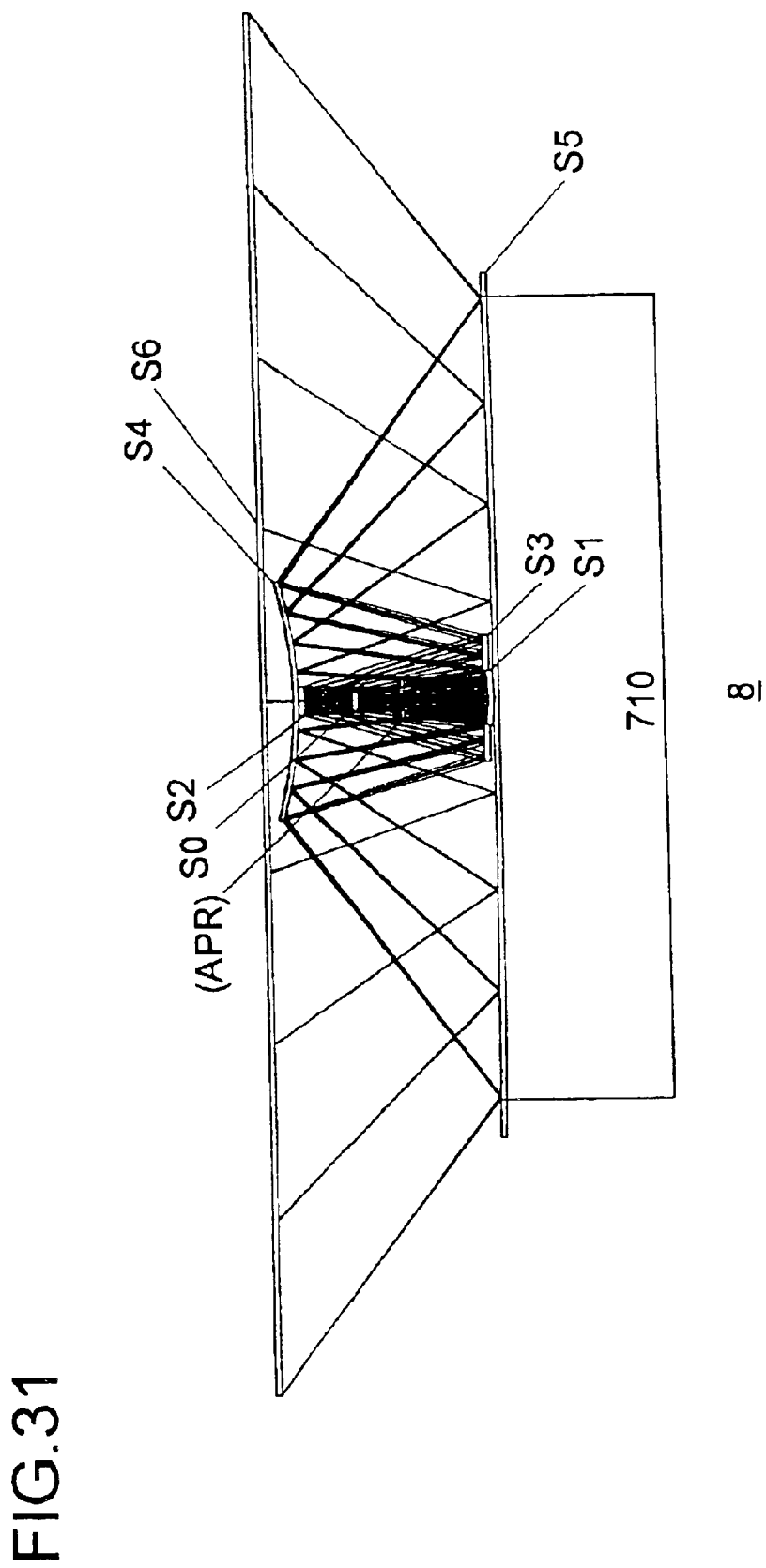
FIG. 31 is a top view, as seen from the y direction, of the projection optical system of Example 8.
Figure 32:
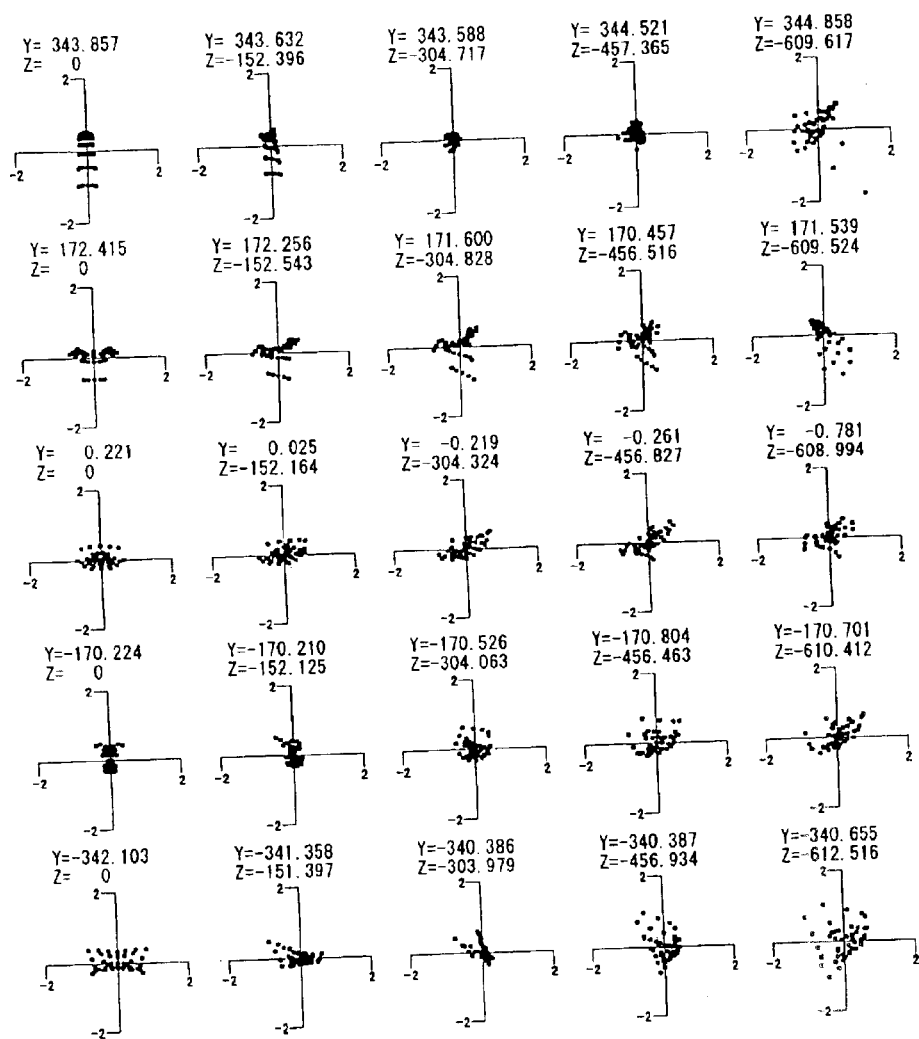
FIG. 32 is a spot diagram obtained on the projection surface of the projection optical system of Example 8.
Figure 33:
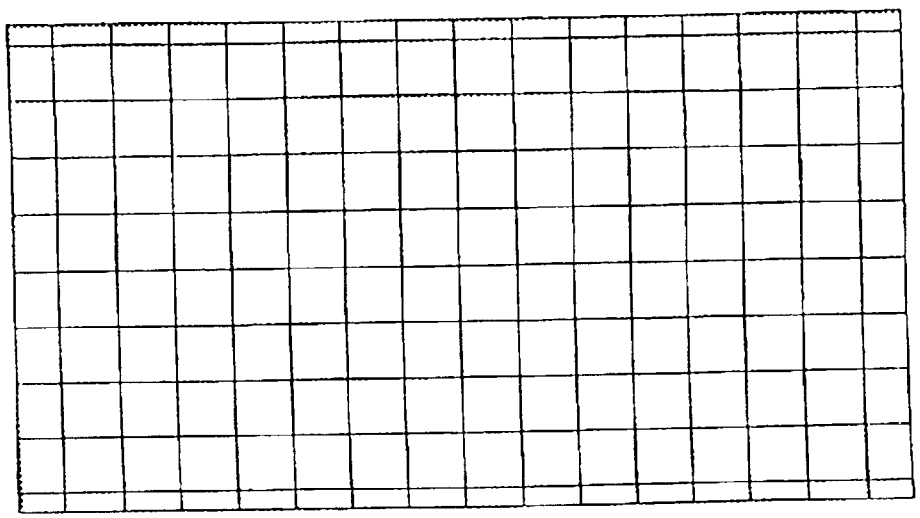
FIG. 33 is a diagram showing the distortion observed on the projection surface of the projection optical system of Example 8.

FIGS. 30A, 30B, and 31 show a sectional view, a side view, and a top view, respectively, of the oblique projection optical system 8 of Example 8, and Tables 59 to 66 show the construction data thereof. FIG. 32 shows a spot diagram obtained on the projection surface S6 and FIG. 33 shows the distortion of the image observed on the projection surface S6. As will be clear from Table 66, the projection surface S6 is not completely parallel to the display surface S0.

As shown in Table 1, the height- and width-direction magnification factors β(Y) and β(Z) are 78.35 and 78.54 respectively. The ratio of the height-direction dimension of the reflection surface S5 at its width-direction center to the height-direction dimension of the projection surface S6 is 0.588, and the ratio of the width-direction dimension of the reflection surface S5 near its height-direction center to the width-direction dimension of the projection surface S6 is 0.583. Rays of light are incident on the projection surface S6 at the minimum angle of incidence (24.79°) at the width-direction center at the height-direction bottom end thereof, at the maximum angle of incidence (65.69°) at both width-direction ends at the height-direction top end thereof, and at an angle of incidence of 50.59° at the center thereof. The entrance pupil is located at infinity, making the optical system an oblique telecentric optical system.

As shown in Table 2, the height- and width-direction f-numbers Fnoy and Fnoz are 3.50 and 3.45 respectively. The thickness D of the optical path is defined by the top ends of both width-direction ends of the reflection surface S4 and the bottom end of the width-direction center of the reflection surface S5 (see FIG. 30B), and the ratio D/H of the thickness of the optical path to the height-direction length of the projection surface S6 is 0.298. The lowest end of the optical path is defined by the bottom end of the width-direction center of the reflection surface S1, and the ratio Hb/(H+Hb) of the height-direction length of the lower region of the optical path to that of the entire optical path is 0.256. The five reflection surfaces S1 to S5 have, from the display surface S0 side, a positive, a negative, a positive, a negative, and a positive optical power. Thus, the reflection surface S5 closest to the projection surface S6 has a positive optical power, the reflection surface S4 preceding them has a negative optical power, and the further precedent reflection surface S3 has a positive optical power. The reflection surface S5 closest to the projection surface S6 is a free-form surface, and the other four reflection surfaces S1 to S4 are aspherical surfaces.

EXAMPLE 9

Figure 35:
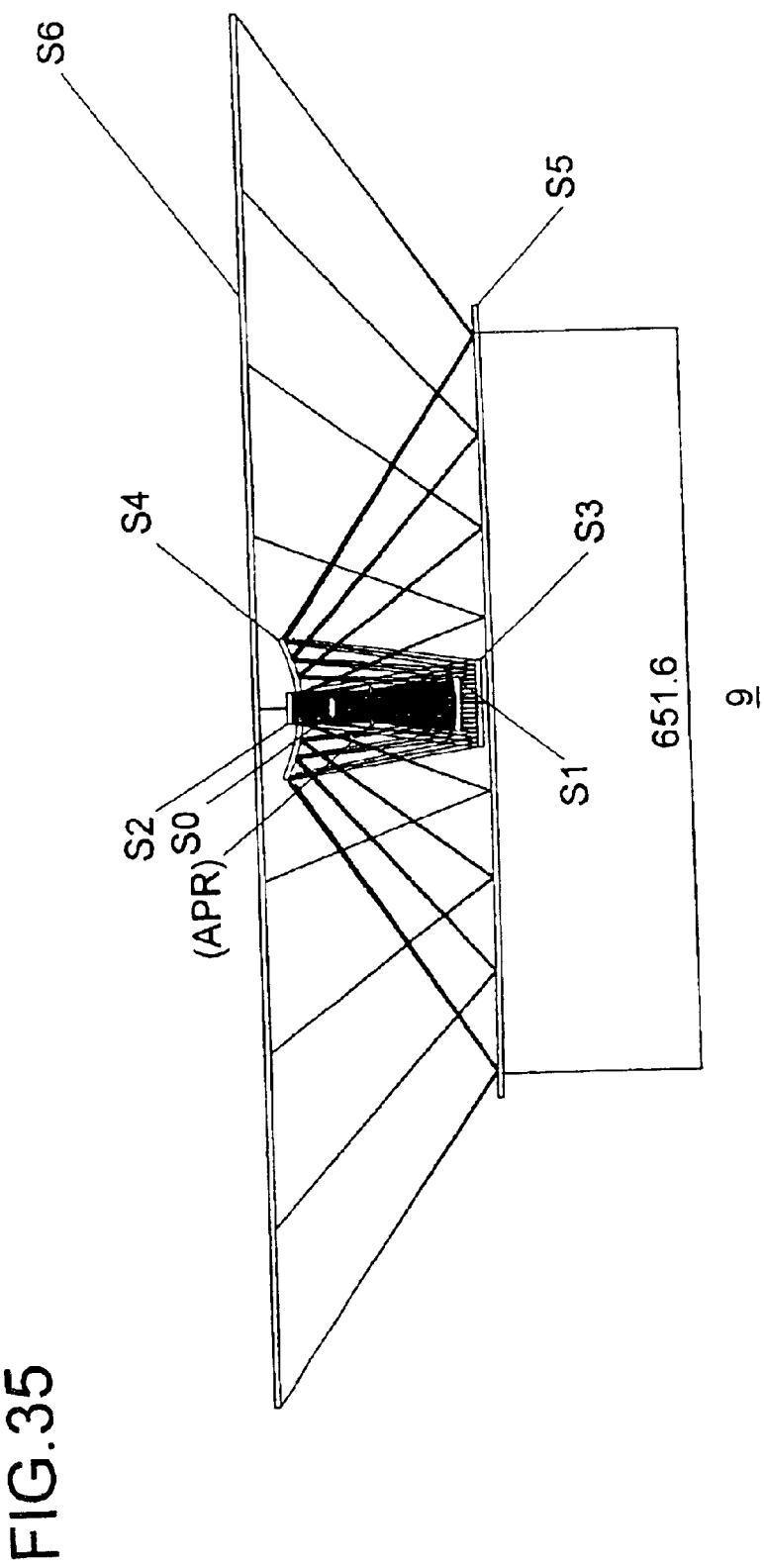
FIG. 35 is a top view, as seen from the y direction, of the projection optical system of Example 9.
Figure 36:
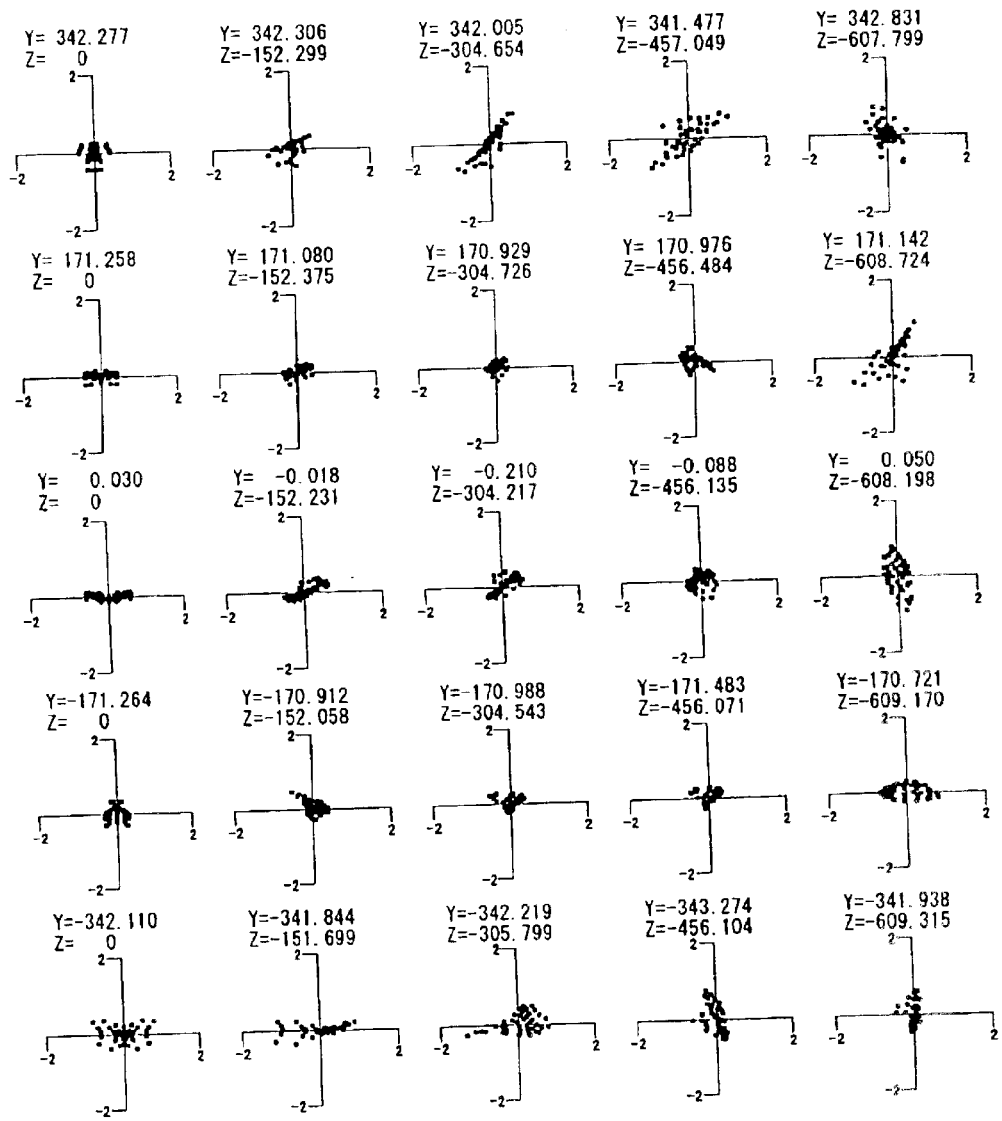
FIG. 36 is a spot diagram obtained on the projection surface of the projection optical system of Example 9.
Figure 37:
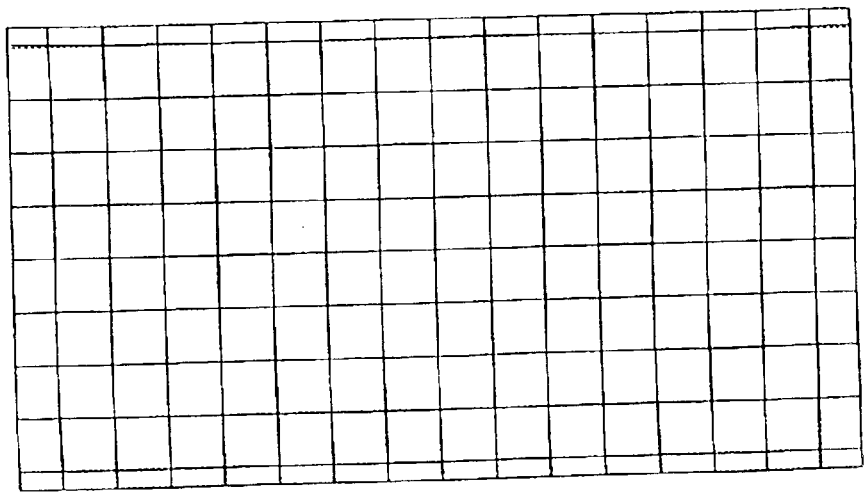
FIG. 37 is a diagram showing the distortion observed on the projection surface of the projection optical system of Example 9.

FIGS. 34A, 34B, and 35 show a sectional view, a side view, and a top view, respectively, of the oblique projection optical system 9 of Example 9, and Tables 67 to 74 show the construction data thereof. FIG. 36 shows a spot diagram obtained on the projection surface S6 and FIG. 37 shows the distortion of the image observed on the projection surface S6. As will be clear from Table 74, the projection surface S6 and the display surface S0 are parallel to each other.

As shown in Table 1, the height- and width-direction magnification factors β(Y) and β(Z) are 78.52 and 78.57 respectively. The ratio of the height-direction dimension of the reflection surface S5 at its width-direction center to the height-direction dimension of the projection surface S6 is 0.542, and the ratio of the width-direction dimension of the reflection surface S5 near its height-direction center to the width-direction dimension of the projection surface S6 is 0.535. Rays of light are incident on the projection surface S6 at the minimum angle of incidence (21.69°) at the width-direction center at the height-direction bottom end thereof, at the maximum angle of incidence (66.55°) at both width-direction ends at the height-direction top end thereof, and at an angle of incidence of 51.34° at the center thereof. The entrance pupil is located at infinity, making the optical system an oblique telecentric optical system.

As shown in Table 2, the height- and width-direction f-numbers Fnoy and Fnoz are 3.50 and 3.45 respectively. The thickness D of the optical path is defined by the projection surface S6 and the bottom end of the width-direction center of the reflection surface S5 (see FIG. 34B), and the ratio D/H of the thickness of the optical path to the height-direction length of the projection surface S6 is 0.292. The lowest end of the optical path is defined by the bottom end of the display surface S0, and the ratio Hb/(H+Hb) of the height-direction length of the lower region of the optical path to that of the entire optical path is 0.231. The five reflection surfaces S1 to S5 have, from the display surface S0 side, a positive, a negative, a positive, a negative, and a positive optical power. Thus, the reflection surface S5 closest to the projection surface S6 has a positive optical power, the reflection surface S4 preceding them has a negative optical power, and the further precedent reflection surface S3 has a positive optical power. The reflection surface S1 is a spherical surface, the reflection surfaces S2 and S3 are aspherical surfaces, and the reflection surfaces S4 and S5 are free-form surfaces. The reflection surface S5 has no optical power in the height direction (Y direction).

Among the oblique projection optical systems 1 to 9 of the practical examples described above, in those, like the oblique projection optical system 1 of Example 1 (see FIG. 1A), in which the rays of light traveling from the display surface S0 to the reflection surface S1 exhibit high symmetry with respect to the height direction of the display surface S0 (i.e., in the Y direction), it is difficult to illuminate, from the reflection surface S1 side, the panel for displaying an image on the display surface S0. Accordingly, in this type of construction, a transmissive image display panel, such as a transmissive liquid crystal panel, is used as the panel for displaying an image.

On the other hand, in those, like the oblique projection optical system 6 of Example 6 (see FIG. 22A), in which the rays of light traveling from the display surface S0 to the reflection surface S1 exhibit high asymmetry with respect to the height direction of the display surface S0 (i.e., in the Y direction), it is easy to illuminate, from the reflection surface S1 side, the panel for displaying an image by disposing an illumination light source by the side of the optical path from the display surface S0 to the reflection surface S1. Accordingly, in this type of construction, it is possible to use either of a transmissive or a reflective panel. As a reflective panel, it is possible to use a reflective liquid crystal panel, or a mirror device composed of a large number of minute mirror elements which modulates illumination light by varying the direction of the individual mirror elements.

In the oblique projection optical systems 1 to 9 of the practical examples, the aperture surface APR is located between the reflection surfaces S1 and S2 and is thus located near one or both of the optical path from the display surface S0 to the reflection surface S1 and the optical path from the reflection surface S2 to the reflection surface S3. This may make it difficult to dispose an aperture stop on the aperture surface APR. In that case, it is possible to restrict the beam diameter by making the reflection surface S1 or S2 so large as to correspond to the aperture of the aperture stop.

More than one display surface may be provided; that is, it is possible, by the use of a cross prism or the like, to provide a plurality of display surfaces that are optically equivalent to one another. For example, by arranging a cross dichroic prism between the display surface S0 and the reflection surface S1, it is possible to arrange two display surfaces equivalent to the display surface S0. Then, by displaying red, green, and blue components of an image on these three display surfaces, and then integrating together the light of these color components with the cross dichroic prism, it is possible to form a color image on the projection surface S6. In any of the oblique projection optical systems 1 to 9, there is sufficient room to arrange such a cross prism in a portion of the space between the reflection surface S1 and the display surface S0 close to the display surface S0. It is to be noted that, even with a single display surface S0, it is possible to present a color image by displaying red, green, and blue components of an image thereon on a time division basis.

In the oblique projection optical systems of the practical examples described above, the reflection surface S5 closest to the projection surface S6 is made sufficiently large by being given a size larger than half the size of the projection surface S6 both in the height and width directions. This makes it possible to obtain an f-number of about 3.5 or less and thereby present a bright image. Moreover, this reflection surface S5 is formed not as a flat surface but as a curved surface. This makes it possible to satisfactorily reduce distortion in the projected image resulting from oblique projection.

Comparative Examples

Two comparative examples will be presented below to show that forming the reflection surface S5 closest to the projection surface S6 as a curved surface helps reduce distortion in the image. The oblique projection optical system 8a of Comparative Example 1 differs from the oblique projection optical system 8 of Example 8 only in that the reflection surface S5 is a flat surface. The oblique projection optical system 9a of Comparative Example 2 differs from the oblique projection optical system 9 of Example 9 only in that the reflection surface S5 is a flat surface. The other surfaces S0 to S4 and S6 than the reflection surface S5 are designed just as described earlier.

Figure 38:
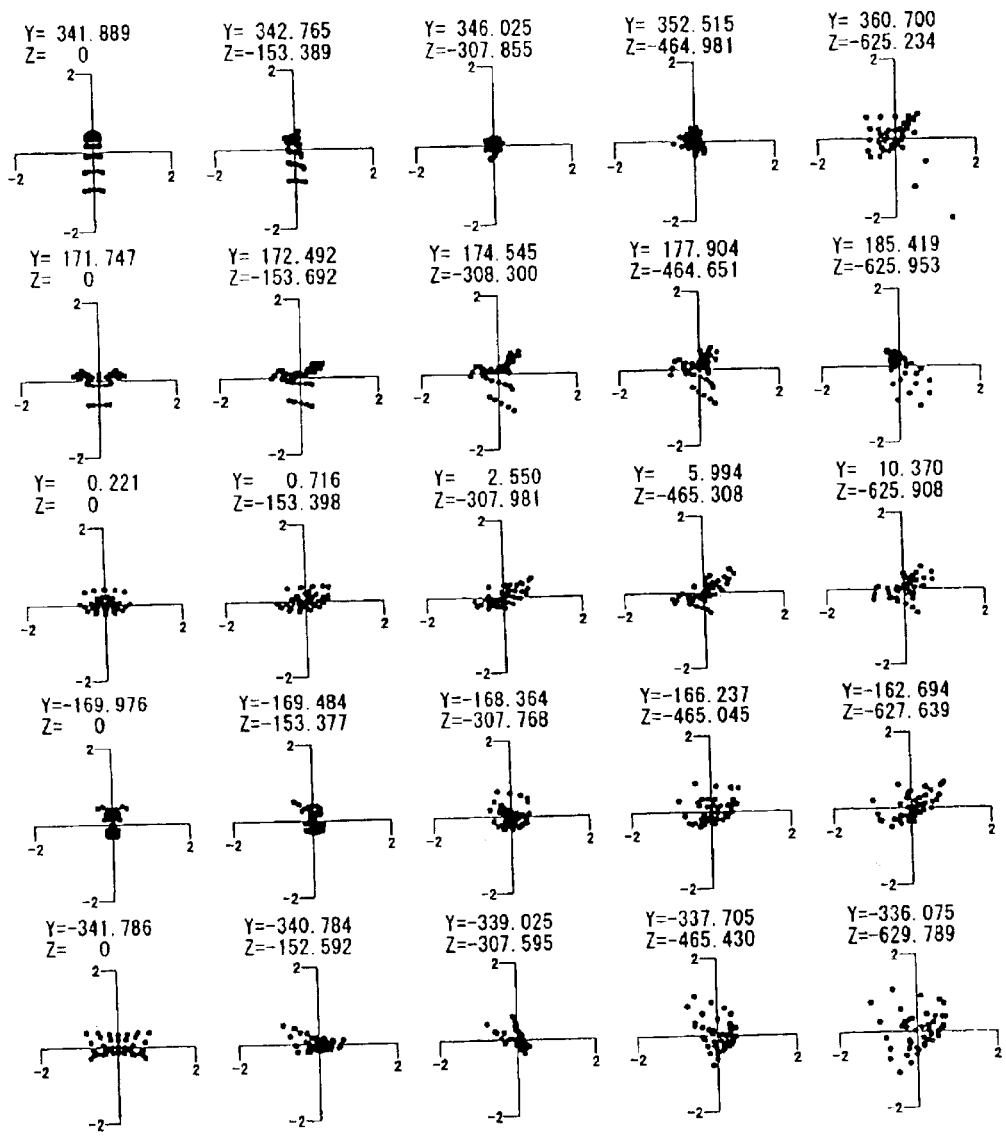
FIG. 38 is a spot diagram obtained on the projection surface of the projection optical system of Comparative Example 1.
Figure 39:
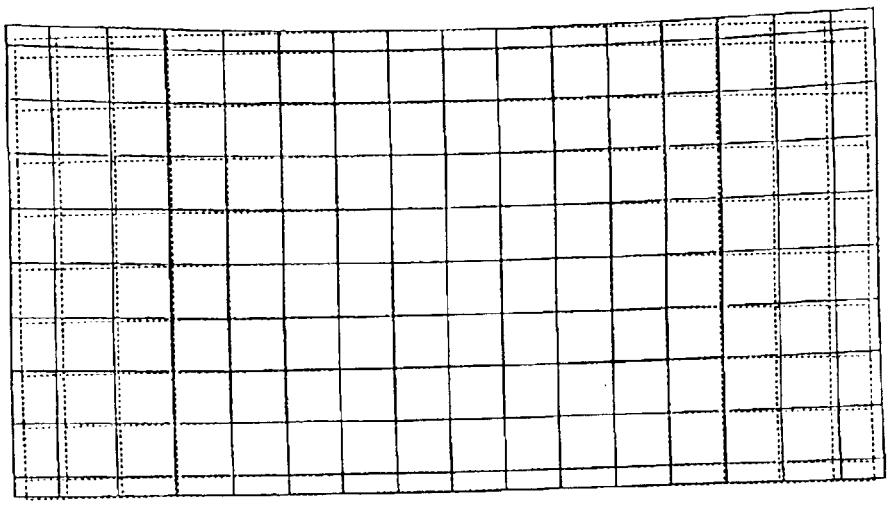
FIG. 39 is a diagram showing the distortion observed on the projection surface of the projection optical system of Comparative Example 1.
Figure 40:
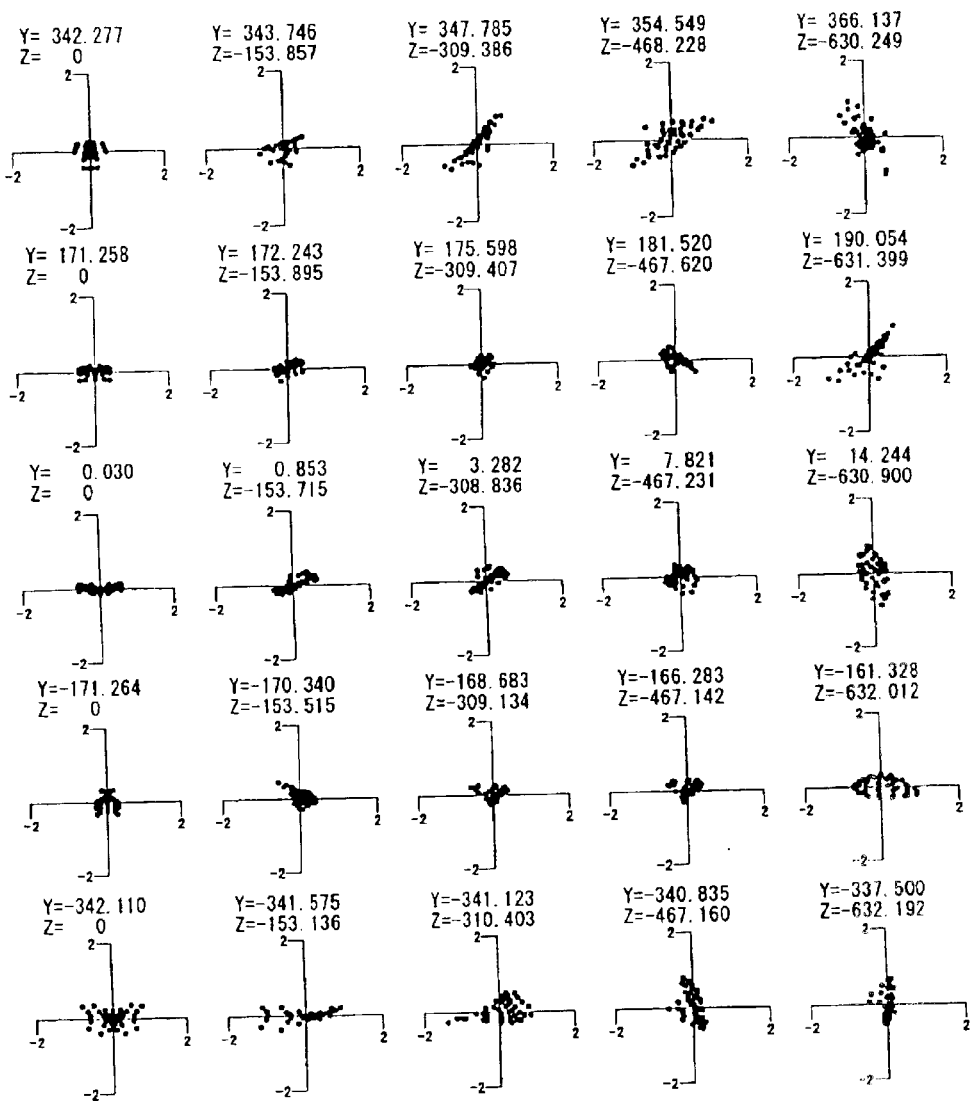
FIG. 40 is a spot diagram obtained on the projection surface of the projection optical system of Comparative Example 2.
Figure 41:
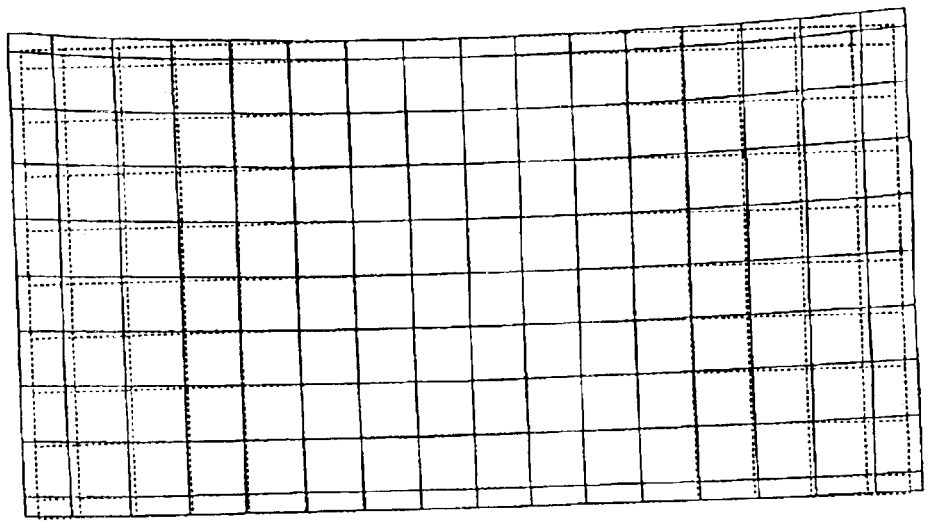
FIG. 41 is a diagram showing the distortion observed on the projection surface of the projection optical system of Comparative Example 2.

FIG. 38 shows a spot diagram obtained in the oblique projection optical system 8a of Comparative Example 1, and FIG. 39 shows the distortion of the image observed on the projection surface S6. FIG. 40 shows a spot diagram obtained in the oblique projection optical system 9a of Comparative Example 2, and FIG. 41 shows the distortion of the image observed on the projection surface S6. Comparisons between FIGS. 32 and 38 and between FIGS. 36 and 40 show that forming the reflection surface S5 as a flat surface does not cause marked changes in the spot diagram. This indicates that the imaging performance of the optical system is determined mainly by the reflection surfaces S1 to S4.

On the other hand, comparisons between FIGS. 33 and 39 and between FIGS. 37 and 41 make it clear that forming the reflection surface S5 as a flat surface results in distortion in both width-direction end portions of the image where rays of light are incident at large angles of incidence, the distortion being particularly large at the height-direction top end where rays of light are incident at the maximum angle of incidence. Thus, forming the reflection surface S5 closest to the projection surface S6 as a curved surface is strikingly effective in reducing distortion in the projected image.

Obviously, many modifications and variations of the present invention are possible in light of the above teachings. It is therefore to be understood that within the scope of the appended claims, the invention may be practiced other than as specifically described.

TABLE 1

| Optical System | Magnification β (Y) | Magnification β (Z) | anamo. (Y/Z) | Display Surface S0 height | Display Surface S0 width | Projection Surface S6 height | Projection Surface S6 width | Reflection Surface S5 height | Reflection Surface S5 width | Angle of Incidence on Projection Surface center-bottom (min) | Angle of Incidence on Projection Surface right/left-top (max) | Angle of Incidence on Projection Surface center | Entrance Pupil X | Entrance Pupil Y |
|---|---|---|---|---|---|---|---|---|---|---|---|---|---|---|
| 1 | 78.58 | −78.56 | −0.03% | 4.36 | 7.75 | 342.45 | 608.80 | 265.25 | 433.40 | 30.84 | 60.00 | 54.28 | ∞ | 0.0* |
| 2 | 45.84 | −45.82 | −0.05% | 7.47 | 13.28 | 342.45 | 608.80 | 300.65 | 465.05 | 36.28 | 58.55 | 57.11 | ∞ | −10.2* |
| 3 | 78.54 | −78.55 | 0.02% | 4.36 | 7.75 | 342.45 | 608.80 | 292.55 | 458.50 | 36.43 | 61.12 | 58.66 | ∞ | −10.2* |
| 4 | 100.01 | −99.98 | −0.03% | 3.42 | 6.09 | 342.45 | 608.80 | 277.75 | 441.25 | 35.85 | 62.51 | 58.75 | ∞ | −10.2* |
| 5 | 78.55 | −78.56 | 0.01% | 4.36 | 7.75 | 342.45 | 608.80 | 237.20 | 351.90 | 29.30 | 66.30 | 54.92 | ∞ | −11.3* |
| 6 | 78.52 | −78.54 | 0.04% | 4.36 | 7.75 | 342.45 | 608.80 | 219.10 | 462.85 | 37.66 | 65.55 | 57.05 | ∞ | −11.3* |
| 7 | 78.56 | −78.54 | −0.02% | 4.36 | 7.75 | 342.45 | 608.80 | 274.60 | 522.45 | 32.35 | 59.78 | 54.52 | ∞ | −11.3* |
| 8 | 78.35 | −78.54 | 0.25% | 4.36 | 7.75 | 342.45 | 608.80 | 201.45 | 355.00 | 24.79 | 65.69 | 50.59 | ∞ | −9.9* |
| 9 | 78.52 | −78.57 | 0.06% | 4.36 | 7.75 | 342.45 | 608.80 | 185.65 | 325.80 | 21.69 | 66.55 | 51.34 | ∞ | −9.9* |

TABLE 2

| Optical System | Fnoy | Fnoz | Thickness of Optical Path D | Height of Projection Surface H | D/H | Height of Region below Projection Surface Hb | Hb/(H + Hb) | Reflection Surface S1 | Reflection Surface S2 | Reflection Surface S3 | Reflection Surface S4 | Reflection Surface S5 |
|---|---|---|---|---|---|---|---|---|---|---|---|---|
| 1 | 2.90 | 2.90 | 182.4 | 684.9 | 0.266 | 365.4 | 0.348 | sp(+) | exasp(−/−) | exasp(−/−) | exasp(−/−) | sp(+) |
| 2 | 3.51 | 3.45 | 181.2 | 684.9 | 0.265 | 313.7 | 0.314 | sp(+) | exasp(−/−) | exasp(+/+) | exasp(−/−) | sp(+) |
| 3 | 3.51 | 3.45 | 161.6 | 684.9 | 0.236 | 251.2 | 0.268 | sp(+) | exasp(−/−) | exasp(+/+) | exasp(−/−) | sp(+) |
| 4 | 3.51 | 3.45 | 161.4 | 684.9 | 0.236 | 246.4 | 0.265 | sp(+) | exasp(−/−) | exasp(+/+) | exasp(−/−) | sp(+) |
| 5 | 3.11 | 3.06 | 180.3 | 684.9 | 0.263 | 268.2 | 0.281 | exasp(+/+) | exasp(−/−) | exasp(+/+) | exasp(−/−) | exasp(+/0) |
| 6 | 3.01 | 2.96 | 213.7 | 684.9 | 0.312 | 432.8 | 0.387 | exasp(+/+) | exasp(−/−) | exasp(+/+) | exasp(−/−) | exasp(0/+) |
| 7 | 3.01 | 2.96 | 181.0 | 684.9 | 0.264 | 277.9 | 0.289 | exasp(+/+) | exasp(−/−) | exasp(+/+) | exasp(−/−) | exasp(+/+) |

TABLE 2-continued

| Optical System | Fnoy | Fnoz | Thickness of Optical Path D | Height of Projection Surface H | D/H | Height of Region below Projection Surface Hb | Hb/(H + Hb) | Reflection Surface S1 | Reflection Surface S2 | Reflection Surface S3 | Reflection Surface S4 | Reflection Surface S5 |
|---|---|---|---|---|---|---|---|---|---|---|---|---|
| 8 | 3.50 | 3.45 | 203.9 | 684.9 | 0.298 | 235.4 | 0.256 | asp(+/+) | asp(−/−) | asp(+/−) | asp(−/−) | exasp(+/+) |
| 9 | 3.50 | 3.45 | 199.9 | 684.9 | 0.292 | 206.3 | 0.231 | sp(+) | asp(−/−) | asp(+/+) | exasp(−/−) | exasp(0/+) |

TABLE 3

| Optical System 1 Local Coord. | | Display Surface S0 x | $N0 = N1 = 1$ y | z |
|---|---|---|---|---|
| Position | | 0.0000 | 0.0000 | 0.0000 |
| Vector | VX | 1.0000 | 0.0000 | 0.0000 |
| | VY | 0.0000 | 1.0000 | 0.0000 |
| | VZ | 0.0000 | 0.0000 | 1.0000 |
| CO | 0.000000 | | | |

TABLE 4

| Optical System 1 Local Coord. | | Reflection Surface S1 x | $N0 = N1 = 1$ y | z |
|---|---|---|---|---|
| Position | | 112.1970 | −0.1216 | 0.0000 |
| Vector | VX | 0.9927 | 0.1210 | 0.0000 |
| | VY | −0.1210 | 0.9927 | 0.0000 |

TABLE 4-continued

| Optical System 1 Local Coord. | | Reflection Surface S1 x | $N0 = N1 = 1$ y | z |
|---|---|---|---|---|
| | VZ | 0.0000 | 0.0000 | 1.0000 |
| CO | −0.006026 | | | |

TABLE 5

| Optical System 1 Local Coord. | | Aperture Surface APR x | $N0 = N1 = 1$ y | z |
|---|---|---|---|---|
| Position | | 30.0000 | −20.0000 | 0.0000 |
| Vector | VX | −1.0000 | 0.0000 | 0.0000 |
| | VY | 0.0000 | 1.0000 | 0.0000 |
| | VZ | 0.0000 | 0.0000 | −1.0000 |
| CO | 0.000000 | | | |
| R | 15.000000 | | | |

TABLE 6

Optical System 1 Reflection Surface S2 $N0 = N1 = 1$

| Local Coord. | x | y | z |
|---|---|---|---|
| Position Vector | −48.3950 | −39.9373 | 0.0000 |
| VX | −0.9704 | 0.2416 | 0.0000 |
| VY | 0.2416 | 0.9704 | 0.0000 |
| VZ | 0.0000 | 0.0000 | −1.0000 |
| CO | 0.015303 | | |

| ε | A4 | A6 | A8 | A10 | A12 |
|---|---|---|---|---|---|
| 1.0 | $0.00000 \times 10^0$ | $0.00000 \times 10^0$ | $0.00000 \times 10^0$ | $0.00000 \times 10^0$ | $0.00000 \times 10^0$ |

| Bjk | $j = 0$ | $j = 1$ | $j = 2$ | $j = 3$ | $j = 4$ |
|---|---|---|---|---|---|
| $k = 0$ | $0.00000 \times 10^0$ | $0.00000 \times 10^0$ | $-6.77293 \times 10^{-3}$ | $-1.11164 \times 10^{-5}$ | $-2.84397 \times 10^{-7}$ |
| $k = 2$ | $-6.84916 \times 10^{-3}$ | $-1.22667 \times 10^{-5}$ | $-5.99375 \times 10^{-7}$ | $-3.32678 \times 10^{-9}$ | $-1.27578 \times 10^{-10}$ |
| $k = 4$ | $-2.90210 \times 10^{-7}$ | $-1.56909 \times 10^{-9}$ | $-1.03397 \times 10^{-10}$ | $0.00000 \times 10^0$ | $0.00000 \times 10^0$ |
| $k = 6$ | $-5.09077 \times 10^{-11}$ | $0.00000 \times 10^0$ | $0.00000 \times 10^0$ | $0.00000 \times 10^0$ | $0.00000 \times 10^0$ |
| $k = 8$ | $0.00000 \times 10^0$ | $0.00000 \times 10^0$ | $0.00000 \times 10^0$ | | |
| $k = 10$ | $0.00000 \times 10^0$ | | | | |

| Bjk | $j = 5$ | $j = 6$ | $j = 7$ | $j = 8$ | $j = 9$ |
|---|---|---|---|---|---|
| $k = 0$ | $-1.79661 \times 10^{-9}$ | $-2.54196 \times 10^{-11}$ | $0.00000 \times 10^0$ | $0.00000 \times 10^0$ | $0.00000 \times 10^0$ |
| $k = 2$ | $0.00000 \times 10^0$ | $0.00000 \times 10^0$ | $0.00000 \times 10^0$ | $0.00000 \times 10^0$ | |
| $k = 4$ | $0.00000 \times 10^0$ | $0.00000 \times 10^0$ | | $k = 0, j = 10$ | $0.00000 \times 10^0$ |

TABLE 7

Optical System 1   Reflection Surface S3   N0 = N1 = 1

| Local Coord. | x | y | z |
|---|---|---|---|
| Position Vector | 106.3110 | −179.3120 | 0.0000 |
| VX | 0.9719 | −0.2355 | 0.0000 |
| VY | 0.2355 | 0.9719 | 0.0000 |
| VZ | 0.0000 | 0.0000 | 1.0000 |

| C0 | 0.000000 | | | | |
|---|---|---|---|---|---|
| ε | A4 | A6 | A8 | A10 | A12 |
| 1.0 | $0.00000 \times 10^0$ | $0.00000 \times 10^0$ | $0.00000 \times 10^0$ | $0.00000 \times 10^0$ | $0.00000 \times 10^0$ |

| Bjk | j = 0 | j = 1 | j = 2 | j = 3 | j = 4 |
|---|---|---|---|---|---|
| k = 0 | $0.00000 \times 10^0$ | $0.00000 \times 10^0$ | $9.20248 \times 10^{-4}$ | $1.35023 \times 10^{-5}$ | $3.36757 \times 10^{-8}$ |
| k = 2 | $1.72801 \times 10^{-3}$ | $1.21967 \times 10^{-5}$ | $7.36288 \times 10^{-8}$ | $1.58224 \times 10^{-9}$ | $3.49476 \times 10^{-11}$ |
| k = 4 | $1.31083 \times 10^{-7}$ | $5.12859 \times 10^{-9}$ | $2.10430 \times 10^{-12}$ | $-1.06882 \times 10^{-12}$ | $1.07795 \times 10^{-14}$ |
| k = 6 | $-2.85781 \times 10^{-11}$ | $-1.09997 \times 10^{-12}$ | $2.05949 \times 10^{-14}$ | $4.15791 \times 10^{-16}$ | $-1.03860 \times 10^{-17}$ |
| k = 8 | $-1.13107 \times 10^{-14}$ | $4.30938 \times 10^{-17}$ | $-2.73130 \times 10^{-18}$ | | |
| k = 10 | $4.25520 \times 10^{-18}$ | | | | |

| Bjk | j = 5 | j = 6 | j = 7 | j = 8 | j = 9 |
|---|---|---|---|---|---|
| k = 0 | $1.43857 \times 10^{-10}$ | $-1.86770 \times 10^{-11}$ | $-6.11745 \times 10^{-12}$ | $-1.32835 \times 10^{-13}$ | $5.05036 \times 10^{-15}$ |
| k = 2 | $5.46061 \times 10^{-12}$ | $1.16585 \times 10^{-13}$ | $-1.68394 \times 10^{-15}$ | $-5.53467 \times 10^{-17}$ | |
| k = 4 | $-1.31521 \times 10^{-15}$ | $-2.52996 \times 10^{-17}$ | | k = 0, j = 10 | $1.31128 \times 10^{-16}$ |

TABLE 8

Optical System 1   Reflection Surface S4   N0 = N1 = 1

| Local Coord. | x | y | z |
|---|---|---|---|
| Position Vector | −27.3630 | −214.5240 | 0.0000 |
| VX | −0.9298 | 0.3680 | 0.0000 |
| VY | 0.3680 | 0.9298 | 0.0000 |
| VZ | 0.0000 | 0.0000 | −1.0000 |

| C0 | 0.000000 | | | | |
|---|---|---|---|---|---|
| ε | A4 | A6 | A8 | A10 | A12 |
| 1.0 | $0.00000 \times 10^0$ | $0.00000 \times 10^0$ | $0.00000 \times 10^0$ | $0.00000 \times 10^0$ | $0.00000 \times 10^0$ |

| Bjk | j = 0 | j = 1 | j = 2 | j = 3 | j = 4 |
|---|---|---|---|---|---|
| k = 0 | $0.00000 \times 10^0$ | $0.00000 \times 10^0$ | $1.05660 \times 10^{-3}$ | $7.09413 \times 10^{-6}$ | $1.18420 \times 10^{-7}$ |
| k = 2 | $2.93326 \times 10^{-3}$ | $2.64372 \times 10^{-5}$ | $1.89897 \times 10^{-7}$ | $3.18835 \times 10^{-10}$ | $-1.99515 \times 10^{-11}$ |
| k = 4 | $-1.07881 \times 10^{-7}$ | $-2.70790 \times 10^{-9}$ | $-3.34460 \times 10^{-11}$ | $-1.92565 \times 10^{-13}$ | $-5.92433 \times 10^{-16}$ |
| k = 6 | $9.92242 \times 10^{-12}$ | $2.23484 \times 10^{-13}$ | $3.13126 \times 10^{-15}$ | $1.38266 \times 10^{-17}$ | $1.34497 \times 10^{-19}$ |
| k = 8 | $-9.68152 \times 10^{-16}$ | $-9.41716 \times 10^{-18}$ | $-1.30264 \times 10^{-19}$ | | |
| k = 10 | $4.49781 \times 10^{-20}$ | | | | |

| Bjk | j = 5 | j = 6 | j = 7 | j = 8 | j = 9 |
|---|---|---|---|---|---|
| k = 0 | $-1.19162 \times 10^{-9}$ | $-6.51585 \times 10^{-11}$ | $-1.78231 \times 10^{-13}$ | $1.63322 \times 10^{-14}$ | $2.22591 \times 10^{-16}$ |
| k = 2 | $-2.12153 \times 10^{-13}$ | $5.27325 \times 10^{-15}$ | $1.13516 \times 10^{-16}$ | $6.40461 \times 10^{-19}$ | |
| k = 4 | $1.09346 \times 10^{-17}$ | $-2.39156 \times 10^{-20}$ | | k = 0, j = 10 | $9.21139 \times 10^{-19}$ |

TABLE 9

| Optical System 1 Reflection Surface S5   N0 = N1 = 1 | | | |
|---|---|---|---|
| Local Coord. | x | y | z |
| Position Vector | 111.5890 | −434.3300 | 0.0000 |
| VX | 0.9995 | −0.0305 | 0.0000 |
| VY | 0.0305 | 0.9995 | 0.0000 |
| VZ | 0.0000 | 0.0000 | 1.0000 |
| C0 | −0.000307 | | |

TABLE 10

Optical System 1  Projection Surface S6  N0 = N1 = 1

| Local Coord. | | x | y | z |
|---|---|---|---|---|
| Position | | −68.4110 | −684.6158 | 0.0000 |
| Vector | VX | −1.0000 | 0.0000 | 0.0000 |
| | VY | 0.0000 | −1.0000 | 0.0000 |
| | VZ | 0.0000 | 0.0000 | 1.0000 |
| C0 | 0.000000 | | | |

TABLE 11

Optical System 2  Display Surface S0  N0 = N1 = 1

| Local Coord. | | x | y | z |
|---|---|---|---|---|
| Position | | 0.0000 | 0.0000 | 0.0000 |
| Vector | VX | 1.0000 | 0.0000 | 0.0000 |
| | VY | 0.0000 | 1.0000 | 0.0000 |
| | VZ | 0.0000 | 0.0000 | 1.0000 |
| C0 | 0.000000 | | | |

TABLE 12

Optical System 2  Reflection Surface S1  N0 = N1 = 1

| Local Coord. | | x | y | z |
|---|---|---|---|---|
| Position | | 71.0595 | 38.9188 | 0.0000 |
| Vector | VX | 0.9043 | 0.4269 | 0.0000 |
| | VY | −0.4269 | 0.9043 | 0.0000 |
| | VZ | 0.0000 | 0.0000 | 1.0000 |
| C0 | −0.007815 | | | |

TABLE 13

Optical System 2  Aperture Surface APR  N0 = N1 = 1

| Local Coord. | | x | y | z |
|---|---|---|---|---|
| Position | | 23.0000 | −26.3000 | 0.0000 |
| Vector | VX | −1.0000 | 0.0000 | 0.0000 |
| | VY | 0.0000 | 1.0000 | 0.0000 |
| | VZ | 0.0000 | 0.0000 | −1.0000 |
| C0 | 0.000000 | | | |
| R | 10.600000 | | | |

TABLE 14

Optical System 2  Reflection Surface S2  N0 = N1 = 1

| Local Coord. | x | y | z |
|---|---|---|---|
| Position Vector | −40.2858 | 38.9188 | 0.0000 |
| VX | −0.9043 | −0.4269 | 0.0000 |
| VY | −0.4269 | 0.9043 | 0.0000 |
| VZ | 0.0000 | 0.0000 | −1.0000 |

| C0 | 0.010350 | | | | |
|---|---|---|---|---|---|
| $\epsilon$ | A4 | A6 | A8 | A10 | A12 |
| 1.0 | $0.00000 \times 10^0$ | $0.00000 \times 10^0$ | $0.00000 \times 10^0$ | $0.00000 \times 10^0$ | $0.00000 \times 10^0$ |

| Bjk | j = 0 | j = 1 | j = 2 | j = 3 | j = 4 |
|---|---|---|---|---|---|
| k = 0 | $0.00000 \times 10^0$ | $0.00000 \times 10^0$ | $1.02246 \times 10^{-3}$ | $-2.49323 \times 10^{-4}$ | $-7.35897 \times 10^{-6}$ |
| k = 2 | $-5.65737 \times 10^{-2}$ | $-3.22091 \times 10^{-3}$ | $-7.40025 \times 10^{-5}$ | $-7.49011 \times 10^{-7}$ | $-2.87031 \times 10^{-9}$ |
| k = 4 | $-4.38629 \times 10^{-6}$ | $-1.25599 \times 10^{-7}$ | $-9.11882 \times 10^{-10}$ | $0.00000 \times 10^0$ | $0.00000 \times 10^0$ |
| k = 6 | PLUS CODE 122 IS NOT DEFINED $1.60568 \times 10^{-10}$ | $0.00000 \times 10^0$ | $0.00000 \times 10^0$ | $0.00000 \times 10^0$ | $0.00000 \times 10^0$ |
| k = 8 | $0.00000 \times 10^0$ | $0.00000 \times 10^0$ | $0.00000 \times 10^0$ | | |
| k = 10 | $0.00000 \times 10^0$ | | | | |

| Bjk | j = 5 | j = 6 | j = 7 | j = 8 | j = 9 |
|---|---|---|---|---|---|
| k = 0 | $-7.49647 \times 10^{-8}$ | $-2.93734 \times 10^{-10}$ | $0.00000 \times 10^0$ | $0.00000 \times 10^0$ | $0.00000 \times 10^0$ |
| k = 2 | $0.00000 \times 10^0$ | $0.00000 \times 10^0$ | $0.00000 \times 10^0$ | $0.00000 \times 10^0$ | |
| k = 4 | $0.00000 \times 10^0$ | $0.00000 \times 10^0$ | | k = 0, j = 10 | $0.00000 \times 10^0$ |

TABLE 15

Optical System 2   Reflection Surface S3   N0 = N1 = 1

| Local Coord. | x | y | z |
|---|---|---|---|
| Position Vector | 72.0861 | −41.2414 | 0.0000 |
| VX | 0.9698 | −0.2439 | 0.0000 |
| VY | 0.2439 | 0.9698 | 0.0000 |
| VZ | 0.0000 | 0.0000 | 1.0000 |

| C0 | 0.000032 | | | | |
|---|---|---|---|---|---|
| $\epsilon$ | A4 | A6 | A8 | A10 | A12 |
| 1.0 | $1.58621 \times 10^{-7}$ | $-1.25604 \times 10^{-11}$ | $1.19797 \times 10^{-15}$ | $-7.76574 \times 10^{-20}$ | $2.40780 \times 10^{-25}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $1.45776 \times 10^{-3}$ | $5.79359 \times 10^{-5}$ | $4.45570 \times 10^{-7}$ |
| k = 2 | $-2.96884 \times 10^{-4}$ | $4.56394 \times 10^{-5}$ | $4.73855 \times 10^{-7}$ | $1.15024 \times 10^{-9}$ | $-5.25027 \times 10^{-12}$ |
| k = 4 | $-2.86431 \times 10^{-7}$ | $-1.63645 \times 10^{-8}$ | $-3.16044 \times 10^{-10}$ | $-2.19814 \times 10^{-12}$ | $-5.21915 \times 10^{-15}$ |
| k = 6 | $1.78139 \times 10^{-11}$ | $1.99259 \times 10^{-12}$ | $4.41876 \times 10^{-14}$ | $3.73289 \times 10^{-16}$ | $1.57110 \times 10^{-18}$ |
| k = 8 | $4.69982 \times 10^{-15}$ | $1.49865 \times 10^{-16}$ | $1.01286 \times 10^{-18}$ | | |
| k = 10 | $2.81142 \times 10^{-19}$ | | | | |

| Bjk | j = 5 | j = 6 | j = 7 | j = 8 | j = 9 |
|---|---|---|---|---|---|
| k = 0 | $1.85353 \times 10^{-9}$ | $8.48755 \times 10^{-12}$ | $1.12456 \times 10^{-13}$ | $3.36120 \times 10^{-16}$ | $3.29715 \times 10^{-18}$ |
| k = 2 | $1.78360 \times 10^{-13}$ | $-1.08156 \times 10^{-15}$ | $-7.50854 \times 10^{-18}$ | $2.47818 \times 10^{-19}$ | |
| k = 4 | $2.56914 \times 10^{-17}$ | $6.17683 \times 10^{-19}$ | | k = 0, j = 10 | $6.36321 \times 10^{-20}$ |

TABLE 16

Optical System 2   Reflection Surface S4   N0 = N1 = 1

| Local Coord. | x | y | z |
|---|---|---|---|
| Position Vector | −47.7464 | −41.2414 | 0.0000 |
| VX | −0.9698 | 0.2439 | 0.0000 |
| VY | 0.2439 | 0.9698 | 0.0000 |
| VZ | 0.0000 | 0.0000 | −1.0000 |

| C0 | 0.001667 | | | | |
|---|---|---|---|---|---|
| $\epsilon$ | A4 | A6 | A8 | A10 | A12 |
| 1.0 | $4.97501 \times 10^{-7}$ | $1.70029 \times 10^{-10}$ | $-4.88869 \times 10^{-16}$ | $-1.19912 \times 10^{-19}$ | $4.85472 \times 10^{-24}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $-5.41334 \times 10^{-3}$ | $-2.74883 \times 10^{-4}$ | $-2.20254 \times 10^{-6}$ |
| k = 2 | $8.98839 \times 10^{-3}$ | $-1.70574 \times 10^{-5}$ | $-3.93653 \times 10^{-6}$ | $-1.23569 \times 10^{-8}$ | $-7.57455 \times 10^{-11}$ |
| k = 4 | $-2.17899 \times 10^{-6}$ | $-1.36730 \times 10^{-8}$ | $1.37054 \times 10^{-10}$ | $8.50396 \times 10^{-12}$ | $-6.05570 \times 10^{-14}$ |
| k = 6 | $1.51902 \times 10^{-10}$ | $6.16681 \times 10^{-12}$ | $-2.23932 \times 10^{-14}$ | $-1.29695 \times 10^{-15}$ | $-7.22360 \times 10^{-18}$ |
| k = 8 | $-2.62169 \times 10^{-14}$ | $-6.50815 \times 10^{-16}$ | $-4.39453 \times 10^{-18}$ | | |
| k = 10 | $2.78695 \times 10^{-19}$ | | | | |

| Bjk | j = 5 | j = 6 | j = 7 | j = 8 | j = 9 |
|---|---|---|---|---|---|
| k = 0 | $6.24715 \times 10^{-8}$ | $1.21287 \times 10^{-9}$ | $1.13785 \times 10^{-11}$ | $3.13753 \times 10^{-14}$ | $-1.15515 \times 10^{-16}$ |
| k = 2 | $7.51439 \times 10^{-13}$ | $-1.04685 \times 10^{-13}$ | $-1.27173 \times 10^{-15}$ | $-4.36924 \times 10^{-18}$ | |
| k = 4 | $-1.65027 \times 10^{-15}$ | $-7.39526 \times 10^{-18}$ | | k = 0, j = 10 | $-6.49480 \times 10^{-19}$ |

TABLE 17

Optical System 2   Reflection Surface S5   N0 = N1 = 1

| Local Coord. | | x | y | z |
|---|---|---|---|---|
| Position Vector | | 6.7295 | −279.8213 | 0.0000 |
| | VX | 0.9614 | −0.2751 | 0.0000 |
| | VY | 0.2751 | 0.9614 | 0.0000 |
| | VZ | 0.0000 | 0.0000 | 1.0000 |
| C0 | | −0.000370 | | |

TABLE 18

Optical System 2   Projection Surface S6   N0 = N1 = 1

| Local Coord. | | x | y | z |
|---|---|---|---|---|
| Position | | −262.6196 | −579.4093 | 0.0000 |
| Vector | VX | −0.9614 | 0.2751 | 0.0000 |
| | VY | −0.2751 | −0.9614 | 0.0000 |
| | VZ | 0.0000 | 0.0000 | 1.0000 |
| C0 | 0.000000 | | | |

TABLE 19

Optical System 3   Display Surface S0   N0 = N1 = 1

| Local Coord. | | x | y | z |
|---|---|---|---|---|
| Position | | 0.0000 | 0.0000 | 0.0000 |
| Vector | VX | 1.0000 | 0.0000 | 0.0000 |
| | VY | 0.0000 | 1.0000 | 0.0000 |
| | VZ | 0.0000 | 0.0000 | 1.0000 |
| C0 | 0.000000 | | | |

TABLE 20

Optical System 3   Reflection Surface S1   N0 = N1 = 1

| Local Coord. | | x | y | z |
|---|---|---|---|---|
| Position | | 69.4270 | 7.8941 | 0.0000 |
| Vector | VX | 0.9839 | 0.1790 | 0.0000 |
| | VY | −0.1790 | 0.9839 | 0.0000 |
| | Vz | 0.0000 | 0.0000 | 1.0000 |
| C0 | −0.010127 | | | |

TABLE 21

Optical System 3   Aperture Surface APR   N0 = N1 = 1

| Local Coord. | | x | y | z |
|---|---|---|---|---|
| Position | | 20.4580 | −18.5000 | 0.0000 |
| Vector | VX | −1.0000 | 0.0000 | 0.0000 |
| | VY | 0.0000 | 1.0000 | 0.0000 |
| | VZ | 0.0000 | 0.0000 | −1.0000 |
| C0 | 0.000000 | | | |
| R | 7.500000 | | | |

TABLE 22

Optical System 3   Reflection Surface S2   N0 = N1 = 1

| Local Coord. | x | y | z |
|---|---|---|---|
| Position Vector | −29.7470 | 7.8941 | 0.0000 |
| VX | −0.9839 | −0.1790 | 0.0000 |
| VY | −0.1790 | 0.9839 | 0.0000 |
| VZ | 0.0000 | 0.0000 | −1.0000 |

| C0 | 0.018770 | | | | |
|---|---|---|---|---|---|
| ε | A4 | A6 | A8 | A10 | A12 |
| 1.0 | $0.00000 \times 10^0$ | $0.00000 \times 10^0$ | $0.00000 \times 10^0$ | $0.00000 \times 10^0$ | $0.00000 \times 10^0$ |

| Bjk | j = 0 | j = 1 | j = 2 | j = 3 | j = 4 |
|---|---|---|---|---|---|
| k = 0 | $0.00000 \times 10^0$ | $0.00000 \times 10^0$ | $1.21238 \times 10^{-3}$ | $2.12367 \times 10^{-4}$ | $5.37251 \times 10^{-7}$ |
| k = 2 | $-8.62165 \times 10^{-3}$ | $-3.66091 \times 10^{-4}$ | $-2.26969 \times 10^{-5}$ | $-5.38836 \times 10^{-7}$ | $-5.11637 \times 10^{-9}$ |
| k = 4 | $-1.71003 \times 10^{-6}$ | $-1.38703 \times 10^{-7}$ | $-2.51676 \times 10^{-9}$ | $0.00000 \times 10^0$ | $0.00000 \times 10^0$ |
| k = 6 | $2.11873 \times 10^{-10}$ | $0.00000 \times 10^0$ | $0.00000 \times 10^0$ | $0.00000 \times 10^0$ | $0.00000 \times 10^0$ |
| k = 8 | $0.00000 \times 10^0$ | $0.00000 \times 10^0$ | $0.00000 \times 10^0$ | | |
| k = 10 | $0.00000 \times 10^0$ | | | | |

| Bjk | j = 5 | j = 6 | j = 7 | j = 8 | j = 9 |
|---|---|---|---|---|---|
| k = 0 | $-5.07772 \times 10^{-8}$ | $-8.55741 \times 10^{-10}$ | $0.00000 \times 10^0$ | $0.00000 \times 10^0$ | $0.00000 \times 10^0$ |
| k = 2 | $0.00000 \times 10^0$ | $0.00000 \times 10^0$ | $0.00000 \times 10^0$ | $0.00000 \times 10^0$ | |
| k = 4 | $0.00000 \times 10^0$ | $0.00000 \times 10^0$ | | k = 0, j = 10 | $0.00000 \times 10^0$ |

TABLE 23

Optical System 3  Reflection Surface S3  N0 = N1 = 1

| Local Coord. | x | y | z |
|---|---|---|---|
| Position Vector | 80.3720 | −18.2839 | 0.0000 |
| VX | 0.9974 | −0.0721 | 0.0000 |
| VY | 0.0721 | 0.9974 | 0.0000 |
| VZ | 0.0000 | 0.0000 | 1.0000 |

| C0 | −0.000535 | | | | |
|---|---|---|---|---|---|
| $\epsilon$ | A4 | A6 | A8 | A10 | A12 |
| 1.0 | $1.33031 \times 10^{-7}$ | $-1.45920 \times 10^{-11}$ | $1.43320 \times 10^{-15}$ | $-9.40428 \times 10^{-20}$ | $1.72038 \times 10^{-24}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $1.11969 \times 10^{-3}$ | $3.51376 \times 10^{-5}$ | $3.17171 \times 10^{-7}$ |
| k = 2 | $1.69328 \times 10^{-4}$ | $3.15820 \times 10^{-5}$ | $5.48929 \times 10^{-7}$ | $5.88513 \times 10^{-9}$ | $-4.57947 \times 10^{-12}$ |
| k = 4 | $-9.25879 \times 10^{-8}$ | $-6.00757 \times 10^{-9}$ | $-1.99538 \times 10^{-10}$ | $-1.90981 \times 10^{-12}$ | $-2.22310 \times 10^{-15}$ |
| k = 6 | $-3.01004 \times 10^{-11}$ | $-3.86915 \times 10^{-13}$ | $8.63536 \times 10^{-15}$ | $7.93363 \times 10^{-17}$ | $1.59662 \times 10^{-19}$ |
| k = 8 | $3.61883 \times 10^{-15}$ | $2.05687 \times 10^{-16}$ | $1.10643 \times 10^{-18}$ | | |
| k = 10 | $8.29785 \times 10^{-19}$ | | | | |

| Bjk | j = 5 | j = 6 | j = 7 | j = 8 | j = 9 |
|---|---|---|---|---|---|
| k = 0 | $1.59029 \times 10^{-9}$ | $-4.69440 \times 10^{-12}$ | $3.13154 \times 10^{-14}$ | $8.26065 \times 10^{-16}$ | $-3.04319 \times 10^{-19}$ |
| k = 2 | $-7.60556 \times 10^{-14}$ | $1.83950 \times 10^{-15}$ | $8.18707 \times 10^{-19}$ | $1.87066 \times 10^{-20}$ | |
| k = 4 | $2.58291 \times 10^{-17}$ | $1.55749 \times 10^{-19}$ | | k = 0, j = 10 | $-3.90606 \times 10^{-21}$ |

TABLE 24

Optical System 3  Reflection Surface S4  N0 = N1 = 1

| Local Coord. | | x | y | z |
|---|---|---|---|---|
| Position | | −23.0130 | −18.2839 | 0.0000 |
| Vector | VX | −0.9974 | 0.0721 | 0.0000 |
| | VY | 0.0721 | 0.9974 | 0.0000 |
| | VZ | 0.0000 | 0.0000 | −1.0000 |
| C0 | −0.002304 | | | |

| $\epsilon$ | A4 | A6 | A8 | A10 | A12 |
|---|---|---|---|---|---|
| 1.0 | $2.44289 \times 10^{-7}$ | $1.65352 \times 10^{-10}$ | $-6.73355 \times 10^{-16}$ | $-1.18443 \times 10^{-19}$ | $4.70561 \times 10^{-24}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $-6.95267 \times 10^{-3}$ | $-3.49239 \times 10^{-4}$ | $-2.78473 \times 10^{-6}$ |
| k = 2 | $9.89101 \times 10^{-3}$ | $-9.28656 \times 10^{-5}$ | $-4.76783 \times 10^{-6}$ | $-1.77098 \times 10^{-8}$ | $-1.01890 \times 10^{-11}$ |
| k = 4 | $-2.10882 \times 10^{-6}$ | $-4.96136 \times 10^{-9}$ | $4.68083 \times 10^{-10}$ | $1.16425 \times 10^{-11}$ | $-5.43841 \times 10^{-14}$ |
| k = 6 | $2.39575 \times 10^{-10}$ | $7.41126 \times 10^{-12}$ | $-1.58894 \times 10^{-14}$ | $-1.29506 \times 10^{-15}$ | $-7.23439 \times 10^{-18}$ |
| k = 8 | $-3.21365 \times 10^{-14}$ | $-6.82522 \times 10^{-16}$ | $-4.35343 \times 10^{-18}$ | | |
| k = 10 | $5.47012 \times 10^{-19}$ | | | | |

| Bjk | j = 5 | j = 6 | j = 7 | j = 8 | j = 9 |
|---|---|---|---|---|---|
| k = 0 | $5.54297 \times 10^{-8}$ | $1.15405 \times 10^{-9}$ | $1.09054 \times 10^{-11}$ | $2.94650 \times 10^{-14}$ | $-1.20856 \times 10^{-16}$ |
| k = 2 | $1.02369 \times 10^{-12}$ | $-1.05810 \times 10^{-13}$ | $-1.27410 \times 10^{-15}$ | $-4.29903 \times 10^{-18}$ | |
| k = 4 | $-1.72956 \times 10^{-15}$ | $-7.68871 \times 10^{-18}$ | | k = 0, j = 10 | $-6.57045 \times 10^{-19}$ |

TABLE 25

Optical System 3  Reflection Surface S5  N0= N1 = 1

| Local Coord. | | x | y | z |
|---|---|---|---|---|
| Position | | 66.6140 | −230.4160 | 0.0000 |
| Vector | VX | 0.9973 | −0.0734 | 0.0000 |
| | VY | 0.0734 | 0.9973 | 0.0000 |
| | VZ | 0.0000 | 0.0000 | 1.0000 |
| C0 | −0.000341 | | | |

TABLE 26

Optical System 3  Projection Surface S6  N0 = N1 = 1

| Local Coord. | | x | y | z |
|---|---|---|---|---|
| Position | | −121.1656 | −579.3658 | 0.0000 |
| Vector | VX | −0.9973 | 0.0734 | 0.0000 |
| | VY | −0.0734 | −0.9973 | 0.0000 |
| | VZ | 0.0000 | 0.0000 | 1.0000 |
| C0 | 0.000000 | | | |

TABLE 27

| Optical System 4 Local Coord. | | Display Surface S0 x | N0 = N1 = 1 y | z |
|---|---|---|---|---|
| | Position | 0.0000 | 0.0000 | 0.0000 |
| Vector | VX | 1.0000 | 0.0000 | 0.0000 |
| | VY | 0.0000 | 1.0000 | 0.0000 |
| | VZ | 0.0000 | 0.0000 | 1.0000 |
| CO | 0.000000 | | | |

TABLE 28

| Optical System 4 Local Coord. | | Reflection Surface S1 x | N0 = N1 = 1 y | z |
|---|---|---|---|---|
| | Position | 64.2026 | 11.2039 | 0.0000 |
| Vector | VX | 0.9778 | 0.2096 | 0.0000 |
| | VY | −0.2096 | 0.9778 | 0.0000 |
| | VZ | 0.0000 | 0.0000 | 1.0000 |
| CO | 0.010852 | | | |

TABLE 29

| Optical System 4 Local Coord. | | Aperture Surface APR x | N0 = N1 = 1 y | z |
|---|---|---|---|---|
| | Position | 20.4442 | −16.0000 | 0.0000 |
| Vector | VX | −1.0000 | 0.0000 | 0.0000 |
| | VY | 0.0000 | 1.0000 | 0.0000 |
| | VZ | 0.0000 | 0.0000 | −1.0000 |
| CO | 0.000000 | | | |
| R | 7.000000 | | | |

TABLE 30

| Optical System 4 | Reflection Surface S2 Local Coord. | | N0 = N1 = 1 x | y | z |
|---|---|---|---|---|---|
| | Position | | −29.5149 | 11.2039 | 0.0000 |
| | Vector | VX | −0.9778 | −0.2096 | 0.0000 |
| | | VY | −0.2096 | 0.9778 | 0.0000 |
| | | VZ | 0.0000 | 0.0000 | −1.0000 |
| CO | 0.019378 | | | | |

| ε | A4 | A6 | A8 | A10 | A12 |
|---|---|---|---|---|---|
| 1.0 | $0.00000 \times 10^0$ | $0.00000 \times 10^0$ | $0.00000 \times 10^0$ | $0.00000 \times 10^0$ | $0.00000 \times 10^0$ |

| Bjk | j = 0 | j = 1 | j = 2 | j = 3 | j = 4 |
|---|---|---|---|---|---|
| k = 0 | $0.00000 \times 10^0$ | $0.00000 \times 10^0$ | $2.45664 \times 10^{-3}$ | $2.69755 \times 10^{-4}$ | $1.64268 \times 10^{-6}$ |
| k = 2 | $-8.23380 \times 10^{-3}$ | $-3.27914 \times 10^{-4}$ | $-2.17884 \times 10^{-5}$ | $-5.21604 \times 10^{-7}$ | $-4.97548 \times 10^{-9}$ |
| k = 4 | $-3.33020 \times 10^{-6}$ | $-2.47297 \times 10^{-7}$ | $-4.05847 \times 10^{-9}$ | $0.00000 \times 10^0$ | $0.00000 \times 10^0$ |
| k = 6 | $2.21948 \times 10^{-10}$ | $0.00000 \times 10^0$ | $0.00000 \times 10^0$ | $0.00000 \times 10^0$ | $0.00000 \times 10^0$ |
| k = 8 | $0.00000 \times 10^0$ | $0.00000 \times 10^0$ | $0.00000 \times 10^0$ | | |
| k = 10 | $0.00000 \times 10^0$ | | | | |

| Bjk | j = 5 | j = 6 | j = 7 | j = 8 | j = 9 |
|---|---|---|---|---|---|
| k = 0 | $-4.18004 \times 10^{-8}$ | $-9.04478 \times 10^{-10}$ | $0.00000 \times 10^0$ | $0.00000 \times 10^0$ | $0.00000 \times 10^0$ |
| k = 2 | $0.00000 \times 10^0$ | $0.00000 \times 10^0$ | $0.00000 \times 10^0$ | $0.00000 \times 10^0$ | |
| k = 4 | $0.00000 \times 10^0$ | $0.00000 \times 10^0$ | | k = 0, j = 10 | $0.00000 \times 10^0$ |

TABLE 31

| Optical System 4 | Reflection Surface S3 Local Coord. | | N0 = N1 = 1 x | y | z |
|---|---|---|---|---|---|
| | Position | | 80.8863 | −17.9729 | 0.0000 |
| | Vector | VX | 0.9963 | −0.0858 | 0.0000 |
| | | VY | 0.0858 | 0.9963 | 0.0000 |
| | | VZ | 0.0000 | 0.0000 | 1.0000 |
| CO | −0.000276 | | | | |

TABLE 31-continued

| ε | A4 | A6 | A8 | A10 | A12 |
|---|---|---|---|---|---|
| 1.0 | $1.18994 \times 10^{-7}$ | $-1.46931 \times 10^{-11}$ | $1.49946 \times 10^{-15}$ | $-9.92594 \times 10^{-20}$ | $2.87661 \times 10^{-24}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $1.39808 \times 10^{-3}$ | $3.21760 \times 10^{-5}$ | $2.75527 \times 10^{-7}$ |
| k = 2 | $5.09207 \times 10^{-4}$ | $2.66885 \times 10^{-5}$ | $5.00012 \times 10^{-7}$ | $7.13742 \times 10^{-9}$ | $-6.13828 \times 10^{-12}$ |
| k = 4 | $-4.82971 \times 10^{-8}$ | $-3.74257 \times 10^{-9}$ | $-2.01518 \times 10^{-10}$ | $-2.26755 \times 10^{-12}$ | $1.21891 \times 10^{-16}$ |
| k = 6 | $-2.10713 \times 10^{-11}$ | $-3.11519 \times 10^{-13}$ | $1.33183 \times 10^{-14}$ | $4.16834 \times 10^{-17}$ | $-6.24911 \times 10^{-19}$ |
| k = 8 | $-1.00114 \times 10^{-14}$ | $2.07844 \times 10^{-16}$ | $-2.76807 \times 10^{-20}$ | | |
| k = 10 | $5.12888 \times 10^{-18}$ | | | | |

| Bjk | j = 5 | j = 6 | j = 7 | j = 8 | j = 9 |
|---|---|---|---|---|---|
| k = 0 | $1.84098 \times 10^{-9}$ | $-2.89115 \times 10^{-12}$ | $-3.22341 \times 10^{-15}$ | $9.48022 \times 10^{-16}$ | $3.20982 \times 10^{-18}$ |
| k = 2 | $-2.27499 \times 10^{-13}$ | $3.00666 \times 10^{-15}$ | $-2.07312 \times 10^{-18}$ | $-1.96980 \times 10^{-19}$ | |
| k = 4 | $2.98608 \times 10^{-17}$ | $-3.72913 \times 10^{-19}$ | | k = 0, j = 10 | $-9.71831 \times 10^{-21}$ |

TABLE 32

| Optical System 4 | Reflection Surface S4 | N0 = N1 = 1 | | |
|---|---|---|---|---|
| | Local Coord. | x | y | z |
| Position | | -25.3014 | -17.9729 | 0.0000 |
| Vector | VX | -0.9963 | 0.0858 | 0.0000 |
| | VY | 0.0858 | 0.9963 | 0.0000 |
| | VZ | 0.0000 | 0.0000 | -1.0000 |
| CO | -0.002135 | | | |

| ε | A4 | A6 | A8 | A10 | A12 |
|---|---|---|---|---|---|
| 1.0 | $2.57802 \times 10^{-7}$ | $1.65128 \times 10^{-10}$ | $-6.75574 \times 10^{-16}$ | $-1.18416 \times 10^{-19}$ | $4.71313 \times 10^{-24}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $-6.81596 \times 10^{-3}$ | $-3.44209 \times 10^{-4}$ | $-2.80808 \times 10^{-6}$ |
| k = 2 | $9.86585 \times 10^{-3}$ | $-7.50296 \times 10^{-5}$ | $-4.56250 \times 10^{-6}$ | $-1.73959 \times 10^{-8}$ | $-1.70921 \times 10^{-11}$ |
| k = 4 | $-2.13631 \times 10^{-6}$ | $-6.78865 \times 10^{-9}$ | $4.41957 \times 10^{-10}$ | $1.15870 \times 10^{-11}$ | $-5.39965 \times 10^{-14}$ |
| k = 6 | $2.42055 \times 10^{-10}$ | $7.45415 \times 10^{-12}$ | $-1.67568 \times 10^{-14}$ | $-1.32129 \times 10^{-15}$ | $-7.35591 \times 10^{-18}$ |
| k = 8 | $-3.40926 \times 10^{-14}$ | $-7.04258 \times 10^{-16}$ | $-4.49585 \times 10^{-18}$ | | |
| k = 10 | $6.94819 \times 10^{-19}$ | | | | |

| Bjk | j = 5 | j = 6 | j = 7 | j = 8 | j = 9 |
|---|---|---|---|---|---|
| k = 0 | $5.52209 \times 10^{-8}$ | $1.15733 \times 10^{-9}$ | $1.09217 \times 10^{-11}$ | $2.93609 \times 10^{-14}$ | $-1.20299 \times 10^{-16}$ |
| k = 2 | $1.02100 \times 10^{-12}$ | $-1.05660 \times 10^{-13}$ | $-1.27491 \times 10^{-15}$ | $-4.30576 \times 10^{-18}$ | |
| k = 4 | $-1.72863 \times 10^{-15}$ | $-7.68711 \times 10^{-18}$ | | k = 0, j = 10 | $-6.49911 \times 10^{-19}$ |

TABLE 33

| Optical System 4 | Reflection Surface S5 | N0 = N1 = 1 | | |
|---|---|---|---|---|
| Local Coord. | | x | y | z |
| Position | | 67.4488 | -230.9497 | 0.0000 |
| Vector | VX | 0.9976 | -0.0697 | 0.0000 |
| | VY | 0.0697 | 0.9976 | 0.0000 |
| | VZ | 0.0000 | 0.0000 | 1.0000 |
| CO | -0.000315 | | | |

TABLE 34

| Optical System 4 | Projection Surface S6 | N0 = N1 = 1 | | |
|---|---|---|---|---|
| Local Coord. | | x | y | z |
| Position | | -118.4326 | -575.9054 | 0.0000 |
| Vector | VX | -0.9976 | 0.0697 | 0.0000 |
| | VY | -0.0697 | -0.9976 | 0.0000 |

TABLE 34-continued

| Optical System 4 | Projection Surface S6 | N0 = N1 = 1 | | |
|---|---|---|---|---|
| Local Coord. | | x | y | z |
| | VZ | 0.0000 | 0.0000 | 1.0000 |
| CO | 0.000000 | | | |

TABLE 35

| Optical System 5 | Display Surface S0 | N0 = N1 = 1 | | |
|---|---|---|---|---|
| Local Coord. | | x | y | z |
| Position | | 0.0000 | 0.0000 | 0.0000 |
| Vector | VX | 1.0000 | 0.0000 | 0.0000 |
| | VY | 0.0000 | 1.0000 | 0.0000 |
| | VZ | 0.0000 | 0.0000 | 1.0000 |
| CO | 0.000000 | | | |

TABLE 36

| Optical System 5 | Reflection Surface S1 | N0 = N1 = 1 | | |
|---|---|---|---|---|
| | Local Coord. | x | y | z |
| Position | | 21.7453 | 60.9398 | 0.0000 |
| Vector | VX | 0.4461 | 0.8950 | 0.0000 |
| | VY | −0.8950 | 0.4461 | 0.0000 |
| | VZ | 0.0000 | 0.0000 | 1.0000 |
| CO | −0.012720 | | | |

| $\epsilon$ | A4 | A6 | A8 | A10 | A12 |
|---|---|---|---|---|---|
| 1.0 | $-2.63421 \times 10^{-7}$ | $-7.11115 \times 10^{-12}$ | $-8.13595 \times 10^{-16}$ | $0.00000 \times 10^{0}$ | $0.00000 \times 10^{0}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $-3.37168 \times 10^{-4}$ | $2.74842 \times 10^{-5}$ | $6.11520 \times 10^{-7}$ |
| k = 2 | $-3.15678 \times 10^{-4}$ | $2.50874 \times 10^{-5}$ | $1.04086 \times 10^{-6}$ | $0.00000 \times 10^{0}$ | $0.00000 \times 10^{0}$ |
| k = 4 | $3.80668 \times 10^{-7}$ | $0.00000 \times 10^{0}$ | $0.00000 \times 10^{0}$ | $0.00000 \times 10^{0}$ | $0.00000 \times 10^{0}$ |
| k = 6 | $0.00000 \times 10^{0}$ | $0.00000 \times 10^{0}$ | $0.00000 \times 10^{0}$ | $0.00000 \times 10^{0}$ | $0.00000 \times 10^{0}$ |
| k = 8 | $0.00000 \times 10^{0}$ | $0.00000 \times 10^{0}$ | $0.00000 \times 10^{0}$ | | |
| k = 10 | $0.00000 \times 10^{0}$ | | | | |

| Bjk | j = 5 | j = 6 | j = 7 | j = 8 | j = 9 |
|---|---|---|---|---|---|
| k = 0 | $0.00000 \times 10^{0}$ | $0.00000 \times 10^{0}$ | $0.00000 \times 10^{0}$ | $0.00000 \times 10^{0}$ | $0.00000 \times 10^{0}$ |
| k = 2 | $0.00000 \times 10^{0}$ | $0.00000 \times 10^{0}$ | $0.00000 \times 10^{0}$ | $0.00000 \times 10^{0}$ | |
| k = 4 | $0.00000 \times 10^{0}$ | $0.00000 \times 10^{0}$ | | k = 0, j = 10 | $0.00000 \times 10^{0}$ |

TABLE 37

| Optical System 5 | Aperture Surface APR | N0 = N1 = 1 | | |
|---|---|---|---|---|
| | Local Coord. | x | y | z |
| Position | | 20.0000 | −20.0000 | 0.0000 |
| Vector | VX | −1.0000 | 0.0000 | 0.0000 |
| | VY | 0.0000 | 1.0000 | 0.0000 |
| | VZ | 0.0000 | 0.0000 | −1.0000 |
| CO | 0.000000 | | | |
| R | 7.300000 | | | |

TABLE 38

| Optical System 5 | Reflection Surface S2 | N0 = N1 = 1 | | |
|---|---|---|---|---|
| | Local Coord. | x | y | z |
| Position | | −11.2656 | −23.0366 | 0.0000 |
| Vector | VX | −0.9931 | 0.1170 | 0.0000 |
| | VY | 0.1170 | 0.9931 | 0.0000 |
| | VZ | 0.0000 | 0.0000 | −1.0000 |
| CO | 0.042528 | | | |

| $\epsilon$ | A4 | A6 | A8 | A10 | A12 |
|---|---|---|---|---|---|
| 1.0 | $6.76652 \times 10^{-4}$ | $0.00000 \times 10^{0}$ | $0.00000 \times 10^{0}$ | $0.00000 \times 10^{0}$ | $0.00000 \times 10^{0}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $-1.62911 \times 10^{-2}$ | $-8.12982 \times 10^{-5}$ | $-6.83741 \times 10^{-4}$ |
| k = 2 | $-1.28579 \times 10^{-2}$ | $-1.32670 \times 10^{-4}$ | $-2.15711 \times 10^{-7}$ | $-2.74752 \times 10^{-8}$ | |
| k = 4 | $-6.81180 \times 10^{-4}$ | $-9.46895 \times 10^{-8}$ | $-1.77297 \times 10^{-8}$ | $0.00000 \times 10^{0}$ | $0.00000 \times 10^{0}$ |
| k = 6 | $-6.87691 \times 10^{-9}$ | $0.00000 \times 10^{0}$ | $0.00000 \times 10^{0}$ | $0.00000 \times 10^{0}$ | $0.00000 \times 10^{0}$ |
| k = 8 | $0.00000 \times 10^{0}$ | $0.00000 \times 10^{0}$ | $0.00000 \times 10^{0}$ | | |
| k = 10 | $0.00000 \times 10^{0}$ | | | | |

| Bjk | j = 5 | j = 6 | j = 7 | j = 8 | j = 9 |
|---|---|---|---|---|---|
| k = 0 | $-7.92388 \times 10^{-8}$ | $-9.20760 \times 10^{-9}$ | $0.00000 \times 10^{0}$ | $0.00000 \times 10^{0}$ | $0.00000 \times 10^{0}$ |
| k = 2 | $0.00000 \times 10^{0}$ | $0.00000 \times 10^{0}$ | $0.00000 \times 10^{0}$ | $0.00000 \times 10^{0}$ | |
| k = 4 | $0.00000 \times 10^{0}$ | $0.00000 \times 10^{0}$ | | k = 0, j = 10 | $0.00000 \times 10^{0}$ |

TABLE 39

| Optical System 5 | Reflection Surface S3 | N0 = N1 = 1 | | | |
|---|---|---|---|---|---|
| | Local Coord. | | x | y | z |
| | Position | | 130.4119 | −127.0660 | 0.0000 |
| | Vector | VX | 0.9579 | −0.2871 | 0.0000 |
| | | VY | 0.2871 | 0.9579 | 0.0000 |
| | | VZ | 0.0000 | 0.0000 | 1.0000 |
| C0 | 0.005744 | | | | |

| $\epsilon$ | A4 | A6 | A8 | A10 | A12 |
|---|---|---|---|---|---|
| 1.0 | $2.81454 \times 10^{-7}$ | $6.58048 \times 10^{-13}$ | $-2.76662 \times 10^{-17}$ | $0.00000 \times 10^{0}$ | $0.00000 \times 10^{0}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $-4.76872 \times 10^{-3}$ | $1.25466 \times 10^{-6}$ | $-3.07529 \times 10^{-7}$ |
| k = 2 | $-4.22501 \times 10^{-3}$ | $2.29119 \times 10^{-6}$ | $-6.13590 \times 10^{-7}$ | $6.23463 \times 10^{-11}$ | $4.87799 \times 10^{-13}$ |
| k = 4 | $-3.11654 \times 10^{-7}$ | $3.24869 \times 10^{-11}$ | $-2.63277 \times 10^{-12}$ | $3.78986 \times 10^{-15}$ | $-3.49221 \times 10^{-16}$ |
| k = 6 | $-6.02337 \times 10^{-13}$ | $-3.00686 \times 10^{-15}$ | $-3.63082 \times 10^{-17}$ | $-1.88505 \times 10^{-19}$ | $1.47325 \times 10^{-20}$ |
| k = 8 | $-3.88386 \times 10^{-17}$ | $1.74939 \times 10^{-19}$ | $5.46610 \times 10^{-21}$ | | |
| k = 10 | $1.49722 \times 10^{-21}$ | | | | |

| Bjk | j = 5 | j = 6 | j = 7 | j = 8 | j = 9 |
|---|---|---|---|---|---|
| k = 0 | $6.70660 \times 10^{-11}$ | $-3.57734 \times 10^{-12}$ | $1.31076 \times 10^{-15}$ | $2.46425 \times 10^{-16}$ | $2.68115 \times 10^{-18}$ |
| k = 2 | $5.71044 \times 10^{-15}$ | $3.40640 \times 10^{-17}$ | $-6.52393 \times 10^{-18}$ | $7.01454 \times 10^{-20}$ | |
| k = 4 | $1.28825 \times 10^{-18}$ | $-3.08714 \times 10^{-21}$ | | k = 0, j = 10 | $-3.56229 \times 10^{-20}$ |

TABLE 40

| Optical System 5 | Reflection Surface S4 | N0 = N1 = 1 | | | |
|---|---|---|---|---|---|
| | Local Coord. | | x | y | z |
| | Position | | 2.7625 | −55.4028 | 0.0000 |
| | Vector | VX | −0.9723 | −0.2339 | 0.0000 |
| | | VY | −0.2339 | 0.9723 | 0.0000 |
| | | VZ | 0.0000 | 0.0000 | −1.0000 |
| C0 | 0.007953 | | | | |

| $\epsilon$ | A4 | A6 | A8 | A10 | A12 |
|---|---|---|---|---|---|
| 1.0 | $-7.04722 \times 10^{-5}$ | $2.01755 \times 10^{-10}$ | $-1.16115 \times 10^{-15}$ | $0.00000 \times 10^{0}$ | $0.00000 \times 10^{0}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $-2.10192 \times 10^{-3}$ | $-3.22553 \times 10^{-4}$ | $6.51389 \times 10^{-5}$ |
| k = 2 | $4.82700 \times 10^{-5}$ | $-6.37026 \times 10^{-5}$ | $1.39881 \times 10^{-4}$ | $1.09430 \times 10^{-8}$ | $-4.22018 \times 10^{-10}$ |
| k = 4 | $7.01773 \times 10^{-5}$ | $4.05896 \times 10^{-9}$ | $-4.83152 \times 10^{-10}$ | $-1.22576 \times 10^{-13}$ | $-2.14261 \times 10^{-15}$ |
| k = 6 | $-1.77306 \times 10^{-10}$ | $2.52541 \times 10^{-14}$ | $-5.72350 \times 10^{-16}$ | $1.35072 \times 10^{-17}$ | $4.42160 \times 10^{-19}$ |
| k = 8 | $-4.64576 \times 10^{-16}$ | $-9.65890 \times 10^{-18}$ | $1.71637 \times 10^{-20}$ | | |
| k = 10 | $2.45793 \times 10^{-20}$ | | | | |

| Bjk | j = 5 | j = 6 | j = 7 | j = 8 | j = 9 |
|---|---|---|---|---|---|
| k = 0 | $-4.08315 \times 10^{-8}$ | $-3.76042 \times 10^{-10}$ | $-8.56099 \times 10^{-13}$ | $-7.63991 \times 10^{-15}$ | $-1.45981 \times 10^{-16}$ |
| k = 2 | $-6.24706 \times 10^{-13}$ | $-1.55827 \times 10^{-14}$ | $-2.12105 \times 10^{-16}$ | $-1.15899 \times 10^{-18}$ | |
| k = 4 | $6.25486 \times 10^{-17}$ | $8.12577 \times 10^{-19}$ | | k = 0, j = 10 | $-8.78317 \times 10^{-19}$ |

TABLE 41

| Optical System 5 | Reflection Surface S5 | N0 = N1 = 1 | | | |
|---|---|---|---|---|---|
| | Local Coord. | | x | y | z |
| | Position | | 205.5187 | 1601.0519 | 0.0000 |
| | Vector | VX | 0.9746 | −0.2239 | 0.0000 |
| | | VY | 0.2239 | 0.9746 | 0.0000 |
| | | VZ | 0.0000 | 0.0000 | 1.0000 |
| C0 | 0.000000 | | | | |

TABLE 41-continued

| ε | A4 | A6 | A8 | A10 | A12 |
|---|---|---|---|---|---|
| 1.0 | $0.00000 \times 10^0$ | $0.00000 \times 10^0$ | $0.00000 \times 10^0$ | $0.00000 \times 10^0$ | $0.00000 \times 10^0$ |

| Bjk | j = 0 | j = 1 | j = 2 | j = 3 | j = 4 |
|---|---|---|---|---|---|
| k = 0 | $0.00000 \times 10^0$ | $0.00000 \times 10^0$ | $3.76551 \times 10^{-4}$ | $2.12515 \times 10^{-7}$ | $3.22917 \times 10^{-11}$ |
| k = 2 | $0.00000 \times 10^0$ | $0.00000 \times 10^0$ | $0.00000 \times 10^0$ | $0.00000 \times 10^0$ | $0.00000 \times 10^0$ |
| k = 4 | $0.00000 \times 10^0$ | $0.00000 \times 10^0$ | $0.00000 \times 10^0$ | $0.00000 \times 10^0$ | $0.00000 \times 10^0$ |
| k = 6 | $0.00000 \times 10^0$ | $0.00000 \times 10^0$ | $0.00000 \times 10^0$ | $0.00000 \times 10^0$ | $0.00000 \times 10^0$ |
| k = 8 | $0.00000 \times 10^0$ | $0.00000 \times 10^0$ | $0.00000 \times 10^0$ | | |
| k = 10 | $0.00000 \times 10^0$ | | | | |

| Bjk | j = 5 | j = 6 | j = 7 | j = 8 | j = 9 |
|---|---|---|---|---|---|
| k = 0 | $0.00000 \times 10^0$ | $0.00000 \times 10^0$ | $0.00000 \times 10^0$ | $0.00000 \times 10^0$ | $0.00000 \times 10^0$ |
| k = 2 | $0.00000 \times 10^0$ | $0.00000 \times 10^0$ | $0.00000 \times 10^0$ | $0.00000 \times 10^0$ | |
| k = 4 | $0.00000 \times 10^0$ | $0.00000 \times 10^0$ | | k = 0, j = 10 | $0.00000 \times 10^0$ |

TABLE 42

Optical System 5    Projection Surface S6    N0 = N1 = 1

| Local Coord. | | x | y | z |
|---|---|---|---|---|
| Position | | −136.4199 | −581.6182 | 0.0000 |
| Vector | VX | −0.9829 | 0.1843 | 0.0000 |
| | VY | −0.1843 | −0.9829 | 0.0000 |
| | VZ | 0.0000 | 0.0000 | 1.0000 |
| CO | 0.000000 | | | |

TABLE 43

Optical System 6    Display Surface S0    N0 = N1 = 1

| Local Coord. | | x | y | z |
|---|---|---|---|---|
| Position | | 0.0000 | 0.0000 | 0.0000 |
| Vector | VX | 1.0000 | 0.0000 | 0.0000 |
| | VY | 0.0000 | 1.0000 | 0.0000 |
| | VZ | 0.0000 | 0.0000 | 1.0000 |
| CO | 0.000000 | | | |

TABLE 44

Optical System 6    Reflection Surface S1    N0 = N1 = 1

| Local Coord. | | x | y | z |
|---|---|---|---|---|
| Position | | 44.2910 | 67.8046 | 0.0000 |
| Vector | VX | 0.6117 | 0.7911 | 0.0000 |
| | VY | −0.7911 | 0.6117 | 0.0000 |
| | VZ | 0.0000 | 0.0000 | 1.0000 |
| CO | −0.009173 | | | |

| ε | A4 | A6 | A8 | A10 | A12 |
|---|---|---|---|---|---|
| 1.0 | $-7.20786 \times 10^{-7}$ | $4.04472 \times 10^{-13}$ | $-1.04238 \times 10^{-17}$ | $0.00000 \times 10^0$ | $0.00000 \times 10^0$ |

| Bjk | j = 0 | j = 1 | j = 2 | j = 3 | j = 4 |
|---|---|---|---|---|---|
| k = 0 | $0.00000 \times 10^0$ | $0.00000 \times 10^0$ | $-2.77769 \times 10^{-4}$ | $-2.80260 \times 10^{-6}$ | $6.99505 \times 10^{-7}$ |
| k = 2 | $-7.50027 \times 10^{-5}$ | $-2.26314 \times 10^{-6}$ | $1.41282 \times 10^{-6}$ | $0.00000 \times 10^0$ | $0.00000 \times 10^0$ |
| k = 4 | $7.09801 \times 10^{-7}$ | $0.00000 \times 10^0$ | $0.00000 \times 10^0$ | $0.00000 \times 10^0$ | $0.00000 \times 10^0$ |
| k = 6 | $0.00000 \times 10^0$ | $0.00000 \times 10^0$ | $0.00000 \times 10^0$ | $0.00000 \times 10^0$ | $0.00000 \times 10^0$ |
| k = 8 | $0.00000 \times 10^0$ | $0.00000 \times 10^0$ | $0.00000 \times 10^0$ | | |
| k = 10 | $0.00000 \times 10^0$ | | | | |

| Bjk | j = 5 | j = 6 | j = 7 | j = 8 | j = 9 |
|---|---|---|---|---|---|
| k = 0 | $0.00000 \times 10^0$ | $0.00000 \times 10^0$ | $0.00000 \times 10^0$ | $0.00000 \times 10^0$ | $0.00000 \times 10^0$ |
| k = 2 | $0.00000 \times 10^0$ | $0.00000 \times 10^0$ | $0.00000 \times 10^0$ | $0.00000 \times 10^0$ | |
| k = 4 | $0.00000 \times 10^0$ | $0.00000 \times 10^0$ | | k = 0, j = 10 | $0.00000 \times 10^0$ |

TABLE 45

Optical System 6  Aperture Surface APR  N0 = N1 = 1

| Local Coord. | | x | y | z |
|---|---|---|---|---|
| Position | | 32.5000 | −28.2500 | 0.0000 |
| Vector | VX | −1.0000 | 0.0000 | 0.0000 |
| | VY | 0.0000 | 1.0000 | 0.0000 |
| | VZ | 0.0000 | 0.0000 | −1.0000 |
| CO | 0.000000 | | | |
| R | 10.100000 | | | |

TABLE 46

Optical System 6  Reflection Surface S2  N0 = N1 = 1

| Local Coord. | | x | y | z |
|---|---|---|---|---|
| Position | | −21.3240 | −34.4423 | 0.0000 |
| Vector | VX | −0.9912 | 0.1327 | 0.0000 |
| | VY | 0.1327 | 0.9912 | 0.0000 |
| | VZ | 0.0000 | 0.0000 | −1.0000 |
| CO | 0.034293 | | | |

| $\epsilon$ | A4 | A6 | A8 | A10 | A12 |
|---|---|---|---|---|---|
| 1.0 | $8.55574 \times 10^{-4}$ | $0.00000 \times 10^{0}$ | $0.00000 \times 10^{0}$ | $0.00000 \times 10^{0}$ | $0.00000 \times 10^{0}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $-1.21524 \times 10^{-2}$ | $-4.37304 \times 10^{-5}$ | $-8.59296 \times 10^{-4}$ |
| k = 2 | $-1.19970 \times 10^{-2}$ | $-6.41594 \times 10^{-5}$ | $-1.71753 \times 10^{-3}$ | $-1.22475 \times 10^{-7}$ | $-7.73938 \times 10^{-9}$ |
| k = 4 | $-8.59005 \times 10^{-4}$ | $-7.81512 \times 10^{-8}$ | $-1.00359 \times 10^{-8}$ | $0.00000 \times 10^{0}$ | $0.00000 \times 10^{0}$ |
| k = 6 | $2.97470 \times 10^{-9}$ | $0.00000 \times 10^{0}$ | $0.00000 \times 10^{0}$ | $0.00000 \times 10^{0}$ | $0.00000 \times 10^{0}$ |
| k = 8 | $0.00000 \times 10^{0}$ | $0.00000 \times 10^{0}$ | $0.00000 \times 10^{0}$ | | |
| k = 10 | $0.00000 \times 10^{0}$ | | | | |

| Bjk | j = 5 | j = 6 | j = 7 | j = 8 | j = 9 |
|---|---|---|---|---|---|
| k = 0 | $-7.75773 \times 10^{-8}$ | $-2.56907 \times 10^{-9}$ | $0.00000 \times 10^{0}$ | $0.00000 \times 10^{0}$ | $0.00000 \times 10^{0}$ |
| k = 2 | $0.00000 \times 10^{0}$ | $0.00000 \times 10^{0}$ | $0.00000 \times 10^{0}$ | $0.00000 \times 10^{0}$ | |
| k = 4 | $0.00000 \times 10^{0}$ | $0.00000 \times 10^{0}$ | | k = 0, j = 10 | $0.00000 \times 10^{0}$ |

TABLE 47

Optical System 6  Reflection Surface S3  N0 = N1 = 1

| Local Coord. | | x | y | z |
|---|---|---|---|---|
| Position | | 132.7140 | −214.4690 | 0.0000 |
| Vector | VX | 0.9811 | −0.1936 | 0.0000 |
| | VY | 0.1936 | 0.9811 | 0.0000 |
| | VZ | 0.0000 | 0.0000 | 1.0000 |
| CO | 0.006016 | | | |

| $\epsilon$ | A4 | A6 | A8 | A10 | A12 |
|---|---|---|---|---|---|
| 1.0 | $2.98517 \times 10^{-7}$ | $4.53326 \times 10^{-11}$ | $-2.92745 \times 10^{-17}$ | $0.00000 \times 10^{0}$ | $0.00000 \times 10^{0}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $-4.02409 \times 10^{-3}$ | $2.02180 \times 10^{-6}$ | $-3.22458 \times 10^{-7}$ |
| k = 2 | $-4.22295 \times 10^{-3}$ | $5.72534 \times 10^{-6}$ | $-6.43236 \times 10^{-7}$ | $-1.07138 \times 10^{-11}$ | $-1.37364 \times 10^{-10}$ |
| k = 4 | $-3.25825 \times 10^{-7}$ | $-4.14132 \times 10^{-11}$ | $-1.37218 \times 10^{-10}$ | $0.00000 \times 10^{0}$ | $0.00000 \times 10^{0}$ |
| k = 6 | $-4.58180 \times 10^{-11}$ | $0.00000 \times 10^{0}$ | $0.00000 \times 10^{0}$ | $0.00000 \times 10^{0}$ | $0.00000 \times 10^{0}$ |
| k = 8 | $0.00000 \times 10^{0}$ | $0.00000 \times 10^{0}$ | $0.00000 \times 10^{0}$ | | |
| k = 10 | $0.00000 \times 10^{0}$ | | | | |

| Bjk | j = 5 | j = 6 | j = 7 | j = 8 | j = 9 |
|---|---|---|---|---|---|
| k = 0 | $-2.70440 \times 10^{-11}$ | $-4.57859 \times 10^{-11}$ | $0.00000 \times 10^{0}$ | $0.00000 \times 10^{0}$ | $0.00000 \times 10^{0}$ |
| k = 2 | $0.00000 \times 10^{0}$ | $0.00000 \times 10^{0}$ | $0.00000 \times 10^{0}$ | $0.00000 \times 10^{0}$ | |
| k = 4 | $0.00000 \times 10^{0}$ | $0.00000 \times 10^{0}$ | | k = 0, j = 10 | $0.00000 \times 10^{0}$ |

TABLE 48

Optical System 6  Reflection Surface S4  N0 = N1 = 1
Local Coord.        x           y           z

| | | x | y | z |
|---|---|---|---|---|
| Position | | −20.3350 | −114.7400 | 0.0000 |
| Vector | VX | −0.6875 | −0.7262 | 0.0000 |
| | VY | −0.7262 | 0.6875 | 0.0000 |
| | VZ | 0.0000 | 0.0000 | −1.0000 |
| CO | 0.007424 | | | |

| ε | A4 | A6 | A8 | A10 | A12 |
|---|---|---|---|---|---|
| 1.0 | $-7.00123 \times 10^{-5}$ | $2.19750 \times 10^{-10}$ | $-3.99819 \times 10^{-16}$ | $0.00000 \times 10^{0}$ | $0.00000 \times 10^{0}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $4.50953 \times 10^{-3}$ | $-2.76704 \times 10^{-4}$ | $6.56855 \times 10^{-5}$ |
| k = 2 | $7.38005 \times 10^{-4}$ | $-1.25092 \times 10^{-4}$ | $1.38184 \times 10^{-4}$ | $-2.75280 \times 10^{-9}$ | $-6.05913 \times 10^{-10}$ |
| k = 4 | $6.97482 \times 10^{-5}$ | $3.16474 \times 10^{-9}$ | $-5.93652 \times 10^{-10}$ | $0.00000 \times 10^{0}$ | $0.00000 \times 10^{0}$ |
| k = 6 | $-2.05534 \times 10^{-10}$ | $0.00000 \times 10^{0}$ | $0.00000 \times 10^{0}$ | $0.00000 \times 10^{0}$ | $0.00000 \times 10^{0}$ |
| k = 8 | $0.00000 \times 10^{0}$ | $0.00000 \times 10^{0}$ | $0.00000 \times 10^{0}$ | | |
| k = 10 | $0.00000 \times 10^{0}$ | | | | |

| Bjk | j = 5 | j = 6 | j = 7 | j = 8 | j = 9 |
|---|---|---|---|---|---|
| k = 0 | $-2.29840 \times 10^{-8}$ | $-2.55731 \times 10^{-10}$ | $0.00000 \times 10^{0}$ | $0.00000 \times 10^{0}$ | $0.00000 \times 10^{0}$ |
| k = 2 | $0.00000 \times 10^{0}$ | $0.00000 \times 10^{0}$ | $0.00000 \times 10^{0}$ | $0.00000 \times 10^{0}$ | |
| k = 4 | $0.00000 \times 10^{0}$ | $0.00000 \times 10^{0}$ | | k = 0, j = 10 | $0.00000 \times 10^{0}$ |

TABLE 49

Optical System 6  Reflection Surface S5  N0 = N1 = 1
Local Coord.        x           y           z

| | | x | y | z |
|---|---|---|---|---|
| Position | | 138.3890 | 0.0000 | 0.0000 |
| Vector | VX | 0.9988 | 0.0486 | 0.0000 |
| | VY | −0.0486 | 0.9988 | 0.0000 |
| | VZ | 0.0000 | 0.0000 | 1.0000 |
| CO | 0.000000 | | | |

| ε | A4 | A6 | A8 | A10 | A12 |
|---|---|---|---|---|---|
| 1.0 | $0.00000 \times 10^{0}$ | $0.00000 \times 10^{0}$ | $0.00000 \times 10^{0}$ | $0.00000 \times 10^{0}$ | $0.00000 \times 10^{0}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $0.00000 \times 10^{0}$ | $0.00000 \times 10^{0}$ | $0.00000 \times 10^{0}$ |
| k = 2 | $-2.71798 \times 10^{-4}$ | $0.00000 \times 10^{0}$ | $0.00000 \times 10^{0}$ | $0.00000 \times 10^{0}$ | $0.00000 \times 10^{0}$ |
| k = 4 | $2.96645 \times 10^{-10}$ | $0.00000 \times 10^{0}$ | $0.00000 \times 10^{0}$ | $0.00000 \times 10^{0}$ | $0.00000 \times 10^{0}$ |
| k = 6 | $-4.01443 \times 10^{-16}$ | $0.00000 \times 10^{0}$ | $0.00000 \times 10^{0}$ | $0.00000 \times 10^{0}$ | $0.00000 \times 10^{0}$ |
| k = 8 | $0.00000 \times 10^{0}$ | $0.00000 \times 10^{0}$ | $0.00000 \times 10^{0}$ | | |
| k = 10 | $0.00000 \times 10^{0}$ | | | | |

| Bjk | j = 5 | j = 6 | j = 7 | j = 8 | j = 9 |
|---|---|---|---|---|---|
| k = 0 | $0.00000 \times 10^{0}$ | $0.00000 \times 10^{0}$ | $0.00000 \times 10^{0}$ | $0.00000 \times 10^{0}$ | $0.00000 \times 10^{0}$ |
| k = 2 | $0.00000 \times 10^{0}$ | $0.00000 \times 10^{0}$ | $0.00000 \times 10^{0}$ | $0.00000 \times 10^{0}$ | |
| k = 4 | $0.00000 \times 10^{0}$ | $0.00000 \times 10^{0}$ | | k < 0, j = 10 | $0.00000 \times 10^{0}$ |

TABLE 50

Optical System 6  Projection Surface S6  N0 = N1 = 1
Local Coord.        x           y           z

| | | x | y | z |
|---|---|---|---|---|
| Position | | −4.2821 | −771.9747 | 0.0000 |
| Vector | VX | −0.9988 | −0.0486 | 0.0000 |
| | VY | 0.0486 | −0.9988 | 0.0000 |
| | VZ | 0.0000 | 0.0000 | 1.0000 |
| CO | 0.000000 | | | |

TABLE 51

Optical System 7  Display Surface S0  N0 = N1 = 1
Local Coord.        x           y           z

| | | x | y | z |
|---|---|---|---|---|
| Position | | 0.0000 | 0.0000 | 0.0000 |
| Vector | VX | 1.0000 | 0.0000 | 0.0000 |
| | VY | 0.0000 | 1.0000 | 0.0000 |
| | VZ | 0.0000 | 0.0000 | 1.0000 |
| CO | 0.000000 | | | |

TABLE 52

| Optical System 7 | Reflection Surface S1 | N0 = N1 = 1 | | |
|---|---|---|---|---|
| Local Coord. | | x | y | z |
| Position | | 32.4572 | 81.7631 | 0.0000 |
| Vector | VX | 0.5238 | 0.8518 | 0.0000 |
| | VY | −0.8518 | 0.5238 | 0.0000 |
| | VZ | 0.0000 | 0.0000 | 1.0000 |
| CO −0.009022 | | | | |

| $\epsilon$ | A4 | A6 | A8 | A10 | A12 |
|---|---|---|---|---|---|
| 1.0 | $-5.82472 \times 10^{-7}$ | $-4.54943 \times 10^{-12}$ | $4.51528 \times 10^{-17}$ | $0.00000 \times 10^0$ | $0.00000 \times 10^0$ |

| Bjk | j = 0 | j = 1 | j = 2 | j = 3 | j = 4 |
|---|---|---|---|---|---|
| k = 0 | $0.00000 \times 10^0$ | $0.00000 \times 10^0$ | $-9.25158 \times 10^{-4}$ | $4.80962 \times 10^{-6}$ | $6.98187 \times 10^{-7}$ |
| k = 2 | $-8.29246 \times 10^{-5}$ | $1.60950 \times 10^{-5}$ | $1.41030 \times 10^{-6}$ | $0.00000 \times 10^0$ | $0.00000 \times 10^0$ |
| k = 4 | $6.54045 \times 10^{-7}$ | $0.00000 \times 10^0$ | $0.00000 \times 10^0$ | $0.00000 \times 10^0$ | $0.00000 \times 10^0$ |
| k = 6 | $0.00000 \times 10^0$ | $0.00000 \times 10^0$ | $0.00000 \times 10^0$ | $0.00000 \times 10^0$ | $0.00000 \times 10^0$ |
| k = 8 | $0.00000 \times 10^0$ | $0.00000 \times 10^0$ | $0.00000 \times 10^0$ | | |
| k = 10 | $0.00000 \times 10^0$ | | | | |

| Bjk | j = 5 | j = 6 | j = 7 | j = 8 | j = 9 |
|---|---|---|---|---|---|
| k = 0 | $0.00000 \times 10^0$ | $0.00000 \times 10^0$ | $0.00000 \times 10^0$ | $0.00000 \times 10^0$ | $0.00000 \times 10^0$ |
| k = 2 | $0.00000 \times 10^0$ | $0.00000 \times 10^0$ | $0.00000 \times 10^0$ | $0.00000 \times 10^0$ | |
| k = 4 | $0.00000 \times 10^0$ | $0.00000 \times 10^0$ | | k = 0, j = 10 | $0.00000 \times 10^0$ |

TABLE 53

| Optical System 7 | Aperture Surface APR | N0 = N1 = 1 | | |
|---|---|---|---|---|
| Local Coord. | | x | y | z |
| Position | | 23.0020 | −25.7000 | 0.0000 |
| Vector | VX | −1.0000 | 0.0000 | 0.0000 |
| | VY | 0.0000 | 1.0000 | 0.0000 |
| | VZ | 0.0000 | 0.0000 | −1.0000 |
| CO | 0.000000 | | | |
| R | 10.900000 | | | |

TABLE 54

| Optical System 7 | Reflection Surface S2 | N0 = N1 = 1 | | |
|---|---|---|---|---|
| Local Coord. | | x | y | z |
| Position | | −39.0461 | −35.6819 | 0.0000 |
| Vector | VX | −0.9975 | 0.0707 | 0.0000 |
| | VY | 0.0707 | 0.9975 | 0.0000 |
| | VZ | 0.0000 | 0.0000 | −1.0000 |
| CO 0.031249 | | | | |

| $\epsilon$ | A4 | A6 | A8 | A10 | A12 |
|---|---|---|---|---|---|
| 1.0 | $8.16368 \times 10^{-4}$ | $0.00000 \times 10^0$ | $0.00000 \times 10^0$ | $0.00000 \times 10^0$ | $0.00000 \times 10^0$ |

| Bjk | j = 0 | j = 1 | j = 2 | j = 3 | j = 4 |
|---|---|---|---|---|---|
| k = 0 | $0.00000 \times 10^0$ | $0.00000 \times 10^0$ | $-1.36432 \times 10^{-2}$ | $-4.07573 \times 10^{-5}$ | $-8.19307 \times 10^{-4}$ |
| k = 2 | $-1.06151 \times 10^{-2}$ | $-6.73769 \times 10^{-5}$ | $-1.63774 \times 10^{-3}$ | $-3.86414 \times 10^{-8}$ | $-6.56640 \times 10^{-9}$ |
| k = 4 | $-8.18039 \times 10^{-4}$ | $-3.68460 \times 10^{-8}$ | $-7.04095 \times 10^{-9}$ | $0.00000 \times 10^0$ | $0.00000 \times 10^0$ |
| k = 6 | $-1.65345 \times 10^{-9}$ | $0.00000 \times 10^0$ | $0.00000 \times 10^0$ | $0.00000 \times 10^0$ | $0.00000 \times 10^0$ |
| k = 8 | $0.00000 \times 10^0$ | $0.00000 \times 10^0$ | $0.00000 \times 10^0$ | | |
| k = 10 | $0.00000 \times 10^0$ | | | | |

| Bjk | j = 5 | j = 6 | j = 7 | j = 8 | j = 9 |
|---|---|---|---|---|---|
| k = 0 | $-1.34044 \times 10^{-8}$ | $-2.12160 \times 10^{-9}$ | $0.00000 \times 10^0$ | $0.00000 \times 10^0$ | $0.00000 \times 10^0$ |
| k = 2 | $0.00000 \times 10^0$ | $0.00000 \times 10^0$ | $0.00000 \times 10^0$ | $0.00000 \times 10^0$ | |
| k = 4 | $0.00000 \times 10^0$ | $0.00000 \times 10^0$ | | k = 0, j = 10 | $0.00000 \times 10^0$ |

TABLE 55

Optical System 7   Reflection Surface S3   N0 = N1 = 1

| Local Coord. | | x | y | z |
|---|---|---|---|---|
| Position | | 94.8593 | −141.3115 | 0.0000 |
| Vector | VX | 0.9873 | −0.1588 | 0.0000 |
| | VY | 0.1588 | 0.9873 | 0.0000 |
| | VZ | 0.0000 | 0.0000 | 1.0000 |
| CO  0.005503 | | | | |

| $\epsilon$ | A4 | A6 | A8 | A10 | A12 |
|---|---|---|---|---|---|
| 1.0 | $2.95939 \times 10^{-7}$ | $4.34031 \times 10^{-11}$ | $3.00795 \times 10^{-17}$ | $0.00000 \times 10^{0}$ | $0.00000 \times 10^{0}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $-4.42461 \times 10^{-3}$ | $6.05988 \times 10^{-6}$ | $-3.97886 \times 10^{-7}$ |
| k = 2 | $-4.30112 \times 10^{-3}$ | $4.99736 \times 10^{-6}$ | $-6.10941 \times 10^{-7}$ | $3.38146 \times 10^{-10}$ | $-1.36661 \times 10^{-10}$ |
| k = 4 | $-3.30200 \times 10^{-7}$ | $-2.02657 \times 10^{-10}$ | $-1.34932 \times 10^{-10}$ | $0.00000 \times 10^{0}$ | $0.00000 \times 10^{0}$ |
| k = 6 | $-4.39602 \times 10^{-11}$ | $0.00000 \times 10^{0}$ | $0.00000 \times 10^{0}$ | $0.00000 \times 10^{0}$ | $0.00000 \times 10^{0}$ |
| k = 8 | $0.00000 \times 10^{0}$ | $0.00000 \times 10^{0}$ | $0.00000 \times 10^{0}$ | | |
| k = 10 | $0.00000 \times 10^{0}$ | | | | |

| Bjk | j = 5 | j = 6 | j = 7 | j = 8 | j = 9 |
|---|---|---|---|---|---|
| k = 0 | $1.27490 \times 10^{-9}$ | $-4.95471 \times 10^{-11}$ | $0.00000 \times 10^{0}$ | $0.00000 \times 10^{0}$ | $0.00000 \times 10^{0}$ |
| k = 2 | $0.00000 \times 10^{0}$ | $0.00000 \times 10^{0}$ | $0.00000 \times 10^{0}$ | $0.00000 \times 10^{0}$ | |
| k = 4 | $0.00000 \times 10^{0}$ | $0.00000 \times 10^{0}$ | | k = 0, j = 10 | $0.00000 \times 10^{0}$ |

TABLE 56

Optical System 7   Reflection Surface S4   N0 = N1 = 1

| Local Coord. | | x | y | z |
|---|---|---|---|---|
| Position | | −31.8440 | −53.6364 | 0.0000 |
| Vector | VX | −0.8691 | −0.4947 | 0.0000 |
| | VY | −0.4947 | 0.8691 | 0.0000 |
| | VZ | 0.0000 | 0.0000 | −1.0000 |
| CO  0.002994 | | | | |

| $\epsilon$ | A4 | A6 | A8 | A10 | A12 |
|---|---|---|---|---|---|
| 1.0 | $-7.00793 \times 10^{-5}$ | $2.49769 \times 10^{-10}$ | $-1.66458 \times 10^{-15}$ | $0.00000 \times 10^{0}$ | $0.00000 \times 10^{0}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $1.48609 \times 10^{-3}$ | $-2.73091 \times 10^{-4}$ | $6.67047 \times 10^{-5}$ |
| k = 2 | $4.89716 \times 10^{-3}$ | $-1.26427 \times 10^{-4}$ | $1.38372 \times 10^{-4}$ | $1.22747 \times 10^{-8}$ | $-4.67180 \times 10^{-10}$ |
| k = 4 | $6.97540 \times 10^{-5}$ | $9.56272 \times 10^{-9}$ | $-4.92052 \times 10^{-10}$ | $0.00000 \times 10^{0}$ | $0.00000 \times 10^{0}$ |
| k = 6 | $-1.83541 \times 10^{-10}$ | $0.00000 \times 10^{0}$ | $0.00000 \times 10^{0}$ | $0.00000 \times 10^{0}$ | $0.00000 \times 10^{0}$ |
| k = 8 | $0.00000 \times 10^{0}$ | $0.00000 \times 10^{0}$ | $0.00000 \times 10^{0}$ | | |
| k = 10 | $0.00000 \times 10^{0}$ | | | | |

| Bjk | j = 5 | j = 6 | j = 7 | j = 8 | j = 9 |
|---|---|---|---|---|---|
| k = 0 | $-1.18533 \times 10^{-8}$ | $-2.02990 \times 10^{-10}$ | $0.00000 \times 10^{0}$ | $0.00000 \times 10^{0}$ | $0.00000 \times 10^{0}$ |
| k = 2 | $0.00000 \times 10^{0}$ | $0.00000 \times 10^{0}$ | $0.00000 \times 10^{0}$ | $0.00000 \times 10^{0}$ | |
| k = 4 | $0.00000 \times 10^{0}$ | $0.00000 \times 10^{0}$ | | k = 0, j = 10 | $0.00000 \times 10^{0}$ |

TABLE 57

Optical System 7   Reflection Surface S5   N0 = N1 = 1

| Local Coord. | | x | y | z |
|---|---|---|---|---|
| Position | | 92.5433 | 52.4551 | 0.0000 |
| Vector | VX | 0.9939 | 0.1106 | 0.0000 |
| | VY | −0.1106 | 0.9939 | 0.0000 |
| | VZ | 0.0000 | 0.0000 | 1.0000 |
| CO  0.000000 | | | | |

TABLE 57-continued

| ε | A4 | A6 | A8 | A10 | A12 |
|---|---|---|---|---|---|
| 1.0 | $0.00000 \times 10^0$ | $0.00000 \times 10^0$ | $0.00000 \times 10^0$ | $0.00000 \times 10^0$ | $0.00000 \times 10^0$ |

| Bjk | j = 0 | j = 1 | j = 2 | j = 3 | j = 4 |
|---|---|---|---|---|---|
| k = 0 | $0.00000 \times 10^0$ | $0.00000 \times 10^0$ | $-3.94378 \times 10^{-4}$ | $-1.59797 \times 10^{-7}$ | $-3.99608 \times 10^{-11}$ |
| k = 2 | $-3.57143 \times 10^{-4}$ | $-1.81116 \times 10^{-7}$ | $-6.54066 \times 10^{-11}$ | $0.00000 \times 10^0$ | $0.00000 \times 10^0$ |
| k = 4 | $-3.77364 \times 10^{-11}$ | $0.00000 \times 10^0$ | $0.00000 \times 10^0$ | $0.00000 \times 10^0$ | $0.00000 \times 10^0$ |
| k = 6 | $0.00000 \times 10^0$ | $0.00000 \times 10^0$ | $0.00000 \times 10^0$ | $0.00000 \times 10^0$ | $0.00000 \times 10^0$ |
| k = 8 | $0.00000 \times 10^0$ | $0.00000 \times 10^0$ | $0.00000 \times 10^0$ | | |
| k = 10 | $0.00000 \times 10^0$ | | | | |

| Bjk | j = 5 | j = 6 | j = 7 | j = 8 | j = 9 |
|---|---|---|---|---|---|
| k = 0 | $0.00000 \times 10^0$ | $0.00000 \times 10^0$ | $0.00000 \times 10^0$ | $0.00000 \times 10^0$ | $0.00000 \times 10^0$ |
| k = 2 | $0.00000 \times 10^0$ | $0.00000 \times 10^0$ | $0.00000 \times 10^0$ | $0.00000 \times 10^0$ | |
| k = 4 | $0.00000 \times 10^0$ | $0.00000 \times 10^0$ | | k = 0, j = 10 | $0.00000 \times 10^0$ |

TABLE 58

Optical System 7   Projection Surface S6   N0 = N1 = 1

| Local Coord. | | x | y | z |
|---|---|---|---|---|
| Position | | −124.7253 | −599.6077 | 0.0000 |
| Vector | VX | −0.9944 | 0.1057 | 0.0000 |
| | VY | −0.1057 | −0.9944 | 0.0000 |
| | VZ | 0.0000 | 0.0000 | 1.0000 |
| C0 | 0.000000 | | | |

TABLE 59

Optical System 8   Display Surface S0   N0 = N1 = 1

| Local Coord. | | x | y | z |
|---|---|---|---|---|
| Position | | 0.0000 | 0.0000 | 0.0000 |
| Vector | VX | 1.0000 | 0.0000 | 0.0000 |
| | VY | 0.0000 | 1.0000 | 0.0000 |
| | VZ | 0.0000 | 0.0000 | 1.0000 |
| C0 | 0.000000 | | | |

TABLE 60

Optical System 8   Reflection Surface S1   N0 = N1 = 1

| Local Coord. | | x | y | z |
|---|---|---|---|---|
| Position | | 109.7416 | 22.4392 | 0.0000 |
| Vector | VX | 0.9757 | 0.2189 | 0.0000 |

TABLE 60-continued

| | | | | |
|---|---|---|---|---|
| | VY | −0.2189 | 0.9757 | 0.0000 |
| | VZ | 0.0000 | 0.0000 | 1.0000 |
| C0 | −0.006716 | | | |

| ε | A4 | A6 | A8 | A10 | A12 |
|---|---|---|---|---|---|
| 1.0 | $-2.84054 \times 10^{-9}$ | $1.87112 \times 10^{-12}$ | $-5.74671 \times 10^{-16}$ | $9.60094 \times 10^{-20}$ | $-6.81760 \times 10^{-24}$ |

TABLE 61

Optical System 8   Aperture Surface APR   N0 = N1 = 1

| Local Coord. | | x | y | z |
|---|---|---|---|---|
| Position | | 34.9630 | −23.2000 | 0.0000 |
| Vector | VX | −1.0000 | 0.0000 | 0.0000 |
| | VY | 0.0000 | 1.0000 | 0.0000 |
| | VZ | 0.0000 | 0.0000 | −1.0000 |
| C0 | 0.000000 | | | |
| R | 11.000000 | | | |

TABLE 62

Optical System 8   Reflection Surface S2   N0 = N1 = 1

| Local Coord. | | x | y | z |
|---|---|---|---|---|
| Position | | −48.6677 | −13.0128 | 0.0000 |
| Vector | | | | |
| | VX | −0.9996 | 0.0278 | 0.0000 |
| | VY | 0.0278 | 0.9996 | 0.0000 |
| | VZ | 0.0000 | 0.0000 | −1.0000 |
| C0 | 0.007482 | | | |

| ε | A4 | A6 | A8 | A10 | A12 |
|---|---|---|---|---|---|
| 1.0 | $7.16301 \times 10^{-7}$ | $2.06831 \times 10^{-9}$ | $-3.77750 \times 10^{-12}$ | $3.74155 \times 10^{-15}$ | $-1.08859 \times 10^{-18}$ |

TABLE 63

| Optical System 8 | Reflection Surface S3 | N0 = N1 = 1 | |
|---|---|---|---|
| Local Coord. | x | y | z |
| Position | 105.9963 | −21.2854 | 0.0000 |
| Vector VX | 0.9909 | −0.1348 | 0.0000 |
| VY | 0.1348 | 0.9909 | 0.0000 |
| VZ | 0.0000 | 0.0000 | 1.0000 |
| C0  0.001893 | | | |

| ε | A4 | A6 | A8 | A10 | A12 |
|---|---|---|---|---|---|
| 1.0 | $-1.23369 \times 10^{-7}$ | $9.10887 \times 10^{-12}$ | $-5.24619 \times 10^{-16}$ | $1.81183 \times 10^{-20}$ | $-2.75104 \times 10^{-25}$ |

TABLE 64

| | Optical System 8 | Reflection Surface S4 | N0 = N1 = 1 |
|---|---|---|---|
| Local Coord. | x | y | z |
| Position Vector | −37.3310 | −20.0359 | 0.0000 |
| VX | −0.9876 | 0.1567 | 0.0000 |
| VY | 0.1567 | 0.9876 | 0.0000 |
| VZ | 0.0000 | 0.0000 | −1.0000 |
| C0  0.004817 | | | |

| ε | A4 | A6 | A8 | A10 | A12 |
|---|---|---|---|---|---|
| 1.0 | $-9.75937 \times 10^{-8}$ | $4.15298 \times 10^{-12}$ | $-1.65242 \times 10^{-16}$ | $3.58862 \times 10^{-21}$ | $-3.62261 \times 10^{-26}$ |

TABLE 65

| | Optical System 8 | Reflection Surface S5 | N0 = N1 = 1 |
|---|---|---|---|
| Local Coord. | x | y | z |
| Position Vector | 74.4445 | −333.9736 | 0.0000 |
| VX | 0.9907 | −0.1361 | 0.0000 |
| VY | 0.1361 | 0.9907 | 0.0000 |
| VZ | 0.0000 | 0.0000 | 1.0000 |
| C0  0.000000 | | | |

| ε | A4 | A6 | A8 | A10 | A12 |
|---|---|---|---|---|---|
| 1.0 | $0.00000 \times 10^{0}$ | $0.00000 \times 10^{0}$ | $0.00000 \times 10^{0}$ | $0.00000 \times 10^{0}$ | $0.00000 \times 10^{0}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $2.14998 \times 10^{-6}$ | $0.00000 \times 10^{0}$ | $0.00000 \times 10^{0}$ |
| k = 2 | $-1.53242 \times 10^{-5}$ | $0.00000 \times 10^{0}$ | $0.00000 \times 10^{0}$ | $0.00000 \times 10^{0}$ | $0.00000 \times 10^{0}$ |
| k = 4 | $0.00000 \times 10^{0}$ | $0.00000 \times 10^{0}$ | $0.00000 \times 10^{0}$ | $0.00000 \times 10^{0}$ | $0.00000 \times 10^{0}$ |
| k = 6 | $0.00000 \times 10^{0}$ | $0.00000 \times 10^{0}$ | $0.00000 \times 10^{0}$ | $0.00000 \times 10^{0}$ | $0.00000 \times 10^{0}$ |
| k = 8 | $0.00000 \times 10^{0}$ | $0.00000 \times 10^{0}$ | $0.00000 \times 10^{0}$ | | |
| k = 10 | $0.00000 \times 10^{0}$ | | | | |

| Bjk | j = 5 | j = 6 | j = 7 | j = 8 | j = 9 |
|---|---|---|---|---|---|
| k = 0 | $0.00000 \times 10^{0}$ | $0.00000 \times 10^{0}$ | $0.00000 \times 10^{0}$ | $0.00000 \times 10^{0}$ | $0.00000 \times 10^{0}$ |
| k = 2 | $0.00000 \times 10^{0}$ | $0.00000 \times 10^{0}$ | $0.00000 \times 10^{0}$ | $0.00000 \times 10^{0}$ | |
| k = 4 | $0.00000 \times 10^{0}$ | $0.00000 \times 10^{0}$ | | k = 0, j = 10 | $0.00000 \times 10^{0}$ |

TABLE 66

| Optical System 8 | Projection Surface S6 | | N0 = N1 = 1 |
|---|---|---|---|
| Local Coord. | x | y | z |
| Position | −156.2931 | −544.6566 | 0.0000 |
| Vector VX | −0.9907 | 0.1361 | 0.0000 |
| VY | −0.1361 | −0.9907 | 0.0000 |
| VZ | 0.0000 | 0.0000 | 1.0000 |
| C0 0.000000 | | | |

TABLE 67

| Optical System 9 | Display Surface S0 | | N0 = N1 = 1 |
|---|---|---|---|
| Local Coord. | x | y | z |
| Position | 0.0000 | 0.0000 | 0.0000 |
| Vector VX | 1.0000 | 0.0000 | 0.0000 |
| VY | 0.0000 | 1.0000 | 0.0000 |
| VZ | 0.0000 | 0.0000 | 1.0000 |
| C0 0.000000 | | | |

TABLE 68

| Optical System 9 | Reflection Surface S1 | | N0 = N1 = 1 |
|---|---|---|---|
| Local Coord. | x | y | z |
| Position | 105.5059 | −10.5039 | 0.0000 |
| Vector VX | 1.0000 | −0.0019 | 0.0000 |

TABLE 68-continued

| Optical System 9 | Reflection Surface S1 | | N0 = N1 = 1 |
|---|---|---|---|
| Local Coord. | x | y | z |
| VY | 0.0019 | 1.0000 | 0.0000 |
| VZ | 0.0000 | 0.0000 | 1.0000 |
| C0 0.006781 | | | |

TABLE 69

| Optical System 9 | Aperture Surface APR | | N0 = N1 = 1 |
|---|---|---|---|
| Local Coord. | x | y | z |
| Position | 33.0000 | −22.5000 | 0.0000 |
| Vector VX | −1.0000 | 0.0000 | 0.0000 |
| VY | 0.0000 | 1.0000 | 0.0000 |
| VZ | 0.0000 | 0.0000 | −1.0000 |
| C0 0.000000 | | | |
| R 11.200000 | | | |

TABLE 70

| | Optical System 9 | Reflection Surface S2 | N0 = N1 = 1 |
|---|---|---|---|
| Local Coord. | x | y | z |
| Position Vector | −35.3330 | −11.8314 | 0.0000 |
| VX | −0.9979 | 0.0649 | 0.0000 |
| VY | 0.0649 | 0.9979 | 0.0000 |
| VZ | 0.0000 | 0.0000 | −1.0000 |
| C0 0.003523 | | | |

| ε | A4 | A6 | A8 | A10 | A12 |
|---|---|---|---|---|---|
| 1.0 | $2.90024 \times 10^{-7}$ | $3.03774 \times 10^{-11}$ | $-1.64525 \times 10^{-13}$ | $3.63698 \times 10^{-16}$ | $-2.26837 \times 10^{-19}$ |

TABLE 71

| | Optical System 9 | Reflection Surface S3 | N0 = N1 = 1 |
|---|---|---|---|
| Local Coord. | x | y | z |
| Position Vector | 125.2964 | −57.4889 | 0.0000 |
| VX | 0.9956 | −0.0933 | 0.0000 |
| VY | 0.0933 | 0.9956 | 0.0000 |
| VZ | 0.0000 | 0.0000 | 1.0000 |
| C0 −0.000592 | | | |

| ε | A4 | A6 | A8 | A10 | A12 |
|---|---|---|---|---|---|
| 1.0 | $1.20146 \times 10^{-7}$ | $-3.17964 \times 10^{-11}$ | $9.50725 \times 10^{-15}$ | $-2.25241 \times 10^{-18}$ | $2.43817 \times 10^{-22}$ |

TABLE 72

| Local Coord. | Optical System 9 x | Reflection Surface S4 y | $N0 = N1 = 1$ z |
|---|---|---|---|
| Position Vector | −29.7015 | −101.1259 | 0.0000 |
| VX | −0.9157 | 0.4018 | 0.0000 |
| VY | 0.4018 | 0.9157 | 0.0000 |
| VZ | 0.0000 | 0.0000 | −1.0000 |
| C0 | 0.005269 | | |

| $\epsilon$ | A4 | A6 | A8 | A10 | A12 |
|---|---|---|---|---|---|
| 1.0 | $6.43424 \times 10^{-6}$ | $-5.23089 \times 10^{-10}$ | $4.11661 \times 10^{-13}$ | $-8.48531 \times 10^{-17}$ | $6.44480 \times 10^{-25}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $-1.61161 \times 10^{-3}$ | $1.68225 \times 10^{-5}$ | $-6.31300 \times 10^{-6}$ |
| k = 2 | $1.43999 \times 10^{-3}$ | $5.39398 \times 10^{-5}$ | $-1.23493 \times 10^{-5}$ | $4.13078 \times 10^{-9}$ | $1.55592 \times 10^{-9}$ |
| k = 4 | $-6.63828 \times 10^{-6}$ | $-7.04327 \times 10^{-9}$ | $1.42816 \times 10^{-9}$ | $-1.93120 \times 10^{-12}$ | $-2.48448 \times 10^{-12}$ |
| k = 6 | $5.38018 \times 10^{-10}$ | $9.82630 \times 10^{-13}$ | $-1.62528 \times 10^{-12}$ | $2.02531 \times 10^{-16}$ | $8.51520 \times 10^{-16}$ |
| k = 8 | $-4.12762 \times 10^{-13}$ | $-7.93015 \times 10^{-17}$ | $4.23183 \times 10^{-16}$ | | |
| k = 10 | $8.49841 \times 10^{-17}$ | | | | |

| Bjk | j = 5 | j = 6 | j = 7 | j = 8 | j = 9 |
|---|---|---|---|---|---|
| k = 0 | $1.21132 \times 10^{-9}$ | $5.90632 \times 10^{-10}$ | $9.10265 \times 10^{-13}$ | $-4.30767 \times 10^{-13}$ | $-2.91588 \times 10^{-16}$ |
| k = 2 | $-4.92969 \times 10^{-13}$ | $-1.64681 \times 10^{-12}$ | $-3.33315 \times 10^{-16}$ | $4.18463 \times 10^{-16}$ | |
| k = 4 | $1.79589 \times 10^{-16}$ | $8.52072 \times 10^{-16}$ | | k = 0, j = 10 | $8.58158 \times 10^{-17}$ |

TABLE 73

| Local Coord. | Optical System 9 x | Reflection Surface S5 y | $N0 = N1 = 1$ z |
|---|---|---|---|
| Position Vector | 133.2256 | −289.4807 | 0.0000 |
| VX | 1.0000 | 0.0000 | 0.0000 |
| VY | 0.0000 | 1.0000 | 0.0000 |
| VZ | 0.0000 | 0.0000 | 1.0000 |
| C0 | 0.000000 | | |

| $\epsilon$ | A4 | A6 | A8 | A10 | A12 |
|---|---|---|---|---|---|
| 1.0 | $0.00000 \times 10^{0}$ | $0.00000 \times 10^{0}$ | $0.00000 \times 10^{0}$ | $0.00000 \times 10^{0}$ | $0.00000 \times 10^{0}$ |

| Bjk | j = 0 | j = 1 | j = 2 | j = 3 | j = 4 |
|---|---|---|---|---|---|
| k = 0 | $0.00000 \times 10^{0}$ | $0.00000 \times 10^{0}$ | $0.00000 \times 10^{0}$ | $0.00000 \times 10^{0}$ | $0.00000 \times 10^{0}$ |
| k = 2 | $-2.00028 \times 10^{0}$ | $0.00000 \times 10^{0}$ | $0.00000 \times 10^{0}$ | $0.00000 \times 10^{0}$ | $0.00000 \times 10^{0}$ |
| k = 4 | $0.00000 \times 10^{0}$ | $0.00000 \times 10^{0}$ | $0.00000 \times 10^{0}$ | $0.00000 \times 10^{0}$ | $0.00000 \times 10^{0}$ |
| k = 6 | $0.00000 \times 10^{0}$ | $0.00000 \times 10^{0}$ | $0.00000 \times 10^{0}$ | $0.00000 \times 10^{0}$ | $0.00000 \times 10^{0}$ |
| k = 8 | $0.00000 \times 10^{0}$ | $0.00000 \times 10^{0}$ | $0.00000 \times 10^{0}$ | | |
| k = 10 | $0.00000 \times 10^{0}$ | | | | |

| Bjk | j = 5 | j = 6 | j = 7 | j = 8 | j = 9 |
|---|---|---|---|---|---|
| k = 0 | $0.00000 \times 10^{0}$ | $0.00000 \times 10^{0}$ | $0.00000 \times 10^{0}$ | $0.00000 \times 10^{0}$ | $0.00000 \times 10^{0}$ |
| k = 2 | $0.00000 \times 10^{0}$ | $0.00000 \times 10^{0}$ | $0.00000 \times 10^{0}$ | $0.00000 \times 10^{0}$ | |
| k = 4 | $0.00000 \times 10^{0}$ | $0.00000 \times 10^{0}$ | | k = 0, j = 10 | $0.00000 \times 10^{0}$ |

TABLE 74

| | Optical System 9 Local Coord. | Projection Surface S6 x | $N0 = N1 = 1$ y | z |
|---|---|---|---|---|
| Position Vector | | −66.7744 | −544.2969 | 0.0000 |
| | VX | −1.0000 | 0.0000 | 0.0000 |
| | VY | 0.0000 | −1.0000 | 0.0000 |
| | VZ | 0.0000 | 0.0000 | 1.0000 |
| C0 | 0.000000 | | | |

What is claimed is:

1. A projection optical system that directs rays of light from a display surface to a projection surface in such a way that a ray of light from a center of the display surface is obliquely incident on the projection surface in order to form on the projection surface an optical image of an image displayed on the display surface, the projection optical system comprising:

a plurality of reflection surfaces for successively reflecting the rays of light from the display surface to direct the rays of light to the projection surface, wherein, when relative positions of the plurality of reflection surfaces with respect to the projection surface are expressed based on order in which the reflection surfaces reflect the rays of light, of the plurality of reflection surfaces, the reflection surface closest to the projection surface is a free-form surface, has a size larger than half a size of the projection surface in both of directions corresponding to height and width directions of the display surface, and has a positive optical power.

2. A projection optical system as claimed in claim 1, wherein the display surface is smaller in the height direction thereof than in the width direction thereof, one or more of the plurality of reflection surfaces other than the reflection surface closest to the projection surface each have an optical power, the reflection surfaces that have optical powers reflect the rays of light from the display surface in such a way as to deflect the rays of light in the height direction of the display surface, and the following conditions are fulfilled:

$$Fnoy \geq Fnoz,$$

$$Fnoy \leq 4.5, \text{ and}$$

$$Fnoz \leq 4.0$$

where

Fnoy represents an f-number in the direction corresponding to the height direction of the display surface; and Fnoz represents an f-number in the direction corresponding to the width direction of the display surface.

3. A projection optical system as claimed in claim 1, wherein the display surface is smaller in the height direction thereof than in the width direction thereof, one or more of the plurality of reflection surfaces other than the reflection surface closest to the projection surface each have an optical power, the reflection surfaces that have optical powers reflect the rays of light from the display surface in such a way as to deflect the rays of light in the height direction of the display surface, and the following condition is fulfilled:

$$D/H \leq 0.35$$

where

H represents the size of the projection surface in the direction corresponding to the height direction of the display surface; and D represents a maximum length of a space through which the rays of light passes to travel from the display surface to the projection surface, as measured along a direction normal to the display surface.

4. A projection optical system that directs rays of light from a display surface to a projection surface in such a way that a ray of light from a center of the display surface is obliquely incident on the projection surface in order to form on the projection surface an optical image of an image displayed on the display surface, the projection optical system comprising:

a plurality of reflection surfaces, each having an optical power, for successively reflecting the rays of light from the display surface to direct the rays of light to the projection surface, wherein, when relative positions of the plurality of reflection surfaces with respect to the projection surface are expressed based on order in which the reflection surfaces reflect the rays of light, of the plurality of reflection surfaces, the reflection surface closest to the projection surface has a positive optical power and has a size larger than half a size of the projection surface in both of directions corresponding to height and width directions of the display surface, of the plurality of reflection surfaces, the reflection surface second closest to the projection surface has a negative optical power, and at least one of the reflection surfaces closest and second closest to the projection surface is a free-form surface.

5. A projection optical system as claimed in claim 4, wherein the reflection surface closest to the projection surface is a free-form surface.

6. A projection optical system as claimed in claim 4, wherein the display surface is smaller in the height direction thereof than in the width direction thereof, the plurality of reflection surfaces each reflect the rays of light from the display surface in such a way as to deflect the rays of light in the height direction of the display surface, and the following conditions are fulfilled:

$$Fnoy \geq Fnoz,$$

$$Fnoy \leq 4.5, \text{ and}$$

$$Fnoz \leq 4.0$$

where

Fnoy represents an f-number in the direction corresponding to the height direction of the display surface; and Fnoz represents an f-number in the direction corresponding to the width direction of the display surface.

7. A projection optical system as claimed in claim 4, wherein the display surface is smaller in the height direction thereof than in the width direction thereof, the plurality of reflection surfaces each reflect the rays of light from the display surface in such a way as to deflect the rays of light in the height direction of the display surface, and the following condition is fulfilled:

$$D/H \leq 0.35$$

where

H represents the size of the projection surface in the direction corresponding to the height direction of the display surface; and D represents a maximum length of a space through which the rays of light passes to travel from the display surface to the projection surface, as measured along a direction normal to the display surface.

8. A projection optical system as claimed in claim 4, wherein an entrance pupil is located at infinity.

9. A projection optical system that directs rays of light from a display surface to a projection surface in such a way that a ray of light from a center of the display surface is obliquely incident on the projection surface in order to form on the projection surface an optical image of an image displayed on the display surface, the projection optical system comprising:

a plurality of reflection surfaces, each having an optical power, for successively reflecting the rays of light from the display surface to direct the rays of light to the projection surface, wherein, when relative positions of the plurality of reflection surfaces with respect to the projection surface are expressed based on order in which the reflection surfaces reflect the rays of light, of the plurality of reflection surfaces, the reflection surface closest to the projection surface has a positive optical power and has a size larger than half a size of the projection surface in both of directions corresponding to height and width directions of the display surface, of the plurality of reflection surfaces, the reflection surface second closest to the projection surface has a negative optical power, of the plurality of reflection surfaces, the reflection surface third closest to the projection surface has a positive optical power, and at least two of the reflection surfaces closest, second closest, and third closest to the projection surface are free-form surfaces.

10. A projection optical system as claimed in claim 9, wherein the reflection surface closest to the projection surface is a free-form surface.

11. A projection optical system as claimed in claim 9, wherein the display surface is smaller in the height direction thereof than in the width direction thereof, the plurality of reflection surfaces each reflect the rays of light from the display surface in such a way as to deflect the rays of light in the height direction of the display surface, and the following conditions are fulfilled:

$$Fnoy \geq Fnoz,$$

$$Fnoy \leq 4.5, \text{ and}$$

$$Fnoz \leq 4.0$$

where

Fnoy represents an f-number in the direction corresponding to the height direction of the display surface; and Fnoz represents an f-number in the direction corresponding to the width direction of the display surface.

12. A projection optical system as claimed in claim 9, wherein the display surface is smaller in the height direction thereof than in the width direction thereof, the plurality of reflection surfaces each reflect the rays of light from the display surface in such a way as to deflect the rays of light in the height direction of the display surface, and the following condition is fulfilled:

$$D/H \leq 0.35$$

where

H represents the size of the projection surface in the direction corresponding to the height direction of the display surface; and D represents a maximum length of a space through which the rays of light passes to travel from the display surface to the projection surface, as measured along a direction normal to the display surface.

13. A projection optical system as claimed in claim 9, wherein an entrance pupil is located at infinity.

\* \* \* \* \*